(12) United States Patent
Fujimoto

(10) Patent No.: US 6,370,105 B1
(45) Date of Patent: Apr. 9, 2002

(54) RECORDING MEDIA ACCOMMODATING APPARATUS INCLUDING A PLAYBACK MECHANISM THAT TRANSFERS MEDIA

(75) Inventor: Fumihiko Fujimoto, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 09/362,738

(22) Filed: Jul. 29, 1999

(30) Foreign Application Priority Data

Jul. 30, 1998 (JP) .......................................... 10-216157
Jul. 30, 1998 (JP) .......................................... 10-216161

(51) Int. Cl.⁷ .............................................. G11B 17/04
(52) U.S. Cl. ..................................................... 369/192
(58) Field of Search ............................... 369/178, 179, 369/34, 35, 36, 38, 192

(56) References Cited

U.S. PATENT DOCUMENTS

| | | |
|---|---|---|
| 5,561,657 A | 10/1996 | Ogawa |
| 5,682,364 A | 10/1997 | Ogawa |
| 5,959,958 A * | 9/1999 | Inatani et al. ................ 369/178 |

FOREIGN PATENT DOCUMENTS

| | | |
|---|---|---|
| JP | 3-235249 | 10/1991 |
| JP | 3-235250 | 10/1991 |
| JP | 5-151763 | 6/1993 |
| JP | 6-231559 | 8/1994 |
| JP | 7-169168 | 7/1995 |
| JP | 10-3732 | 1/1998 |
| JP | 10-3733 | 1/1998 |
| JP | 10-3734 | 1/1998 |
| JP | 10-3736 | 1/1998 |

* cited by examiner

Primary Examiner—David Davis
(74) Attorney, Agent, or Firm—Wenderoth, Lind & Ponack, L.L.P.

(57) ABSTRACT

A stocker installed inside a housing of a CD playback apparatus is constructed by stacking holders of identical construction. Each holder can hold a CD. The CD can be inserted and ejected through an insertion/ejection slot one at a time. A moving mechanism moves the entire construction of the stocker up and down. A separating mechanism widens the gap between the holders in the stocker selected by the upward or downward movement thereof, and creates a space for a PU unit and a turn table to enter. The stocker capable of accommodating a plurality of recording media is constructed using members of identical construction, and the stocker can be separated at any accommodating position.

25 Claims, 55 Drawing Sheets

FIG. 8A
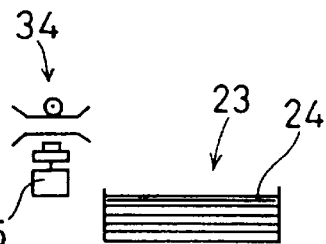
FIG. 8B
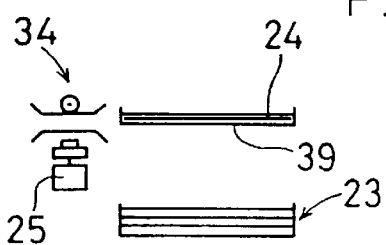
FIG. 8C
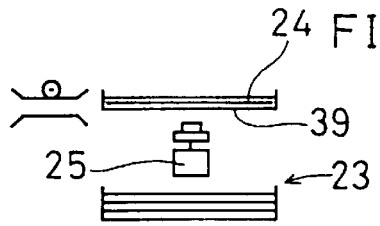
FIG. 8D
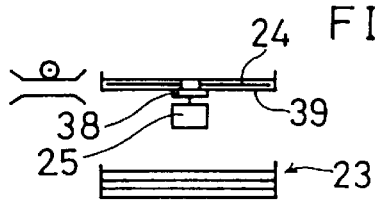
FIG. 8E
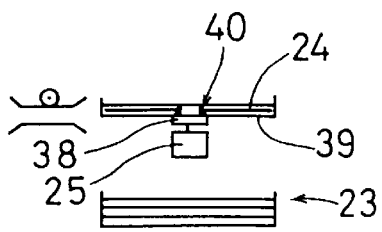
FIG. 8F
FIG. 8G
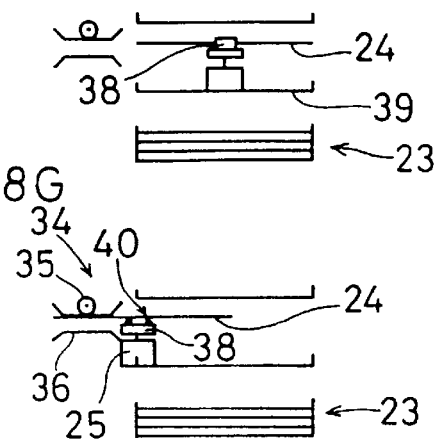
FIG. 8H
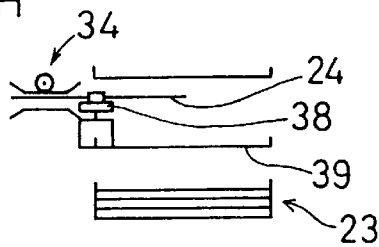
FIG. 8I
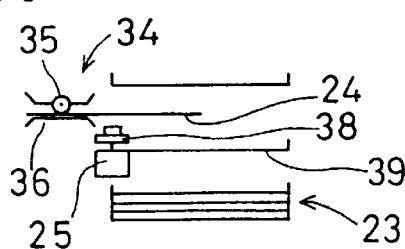

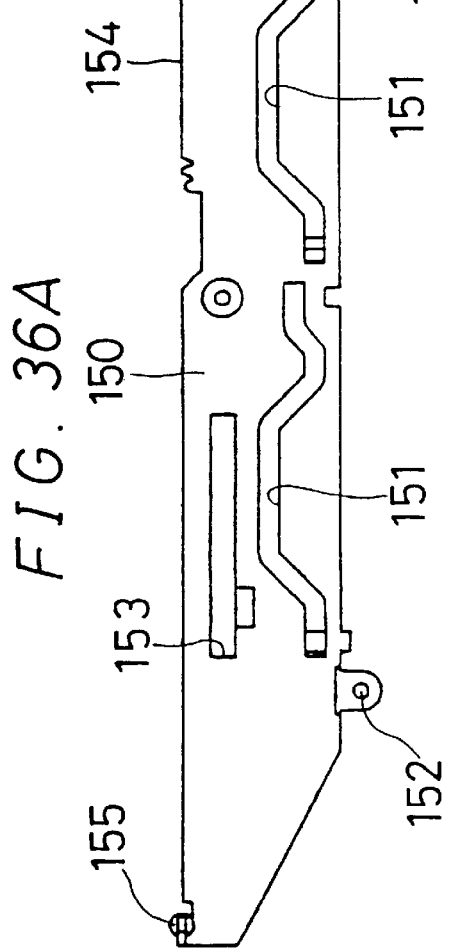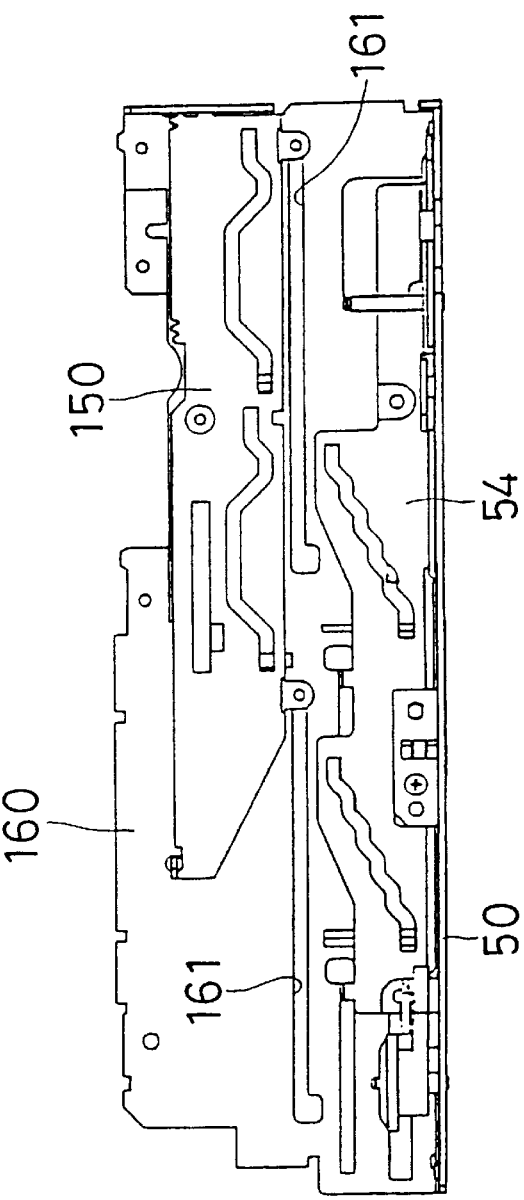

FIG. 41

| | S | E |
|---|---|---|
| LIFTING MOTOR | CW<br>CCW | |
| SPLIT MOTOR | CW<br>CCW | max 5sec → ← 1.00msec |
| SLIDE MOTOR | CW<br>CCW | |
| LIFTING ORIGIN SW. | H<br>L | |
| COUNT SENSOR | H<br>L | |
| SPLIT ORIGIN SW. | H<br>L | |
| SPLIT POSITION SENSOR | 9EH (LOCK REL.) | dec. → 40H (DISC MOUNTED) |
| SLIDE ORIGIN SW. | H<br>L | |
| INS./EJECT. STANDBY SW. | H<br>L | |
| SLIDE COMPL. SW. | H<br>L | |
| INS. DET. SW. | H<br>L | |
| INS. PRESENCE/ABSENCE SW. | H<br>L | |
| EJECT. COMPL. SW. | H<br>L | |
| PU ORIGIN SW. | H<br>L | |
| CLAMP REL. SW. | H<br>L | |

FIG. 42

| | S | | E |
|---|---|---|---|
| LIFTING MOTOR | CW<br>—<br>CCW | | |
| SPLIT MOTOR | CW<br>—<br>CCW | max 3sec | 1.0 0msec |
| SLIDE MOTOR | CW<br>—<br>CCW | | |
| LIFTING ORIGIN SW. | H<br>L | | |
| COUNT SENSOR | H<br>L | | |
| SPLIT ORIGIN SW. | H<br>L | | |
| SPLIT POSITION SENSOR | 4 0 h<br>(DISC MOUNTED) | dec. | 2 0 h<br>(SPLIT COMPL.) |
| SLIDE ORIGIN SW. | H<br>L | | |
| INS./EJECT. STANDBY SW. | H<br>L | | |
| SLIDE COMPL. SW. | H<br>L | | |
| INS. DET. SW. | H<br>L | | |
| INS. PRESENCE/ABSENCE SW. | H<br>L | | |
| EJECT. COMPL. SW. | H<br>L | | |
| PU ORIGIN SW. | H<br>L | | |
| CLAMP REL. SW. | H<br>L | | |

FIG. 44

| | S | | E |
|---|---|---|---|
| LIFTING MOTOR | CW / H / CCW | | |
| SPLIT MOTOR | CW / H / CCW | max 5sec | 1.0 msec |
| SLIDE MOTOR | CW / H / CCW | | |
| LIFTING ORIGIN SW. | H / L | | |
| COUNT SENSOR | H / L | | |
| SPLIT ORIGIN SW. | H / L | | |
| SPLIT POSITION SENSOR | 20h (SPLIT COMPL.) | dec. → 18h (ORIGIN) | const. |
| SLIDE ORIGIN SW. | H / L | | |
| INS./EJECT. STANDBY SW. | H / L | | |
| SLIDE COMPL. SW. | H / L | | |
| INS. DET. SW. | H / L | | |
| INS. PRESENCE/ABSENCE SW. | H / L | | |
| EJECT. COMPL. SW. | H / L | | |
| PU ORIGIN SW. | H / L | | |
| CLAMP REL. SW. | H / L | | |

FIG. 46

| | S | | E |
|---|---|---|---|
| LIFTING MOTOR | CW --- F --- CCW --- | | |
| SPLIT MOTOR | CW --- F --- CCW --- | max 5sec | 100msec |
| SLIDE MOTOR | CW --- F --- CCW --- | | |
| LIFTING ORIGIN SW. | H --- L --- | | |
| COUNT SENSOR | H --- L --- | | |
| SPLIT ORIGIN SW. | H --- L --- | | |
| SPLIT POSITION SENSOR | 18h (ORIGIN) | const. | inc. → | 20h (SPLIT COMPL.) |
| SLIDE ORIGIN SW. | H --- L --- | | |
| INS./EJECT. STANDBY SW. | H --- L --- | | |
| SLIDE COMPL. SW. | H --- L --- | | |
| INS. DET. SW. | H --- L --- | | |
| INS. PRESENCE/ ABSENCE SW. | H --- L --- | | |
| EJECT. COMPL. SW. | H --- L --- | | |
| PU ORIGIN SW. | H --- L --- | | |
| CLAMP REL. SW. | H --- L --- | | |

FIG. 47

| | | S | | E |
|---|---|---|---|---|
| LIFTING MOTOR | CW<br>CCW | | | |
| SPLIT MOTOR | CW<br>CCW | | | |
| SLIDE MOTOR | CW<br>CCW | ⌐_____ | max 3sec _____⌐<br>100msec  100msec | |
| LIFTING ORIGIN SW. | H<br>L | | | |
| COUNT SENSOR | H<br>L | | | |
| SPLIT ORIGIN SW. | H<br>L | | | |
| SPLIT POSITION SENSOR | | 20h (SPLIT COMPL.) const. | | |
| SLIDE ORIGIN SW. | H<br>L | ⌐_____ | _____ | |
| INS./EJECT. STANDBY SW. | H<br>L | ‾‾‾‾‾‾⌐____ | _____ | |
| SLIDE COMPL. SW. | H<br>L | ‾‾‾‾‾‾‾‾‾‾‾‾ | ‾‾‾‾‾‾‾⌐___ | |
| INS. DET. SW. | H<br>L | | | |
| INS. PRESENCE/ ABSENCE SW. | H<br>L | | | |
| EJECT. COMPL. SW. | H<br>L | | | |
| PU ORIGIN SW. | H<br>L | | | |
| CLAMP REL. SW. | H<br>L | | | |

FIG. 48

| | S | | E |
|---|---|---|---|
| LIFTING MOTOR | CW —<br>—<br>CCW — | | — —<br>———<br>— — |
| SPLIT MOTOR | CW —<br>—<br>CCW — | ⌐——— max 3sec ———⌐<br> | ⌐—<br>———<br>100msec |
| SLIDE MOTOR | CW —<br>—<br>CCW — | | — —<br>———<br>— — |
| LIFTING ORIGIN SW. | H —<br>L — | | — —<br>— — |
| COUNT SENSOR | H —<br>L — | | — —<br>— — |
| SPLIT ORIGIN SW. | H —<br>L — | | — —<br>— — |
| SPLIT POSITION SENSOR | 20h (SPLIT COMPL.) | inc. ——→ | 40h (DISC MOUNTED) |
| SLIDE ORIGIN SW. | H —<br>L — | | — —<br>— — |
| INS./EJECT. STANDBY SW. | H —<br>L — | | — —<br>— — |
| SLIDE COMPL. SW. | H —<br>L — | | — —<br>— — |
| INS. DET. SW. | H —<br>L — | | — —<br>— — |
| INS. PRESENCE/ ABSENCE SW. | H —<br>L — | | — —<br>— — |
| EJECT. COMPL. SW. | H —<br>L — | | — —<br>— — |
| PU ORIGIN SW. | H —<br>L — | | — —<br>— — |
| CLAMP REL. SW. | H —<br>L — | | — —<br>— — |

FIG. 49

| | | S | E |
|---|---|---|---|
| LIFTING MOTOR | CW  ⊢  CCW | | |
| SPLIT MOTOR | CW  ⊢  CCW | max 5sec | 100msec |
| SLIDE MOTOR | CW  ⊢  CCW | | |
| LIFTING ORIGIN SW. | H  L | | |
| COUNT SENSOR | H  L | | |
| SPLIT ORIGIN SW. | H  L | | |
| SPLIT POSITION SENSOR | | 40h (DISC MOUNTED) — inc. → | 9Eh (LOCK REL.) |
| SLIDE ORIGIN SW. | H  L | | |
| INS./EJECT. STANDBY SW. | H  L | | |
| SLIDE COMPL. SW. | H  L | | |
| INS. DET. SW. | H  L | | |
| INS. PRESENCE/ ABSENCE SW. | H  L | | |
| EJECT. COMPL. SW. | H  L | | |
| PU ORIGIN SW. | H  L | | |
| CLAMP REL. SW. | H  L | | |

FIG. 50

| | S | | E |
|---|---|---|---|
| LIFTING MOTOR | CW<br>CCW | | |
| SPLIT MOTOR | CW<br>CCW | max 3sec | 100msec |
| SLIDE MOTOR | CW<br>CCW | | |
| LIFTING ORIGIN SW. | H<br>L | | |
| COUNT SENSOR | H<br>L | | |
| SPLIT ORIGIN SW. | H<br>L | | |
| SPLIT POSITION SENSOR | 40h<br>(DISC MOUNTED) | inc. | 67h<br>(HOLD REL.) |
| SLIDE ORIGIN SW. | H<br>L | | |
| INS./EJECT. STANDBY SW. | H<br>L | | |
| SLIDE COMPL. SW. | H<br>L | | |
| INS. DET. SW. | H<br>L | | |
| INS. PRESENCE/ABSENCE SW. | H<br>L | | |
| EJECT. COMPL. SW. | H<br>L | | |
| PU ORIGIN SW. | H<br>L | | |
| CLAMP REL. SW. | H<br>L | | |

FIG. 51

| | S | | E |
|---|---|---|---|
| LIFTING MOTOR | CW<br>CCW | | |
| SPLIT MOTOR | CW<br>CCW | | |
| SLIDE MOTOR | CW<br>CCW | max 3sec | |
| LIFTING ORIGIN SW. | H<br>L | | 100msec 100msec |
| COUNT SENSOR | H<br>L | | |
| SPLIT ORIGIN SW. | H<br>L | | |
| SPLIT POSITION SENSOR | | 67h (HOLD REL.) const. | |
| SLIDE ORIGIN SW. | H<br>L | | |
| INS./EJECT. STANDBY SW. | H<br>L | | |
| SLIDE COMPL. SW. | H<br>L | | |
| INS. DET. SW. | H<br>L | | |
| INS. PRESENCE/ABSENCE SW. | H<br>L | | |
| EJECT. COMPL. SW. | H<br>L | | |
| PU ORIGIN SW. | H<br>L | | |
| CLAMP REL. SW. | H<br>L | | |

FIG. 52

| | S | | E |
|---|---|---|---|
| LIFTING MOTOR | CW<br>CCW | | |
| SPLIT MOTOR | CW<br>CCW | max 3sec | 100msec |
| SLIDE MOTOR | CW<br>CCW | | |
| LIFTING ORIGIN SW. | H<br>L | | |
| COUNT SENSOR | H<br>L | | |
| SPLIT ORIGIN SW. | H<br>L | | |
| SPLIT POSITION SENSOR | 67h<br>(HOLD REL.) | inc. | 83h<br>(INS./EJECT.) |
| SLIDE ORIGIN SW. | H<br>L | | |
| INS./EJECT. STANDBY SW. | H<br>L | | |
| SLIDE COMPL. SW. | H<br>L | | |
| INS. DET. SW. | H<br>L | | |
| INS. PRESENCE/ABSENCE SW. | H<br>L | | |
| EJECT. COMPL. SW. | H<br>L | | |
| PU ORIGIN SW. | H<br>L | | |
| CLAMP REL. SW. | H<br>L | | |

FIG. 54

| | S | | E |
|---|---|---|---|
| LIFTING MOTOR | CW / — / CCW | max 5sec | 100msec |
| SPLIT MOTOR | CW / — / CCW | | |
| SLIDE MOTOR | CW / — / CCW | | |
| LIFTING ORIGIN SW. | H / L | | |
| COUNT SENSOR | H / L | | |
| SPLIT ORIGIN SW. | H / L | | |
| SPLIT POSITION SENSOR | | 83h (INS./EJECT.) const. | |
| SLIDE ORIGIN SW. | H / L | | |
| INS./EJECT. STANDBY SW. | H / L | | |
| SLIDE COMPL. SW. | H / L | | |
| INS. DET. SW. | H / L | | |
| INS. PRESENCE/ABSENCE SW. | H / L | | |
| EJECT. COMPL. SW. | H / L | | |
| PU ORIGIN SW. | H / L | | |
| CLAMP REL. SW. | H / L | | |

FIG. 55

| | | S | E |
|---|---|---|---|
| LIFTING MOTOR | CW ⊢ CCW | 500msec | 100msec |
| SPLIT MOTOR | CW ⊢ CCW | | |
| SLIDE MOTOR | CW ⊢ CCW | | |
| LIFTING ORIGIN SW. | H L | | |
| COUNT SENSOR | H L | | |
| SPLIT ORIGIN SW. | H L | | |
| SPLIT POSITION SENSOR | | 83h (INS./EJECT.) const. | |
| SLIDE ORIGIN SW. | H L | | |
| INS./EJECT. STANDBY SW. | H L | | |
| SLIDE COMPL. SW. | H L | | |
| INS. DET. SW. | H L | | |
| INS. PRESENCE/ ABSENCE SW. | H L | | |
| EJECT. COMPL. SW. | H L | | |
| PU ORIGIN SW. | H L | | |
| CLAMP REL. SW. | H L | | |
| INS. COMPL. SW. | H L | | |

FIG. 56

| | S | E |
|---|---|---|
| LIFTING MOTOR | CW / F / CCW | |
| SPLIT MOTOR | CW / F / CCW  ⎯⎯max 3sec⎯⎯ | 1.0 msec |
| SLIDE MOTOR | CW / F / CCW | |
| LIFTING ORIGIN SW. | H / L | |
| COUNT SENSOR | H / L | |
| SPLIT ORIGIN SW. | H / L | |
| SPLIT POSITION SENSOR | 83h (INS./EJECT.) ⎯⎯dec.⎯⎯→ | 67h (HOLD REL.) |
| SLIDE ORIGIN SW. | H / L | |
| INS./EJECT. STANDBY SW. | H / L | |
| SLIDE COMPL. SW. | H / L | |
| INS. DET. SW. | H / L | |
| INS. PRESENCE/ABSENCE SW. | H / L | |
| EJECT. COMPL. SW. | H / L | |
| PU ORIGIN SW. | H / L | |
| CLAMP REL. SW. | H / L | |

FIG. 58

| | S | | E |
|---|---|---|---|
| LIFTING MOTOR | CW / / CCW | | |
| SPLIT MOTOR | CW / / CCW | max 5sec | 1.00 msec |
| SLIDE MOTOR | CW / / CCW | | |
| LIFTING ORIGIN SW. | H / L | | |
| COUNT SENSOR | H / L | | |
| SPLIT ORIGIN SW. | H / L | | |
| SPLIT POSITION SENSOR | 9Eh (LOCK REL.) | dec. | 40h (DISC MOUNTED) |
| SLIDE ORIGIN SW. | H / L | | |
| INS./EJECT. STANDBY SW. | H / L | | |
| SLIDE COMPL. SW. | H / L | | |
| INS. DET. SW. | H / L | | |
| INS. PRESENCE/ABSENCE SW. | H / L | | |
| EJECT. COMPL. SW. | H / L | | |
| PU ORIGIN SW. | H / L | | |
| CLAMP REL. SW. | H / L | | |

RECORDING MEDIA ACCOMMODATING APPARATUS INCLUDING A PLAYBACK MECHANISM THAT TRANSFERS MEDIA

BACKGROUND OF THE INVENTION

1. Field of the Invention

The present invention relates to a recording media accommodating apparatus capable of accommodating a plurality of flat-shaped recording media and playing back information recorded on an arbitrarily selected one of the recording media.

2. Description of the Related Art

There have been known heretofore automotive audio systems, navigation systems, and the like, that are equipped with an autochanger facility for accommodating a plurality of recording media, such as compact discs (CDs) or CD-ROMs, and for selecting an arbitrary recording medium and playing back information recorded thereon. In the prior art, for example, Japanese Unexamined Patent Publications JP-A 3-235250 (1991), 6-231559 (1994), and 7-169168 (1995) each disclose a playback apparatus incorporating a magazine for holding a plurality of CDs and capable of selecting an arbitrary one of the CDs for playback. In these prior art apparatuses, the magazine is separated in the direction of CD thickness near the accommodating position in the magazine at which the CD to be played back is stored, thus creating a space for a playback pickup to enter and thereby enabling the CD to be played back in a restricted space. As another example of the prior art, Japanese Unexamined Patent Publication JP-A 5-151763 (1993) discloses an automotive disk player wherein a drive chassis on which a turn table and a pickup are mounted is supported elastically during playback and is locked during disk insertion/ejection.

In Japanese Unexamined Patent Publication JP-A 10-3733(1998), etc. the applicant of the present invention has disclosed a stocker type accommodating apparatus which differs from the magazine type that handles a plurality of recording media in their entirety as they are accommodated therein. As shown in FIG. 61, a stocker 1 as the accommodating apparatus is capable of accommodating, for example, six CDs. The stocker 1 has stocker members 2a, 2a, 2b, 2c, 2d, 2e, and 2f, vertically stacked from bottom to top in this order, each capable of holding one CD. Splitting projections 3a, 3b, 3c, 3d, and 3e are formed on both widthwise sides of the other stocker members 2a, 2b, 2c, 2d, and 2e than the uppermost stocker member 2f. Before separating the stocker 1, the separating projections 3a, 3b, 3c, 3d, and 3e are lined up at the same height, separating slide members 4 are moved, and a stocker member is selected that has the separating projections to be selected by pawls 5. When the separating slide members 4 are moved upward by rotating feed screws 6, the stocker member to which the separating projections selected by the pawls 5 are connected is lifted upward together with the stocker members stacked thereabove, creating a space above the underlying stocker member. The space created by the stocker separation allows a playback pickup, etc. to be inserted therein. A turn table of the thus inserted playback pickup is inserted in the center hole of the CD held on the stocker located above the separated space, and is drawn out in the direction opposite to the direction of insertion, thus readying the CD for playback by the pickup. A slot 7 is formed in each of the stocker members 2a, 2b, 2c, 2d, 2e, and 2f so that the turn table with the CD mounted thereon can be retracted from the separated space into the playback area. Further, each of the stocker members 2a, 2b, 2c, 2d, 2e, and 2f is provided with a spring 8 for holding the CD mounted thereon.

When the playback apparatus equipped with an autochanger facility is an automotive audio apparatus or navigation apparatus, it is preferable that the apparatus be made mountable in the dashboard near the driver's seat. A dashboard mountable apparatus needs to have dimensions conforming to the DIN standard, for example, about 18 cm in width, about 5 cm in height, and about 17 cm in depth. In magazine type accommodating apparatus, trays with disk-shaped recording media such as CDs mounted thereon are housed in a magazine case. Accordingly, sufficient space must be provided so that the magazine case and trays do not contact the playback mechanism when playback is performed within the playback apparatus; this makes it difficult to reduce the size of the apparatus.

In the prior art such as disclosed in Japanese Unexamined Patent Publications JP-A 3-235250 (1991), 6-231559 (1994), and 7-169168 (1995), trays, each for holding one CD, are stacked to construct a magazine or the like. When selecting a CD at a particular position for playback, etc., the magazine is separated between top and bottom at the position of the tray that holds the selected CD, thereby creating a space therebetween. To enable the magazine to be separated by selecting one tray, projections or the like are formed at positions differing at least between adjacent trays, and the appropriate projections are selected to separate the magazine.

In the stocker 1 of FIG. 61 disclosed in Japanese Unexamined Patent Publication JP-A 10-3733 (1998), the separating projections 3a to 3e are formed at positions differing between the respective stocker members 2a to 2e.

When the positions of the separating projections 3a to 3e are different for the different stocker members 2a to 2f forming the stocker 1, as in the case of FIG. 61, the stocker members 2a to 2f otherwise identical in construction have to be made separately so that they have the separating projections 3a to 3e at the respectively different positions. That is, in the case of the stocker 1 capable of accommodating six CDs, six kinds of stocker members 2a to 2f, including the uppermost stocker member 2f having no separating projections, must be used.

When the stocker members 2a and 2f are to be formed from synthetic resin, as many as six kinds of stocker members 2a to 2f with the positions of the separating projections 3a to 3e slightly displaced from one member to another have to be prepared; this increases the mold cost as well as the time and trouble consumed for parts management.

In the prior art such as shown in FIG. 61, the CD mounted on each of the stocker members 2a, 2b, 2c, 2d, 2e, and 2f must be held firmly by the spring 8 or the like so that the mounted CD does not come off accidentally. On the other hand, when ejecting a CD from the stocker 1, the CD has to be withdrawn by overcoming the pressing force of the spring 8. This necessitates the provision of a mechanism for pressing a CD into the stocker 1 when loading and for withdrawing a CD from the stocker 1 when ejecting; this increases the component count, making it difficult to reduce the overall size.

SUMMARY OF THE INVENTION

It is an object of the present invention to provide a recording media accommodating apparatus that can be made simple and compact in construction.

The invention provides a recording media accommodating apparatus having a plurality of accommodating positions arranged along a recording media thickness direction for individually accommodating substantially disk-shaped recording media, the apparatus comprising:

- a housing containing therein the accommodating apparatus, provided with an insertion/ejection slot through which the recording media are inserted or ejected one at a time;
- a plurality of holders disposed at the respective accommodating positions, separable in the thickness direction at an arbitrary accommodating position, each holder being capable of holding one recording medium; and
- a playback mechanism for playing back information recorded on the recording media, the playback mechanism being capable of moving into a space created by the holder separation and transferring the recording media to and from the holders and also capable of moving to a position near the insertion/ejection slot and transferring the recording media to and from the insertion/ejection slot.

According to the invention, the accommodating apparatus includes a plurality of holders disposed at the respective accommodating positions and separable in the thickness direction at an arbitrary accommodating position, each holder being capable of holding one recording medium. The holder separation results in the creation of a space, allowing the playback mechanism to move into the space for playback of the information recorded on the selected recording medium. Since the playback mechanism is capable of transferring the recording media to and from the holders and also capable of moving to a position near the insertion/ejection slot and transferring the recording media to and from the insertion/ejection slot, the playback and transportation of the recording media can be performed by making effective use of the space within the housing and, therefore, the accommodating apparatus can be made simple and compact in construction.

According to the invention, when each individual recording medium is inserted through the insertion/ejection slot of the housing, the recording medium is transferred to the playback mechanism which can then play back the information recorded thereon, transfer the recording medium for accommodating in the accommodating position of a designated holder, or eject the same through the insertion/ejection slot.

In the invention the recording media accommodating apparatus further comprises a separating member which enters between holders in the same direction as the direction of the movement of the playback mechanism entering between the accommodating positions of the holders, and thereby widens the gap between the holders and creating a space therebetween;

- a selection mechanism for moving the plurality of holders in its entirety along the thickness direction, and for selecting the position at which the separating member enters between the holders; and
- a separating mechanism for causing the separating member to enter between the holders and thereby separating the holders.

According to the invention, the selection mechanism moves the entire holder assembly along the holder stacking direction to align the selected accommodating position with the separating member, upon which the separating member widens the gap between the holders and creates the space. Since the holders located above and below the position selected by the selection mechanism are selected as the holders to be separated by the separating member, the holders can be separated from each other even if the holders are identical in shape.

As described above, according to the invention, the selection mechanism selects the accommodating position at which the accommodating apparatus is to be separated, and the separating member is caused to enter the selected accommodating position and widens the gap between the holders to create a space, allowing the playback mechanism to move into the thus created space. Since the separating position is determined by moving the accommodating apparatus along the holder stacking direction, the plurality of holders forming the accommodating apparatus can be constructed using identical members, and the construction can thus be made simple and compact.

The invention is also characterized in that the separating member is provided on each side of the holder assembly as a pair.

According to the invention, since the separating member is provided on each side of the holder assembly as a pair, the accommodating apparatus can be separated reliably by working from both sides of the holder assembly.

Further, according to the invention, since the accommodating apparatus is separated by working from both sides of the holder assembly, the accommodating apparatus can be separated reliably.

The invention is also characterized in that the recording media are of a disk-like shape, and in that the holders are substantially semicircular in shape, each holder being constructed to accommodate a recording medium in a substantially horizontal position, and having an opening facing the direction of the movement of the playback mechanism and separating guide portions with which the separating members engage to separate the accommodating apparatus.

According to the invention, a disk-shaped recording medium, for example, a CD, is mounted on each of the substantially semicircular holders in such a manner as to hold the outer circumferential edge thereof, and the accommodating apparatus can be separated by causing the separating members to engage the separation guide portions formed on both widthwise sides of the holder, and by widening the gap between the holders in this condition.

Furthermore, according to the invention, since such a semicircular holder is used as the holder for holding a disk-shaped recording medium in a substantially horizontal position, the space that the holders occupy can be reduced, achieving efficient utilization of the space. Further, since each holder is provided at both widthwise sides thereof with the separation guide portions with which the pair of separating members engage, the accommodating apparatus can be separated reliably.

The invention is also characterized by the provision of a driving source for driving the pair of separating members so that the separating members simultaneously enter between the holders.

According to the invention, since the pair of separating members provided at both widthwise sides are simultaneously driven by the same driving source to enter between the holders, the accommodating apparatus can be separated reliably.

Further, according to the invention, since the pair of separating members provided at both widthwise sides are simultaneously driven by the same driving source, the accommodating apparatus can be separated by working from both widthwise sides by controlling a single driving source.

The invention is also characterized in that the separating mechanism further comprises transmission mechanisms of identical construction for transmitting driving force from the driving source to the pair of separating members.

According to the invention, since the driving force for driving the pair of separating members provided at both widthwise sides is transmitted from the common driving source via the transmission mechanisms of identical construction, the separation action of the accommodating apparatus achieved by widening the gap between the holders can be performed uniformly without tilting toward one side or the other by working from both widthwise sides. Accordingly, when playing back a recording medium by keeping the playback mechanism in a floating condition, for example, a uniform gap can be provided around the periphery of the recording medium being played back.

Further, according to the invention, since the transmission mechanisms via which the driving force from the common driving source is transmitted to the separating members on both sides are of identical construction, the accommodating apparatus can be separated equally at both widthwise sides by driving the separating members, and the gap between the holders can thus be widened reliably, ensuring the formation of a uniform gap with respect to the recording medium being played back.

The invention is also characterized by the provision of a spring for urging the plurality of holders toward one side of the stacking direction.

According to the invention, since the holders are urged by the spring toward one side of the stacking direction, the holders are pressed by the spring against the separating members entering between the holders and trying to widen the gap therebetween, so that the gap between the holders can be maintained at a value set by the separating members.

Further, according to the invention, since the plurality of holders are urged toward one side of the stacking direction, when causing the separating members to enter between the holder the gap between the holders can be varied reliably to match the separating members.

The invention is further characterized in that the separating members are provided with a pressing portion for elastically pressing a portion contacting one of the holders to be separated, of those portions which come into contact with the holders when the separating members enter between the holders to widen the gap therebetween.

According to the invention, since the separating members are provided with the pressing portion for elastically pressing the portion contacting one of the holders to be separated when entering between the holders to widen the gap therebetween, the section of the accommodating apparatus that contains other recording media than the one to be played back by the playback mechanism can be held pressed firmly.

Further, according to the invention, since one of the holders to be separated can be pressed by the pressing portion of the separating members, the holder can be held pressed so as not to interfere with the operation of the playback mechanism when handling the recording medium.

The invention is also characterized in that the separating mechanism moves the separating members so that one of the holders located in the separated space is displaced in the stacking direction after the playback mechanism has entered the space.

According to the invention, since the holder holding the recording medium to be played back by the playback mechanism can be displaced in the stacking direction by further moving the separating members after the playback mechanism has entered the space created by separating the accommodating apparatus, the transfer of the recording medium held on the holder to the playback mechanism and the transfer of the recording medium played back by the playback mechanism to the holder can be performed easily and reliably.

Further, according to the invention, after the playback mechanism has entered the space created by separating the accommodating apparatus by the separating members, the recording medium can be transferred between the playback mechanism and the holder by moving the holder along the stacking direction.

The invention is also characterized in that the separating members have cam faces for displacing the one and the other holder in the space in the stacking direction as the separating members are moved in the direction of insertion.

According to the invention, since the holders can be displaced in the stacking direction by the cam faces of the separating members after the recording medium has entered the separated space, the mechanical construction can be simplified.

Further, according to the invention, since the separating members are provided with the cam faces for displacing the holders in the stacking direction, the holders can be displaced in the stacking direction just by moving the separating members in the direction of insertion.

The invention is also characterized in that the separating members have cams for displacing the playback mechanism in the stacking direction;

According to the invention, the playback mechanism can be displaced by the cams in the stacking direction by moving the separating members.

Further, according to the invention, the playback mechanism can be also displaced in the stacking direction of the holders by the cams of the separating members. Since the playback mechanism and the holders can be displaced in the stacking direction just by moving the separating members, the transfer of the recording medium between the playback mechanism and the holder and the playback of the recording medium by the playback mechanism can be performed after displacing them in the stacking direction.

The invention is also characterized in that the separating mechanism is provided with a cam member for displacing the playback mechanism in the stacking direction in interlocking fashion with the holder separation action performed by the separating members.

According to the present invention, since the playback mechanism can be displaced in the stacking direction by the cam member interlocking with the separating members, the recording medium can be transferred smoothly between the playback mechanism and the holder by combining the displacement of the playback mechanism in the stacking direction with the displacement of the holders in the stacking direction accompanying the separation of the accommodating apparatus.

Further, according to the invention, within the space formed by the separating members the playback mechanism can be displaced in the stacking direction in interlocking fashion with the movement of the separating members in the direction of insertion, thereby moving the playback mechanism to the position suitable for the transfer or the playback of the recording medium.

In the invention the recording media accommodating apparatus further includes a top plate which is disposed in such a manner as to cover the holder located at one end of the thickness direction and which has a notch opening in the direction of recording media ejection.

According to the invention, the accommodating apparatus for recording media is constructed by stacking a plurality of holders with the top plate provided in such a manner as to cover the holder located at one end of the thickness direction. Each holder is capable of holding one recording medium. The stacked holders are separable in the thickness direction at an arbitrary level of the stack. The pickup or the like of the playback mechanism for playing back a recording medium is moved into the space created by separating the holders. In this condition, the stored recording medium can be mounted on the turn table by moving the turn table upward. The top plate disposed in such a manner as to cover the uppermost holder has a notch opening in the direction in which the recording medium is withdrawn. When the recording medium accommodated in the holder located at one end of the thickness direction is mounted on the turn table or the like for playback of the recorded contents, when the gap between the top plate and the holder is limited, no interference is caused to the action of the turn table or the like because the notch is formed in the top plate. This serves to reduce the overall thickness of the accommodating apparatus.

Further, many recording media can be stored within the limited range of thickness.

As described above, according to the invention, the accommodating apparatus for recording media is constructed by stacking the plurality of holders and by covering one end of the thickness direction with the top plate. Each holder is capable of holding one recording medium inserted therein, and the thus inserted recording medium can be withdrawn in the direction opposite to the direction of insertion. Since the holders are separable at an arbitrary level of the stack, the playback mechanism can be moved into the space created by separating the holders, and the recording medium can be played back by mounting it on the turn table or the like. Since the top plate is provided with the notch opening in the direction in which the recording medium is withdrawn, when the recording medium accommodated in the holder located at one end of the thickness direction is mounted on the turn table or the like, the turn table or the like does not touch the top plate. Accordingly, the construction can be made compact by reducing the thicknesses of the top plate and holders and thereby reducing the overall thickness of the stack. Furthermore, many recording media can be stored inside the housing of limited thickness.

The invention is also characterized in that each holder has a pawl which is formed at least on a portion of a wall surface holding the recording medium, and which serves to retain the recording medium in place by covering a portion of a surface of the recording medium only when an edge face of the recording medium is pressed against the holder.

According to the invention, since each holder has a pawl which is formed at least on a portion of a wall surface holding the recording medium, and which serves to retain the recording medium in place by covering a portion of a surface of the recording medium only when an edge face of the recording medium is pressed against the holder, the recording medium which is not selected for playback and which may accidentally come off the holder can be easily retained in place by pressing it against the holder. When the recording medium is not pressed in the direction of insertion, the retention pawl does not cover a portion of the surface of the recording medium; therefore, the recording medium, when it is to be played back, can be easily withdrawn from the holder.

Further, according to the invention, since the pawl covers a portion of the surface of the recording medium when an edge face thereof is pressed against the holder, the recording medium which is not selected for playback and which may accidentally come off the holder can be easily retained in place.

When withdrawing the recording medium from the holder, since the pawl does not contact the recording medium when the latter is not pressed, the recording medium can be easily withdrawn.

The invention is also characterized by the provision of a spring for urging the top plate and the plurality of holders toward the other end of the stacking direction.

According to the invention, the top plate and the plurality of holders are urged by the spring toward the other end of the stacking direction. As a result, in the accommodating apparatus, the top plate and the plurality of holders are urged by the spring in intimately contacting relationship, so that as long as separation is not carried out, the thickness of the stack is held at a minimum, achieving efficient utilization of the space within the housing.

Further, according to the invention, the thickness of the accommodating apparatus can be held to a minimum by urging the top plate and the plurality of holders toward the other end of the stacking direction.

The invention is also characterized in that the spring is a long, thin coil spring whose ends are attached to the top plate and whose other portions are run over outside edges of the stacked holders and a bottom of the housing.

According to the invention, since the long, thin coil spring extending from the top plate is run over the outside edges of the stacked holders and the bottom of the housing, when the holder stack is separated, the length by which the coil is stretched is small compared to its overall length; therefore, even when the holder stack is separated, the change in the spring constant is small and the spring urging force can be applied throughout.

Further, according to the invention, since the long, thin coil spring is attached at both ends to the top plate and the other portions of the coil are run over the outside edges of the stacked holders and the bottom of the housing, the overall length of the coil can be reduced, and when the holder stack is separated, appropriate spring urging force can be maintained by securing sufficient stroke of spring stretching.

The invention is also characterized by the provision of a pressing member for pressing at least the recording medium to the holder located on the other side of the separated space in the stacking direction when the holder stack is separated.

According to the invention, since the recording medium located on the other side of the separated space in the stacking direction is pressed against the holder by the pressing member, the recording medium can be prevented from coming off the holder.

Further, according to the invention, when creating a space by separating the holder stack, the recording medium mounted on the holder located on the other side of the space in the stacking direction can be pressed against the holder by the pressing member to reliably preventing it from coming off the holder.

The invention is also characterized by the provision of a separating mechanism for separating the holder stack in interlocking fashion with the pressing action of the pressing member.

According to the invention, when the separating mechanism splits the holder stack to create a space therebetween, the pressing member can, at the same time, press the recording medium mounted on the holder located on the other side of the space in the stacking direction.

Further, according to the invention, since the pressing member performs the pressing action in interlocking fashion with the separating mechanism which separates the holder stack, the pressing force can be applied when necessary and at an appropriate timing to prevent the recording medium from coming off the holder.

The invention is also characterized in that the separating mechanism includes a separating member which enters between the holders to widen the gap therebetween.

According to the invention, the holder stack is separated by using the separating member which enters between the holders to widen the gap therebetween. Since the pressing member is formed integral with the separating member, the separation action and the pressing action after the separation can be can be performed reliably in interlocking fashion.

Further, according to the invention, since the pressing member is formed integral with the separating member which enters between the holders to widen the gap therebetween, the mechanism for interlocking the separation action with the pressing action can be simplified.

The invention is also characterized in that the pressing member is disposed in such a manner as to press a recording medium in a predetermined position within the housing, and the stacked holders and the top plate are moved along the stacking direction so that the accommodating position of the recording medium to be pressed can be selected.

According to the invention, since the pressing member is disposed in such a manner as to press the recording medium in a predetermined position within the housing, and the stacked holders and the top plate are moved along the stacking direction so that the accommodating position of the recording medium to be pressed can be selected, the function of selecting the holder to be separated or pressed can be separated from the mechanism for performing the separation action, the mechanism can be simplified and the overall construction can be made compact.

Further, according to the invention, since the position at which the accommodating apparatus is to be separated by the separating mechanism can be selected by moving the accommodating apparatus up and down, and the accommodating apparatus can be separated at the selected position, the construction can be simplified by separating the selection mechanism from the separating mechanism.

The invention is also characterized in that the pressing member has a shape capable of pressing an edge face of the recording medium and covering at least a portion of the upper face of the recording medium when pressing.

According to the invention, since the pressing member has a shape capable of pressing an edge face of the recording medium and covering at least a portion of the upper face of the recording medium when pressing, the recording medium located below the separated space can be firmly pressed by the pressing member to prevent it from coming off the holder.

Further, according to the invention, since the pressing member is capable of pressing the edge face and at least a portion of the surface of the recording medium when pressing the recording medium to prevent it from coming off the holder, if external vibrations or the like are applied, the recording medium can be held firmly and prevented from coming off the holder.

The invention is also characterized in that each holder has a wall, opening in one direction, for holding the accommodated recording medium circumferentially along a length greater than a semicircular length.

According to the invention, each holder has a wall, opening in one direction, for holding the inserted recording medium circumferentially along a length greater than a semicircular length. A wide space is formed radially inwardly, achieving a reduction in the weight of the entire holder.

Further, according to the invention, each holder has a shape necessary to mount and hold a recording medium thereon, and a reduction in weight can be achieved.

The invention is also characterized in that each holder is provided with a projection along an outer circumference thereof for holding the recording medium mounted thereon.

According to the invention, since the projection is provided along the outer circumference of the holder for mounting the recording medium, displacement of the mounted recording medium in the outer circumferential direction can be prevented, thus preventing positional displacement from the stored position.

Further, according to the invention, the recording medium mounted on the holder can be prevented from displacing in the outer circumferential direction.

The invention is also characterized in that each holder has a projection formed on one surface thereof in the stacking direction, which projection is located outside the mounting area of the recording medium, and a recessed portion formed in the other surface thereof, for engaging with the projection formed on the holder on the other side when the holders are stacked together, and in that the top plate has a recessed portion or a projection for engaging with the projection or the recessed portion formed on the uppermost holder when stacked together.

According to the invention, each holder has a projection formed on one surface thereof in the stacking direction, the projection located outside the mounting area of the recording medium, and a recessed portion which engages with a projection. Further, the top plate has a recessed portion or a projection which engages with the projection or the recessed portion formed on the uppermost holder when stacked together; as a result, when the top plate and the holders are stacked together, the projections engage with the recessed portions, thus preventing displacement between the top plate and the holders.

Further, according to the invention, positional displacement can be prevented when stacking the top plate and the holders.

BRIEF DESCRIPTION OF THE DRAWINGS

Other and further objects, features, and advantages of the invention will be more explicit from the following detailed description taken with reference to the drawings wherein:

FIGS. 8A to 8I are simplified cross sectional side views showing a sequence of operations for playing back a CD 24 in the CD playback apparatus 21 of FIG. 1.

Figure 1:
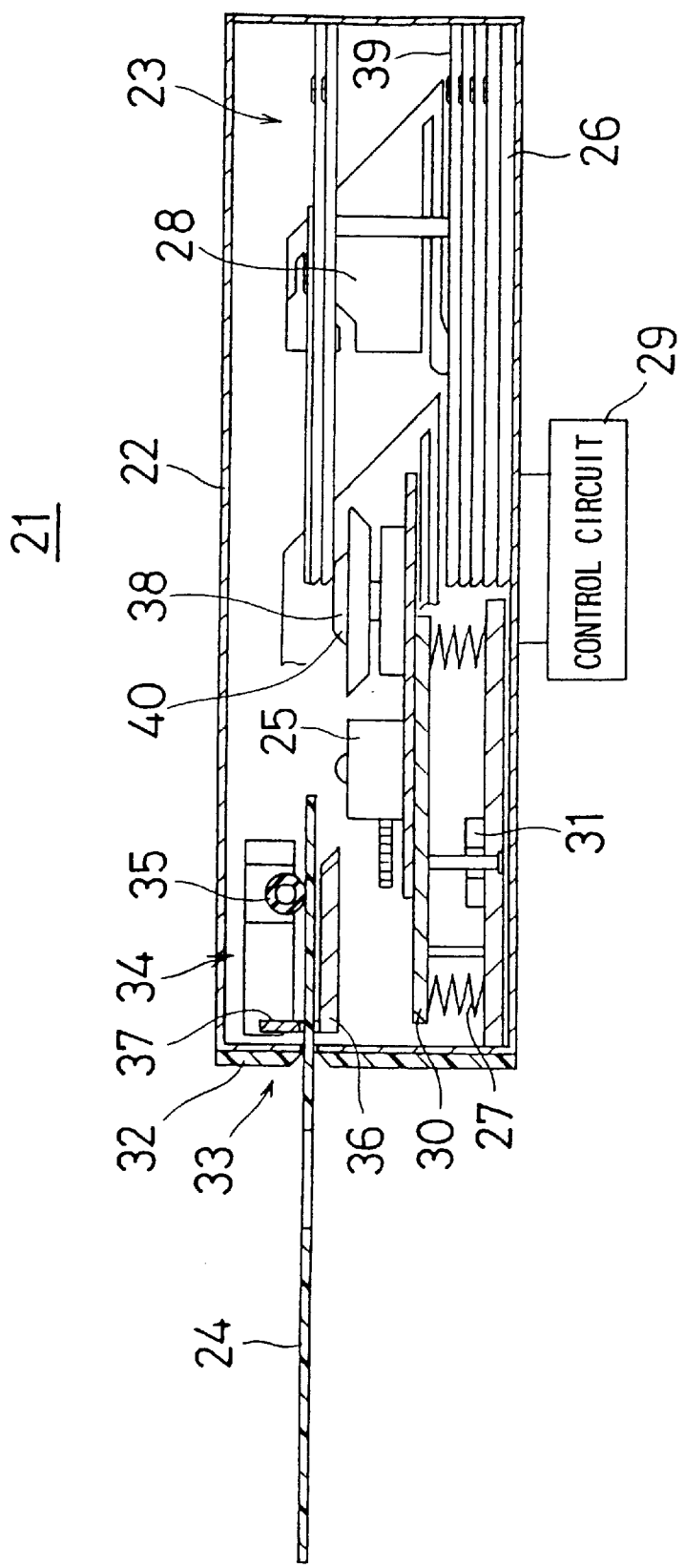
FIG. 1 is a cross sectional side elevation view showing diagrammatical the construction of a CD playback apparatus 21 according to one embodiment of the present invention.
Figure 10:
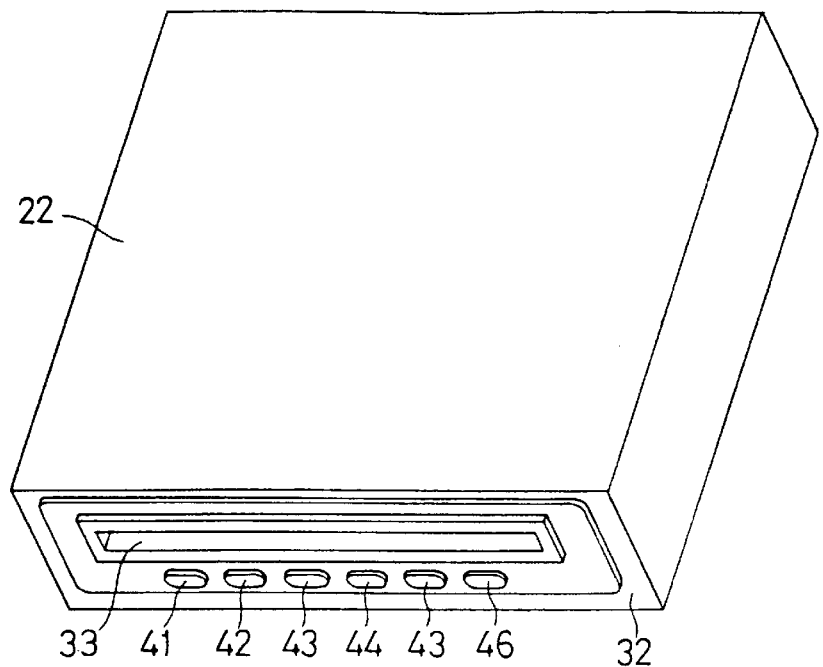

FIG. 10 is a perspective view of a housing 22 of the CD playback apparatus 21 shown FIG. 1.

Figure 11:
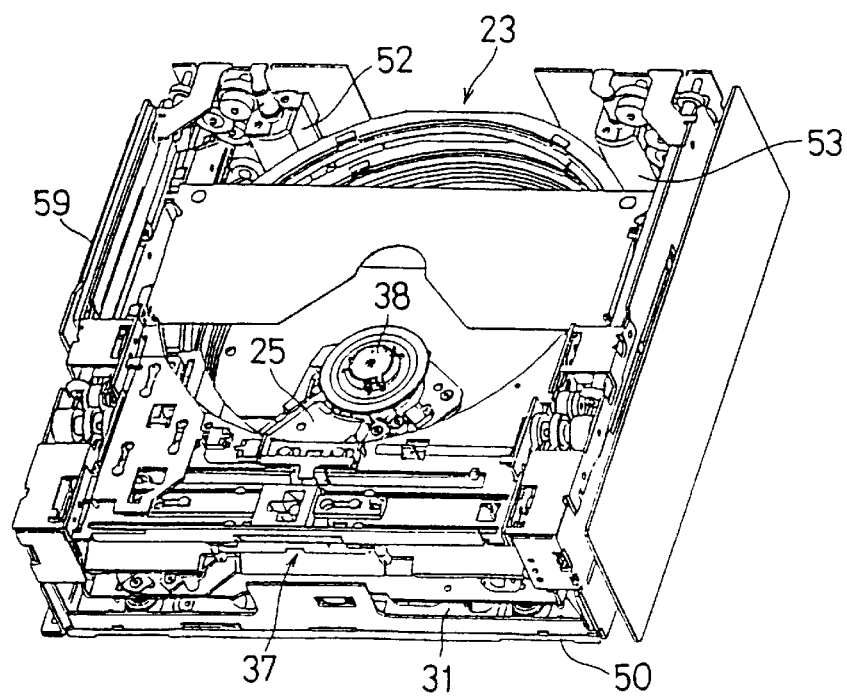

FIG. 11 is a perspective view showing a mechanism section with the housing 22 of FIG. 10 removed.

Figure 12:
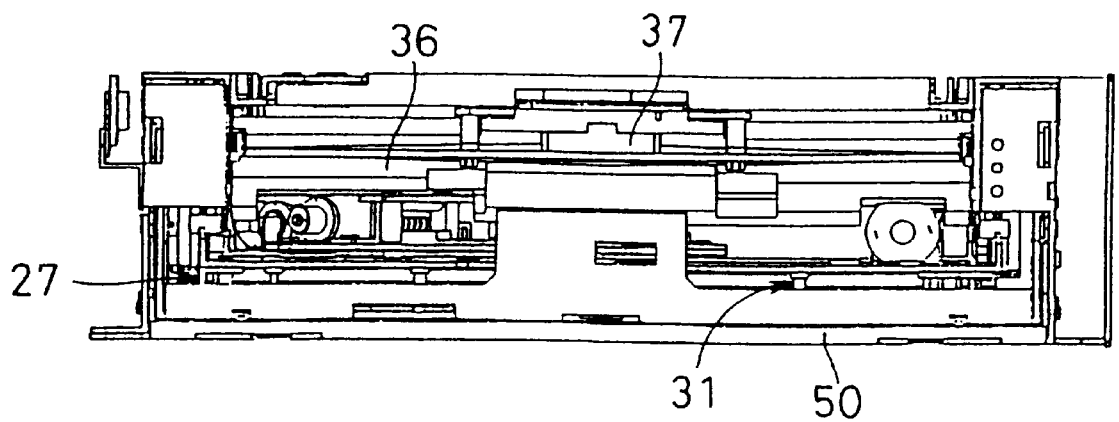

FIG. 12 is a front view of the mechanism section of FIG. 11.

Figure 13:
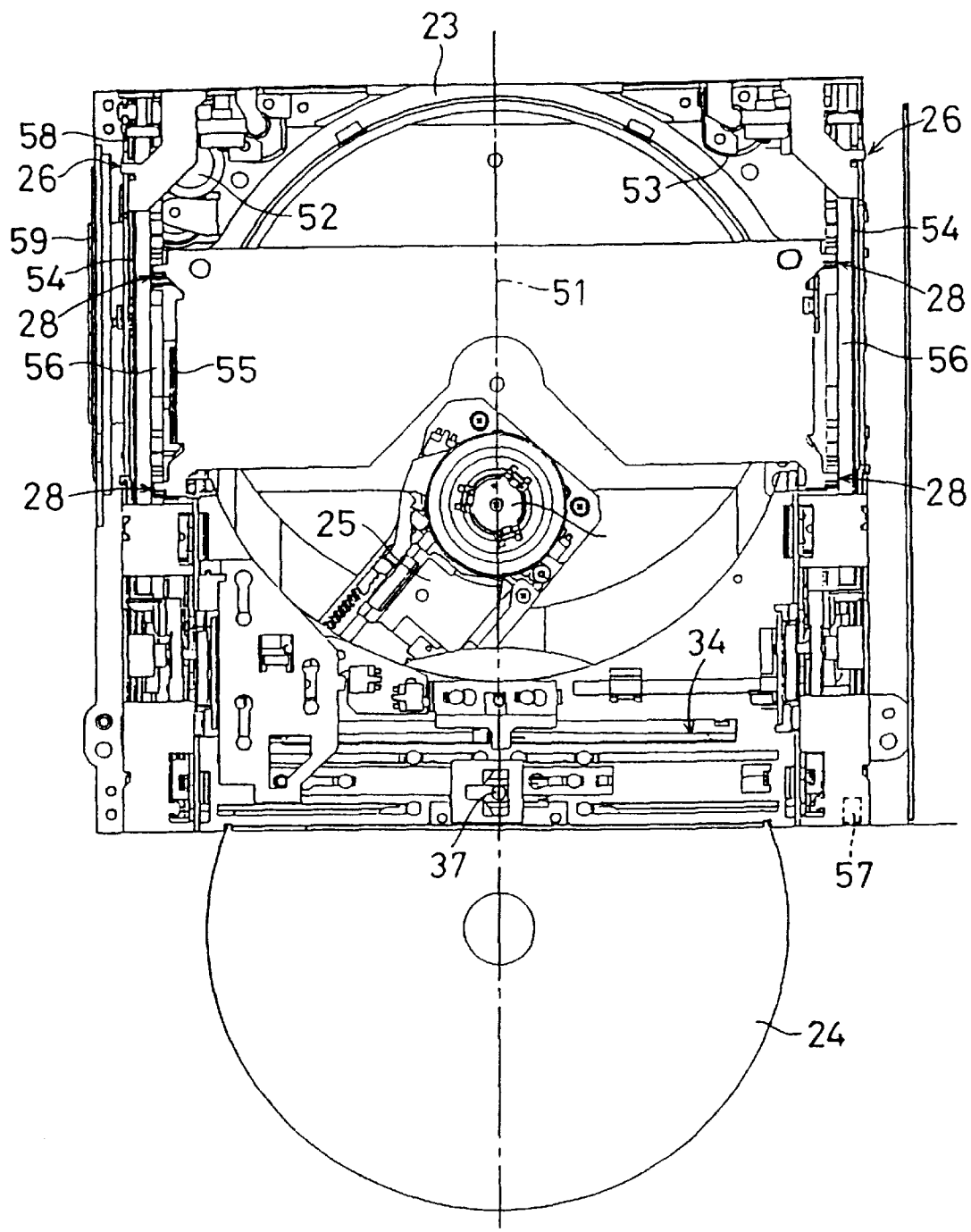

FIG. 13 is a plan view of the mechanism section of FIG. 11.

Figure 14:
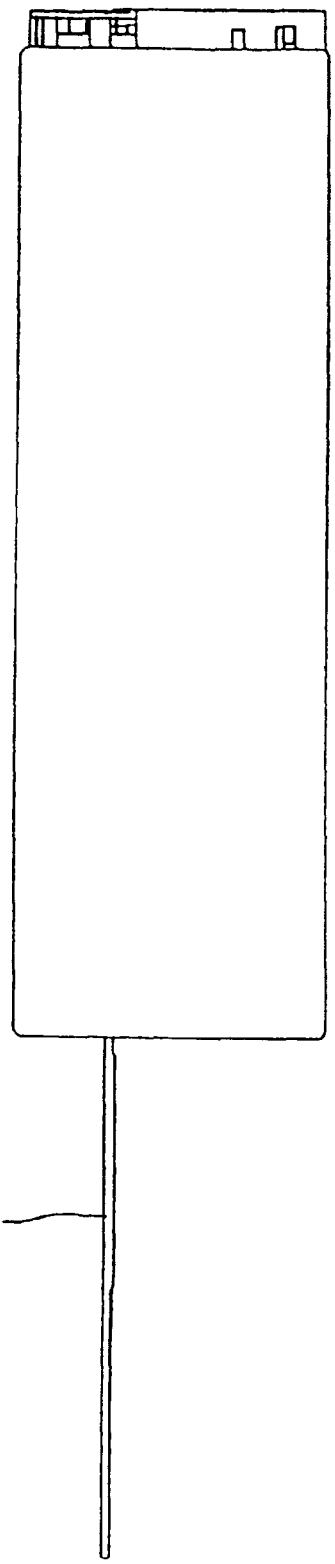

FIG. 14 is a right-side view of the mechanism section of FIG. 11.

Figure 15:
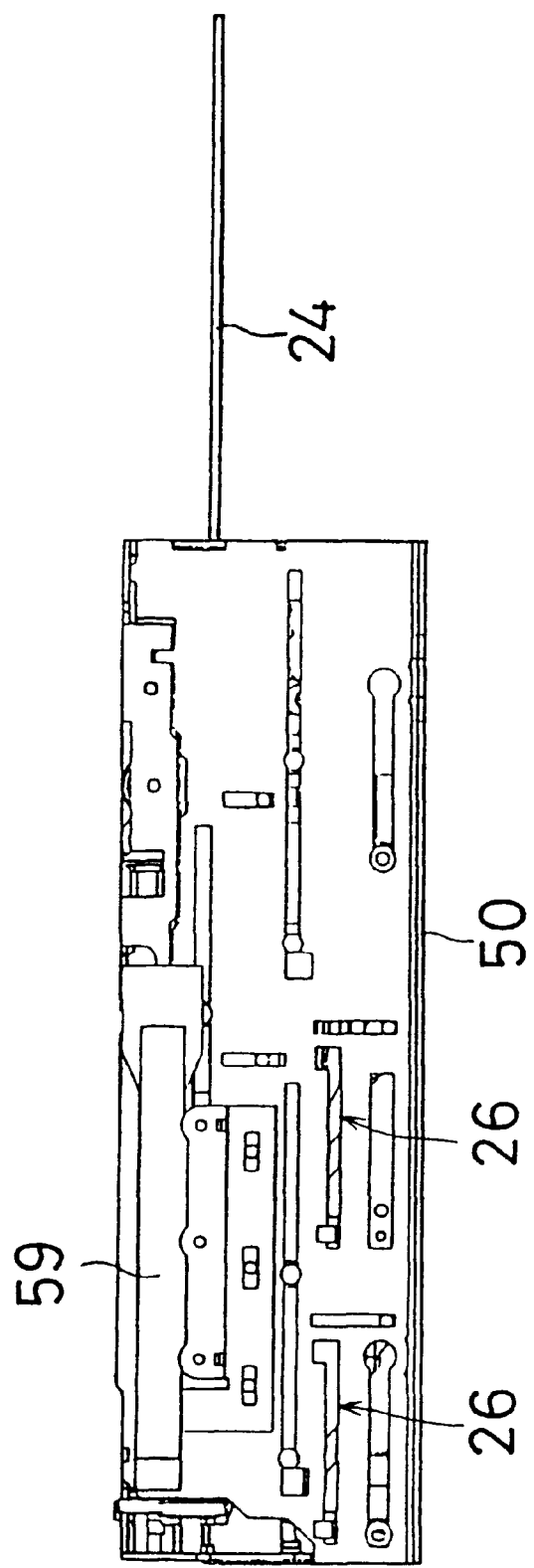

FIG. 15 is a left-side view of the mechanism section of FIG. 11.

Figure 16:
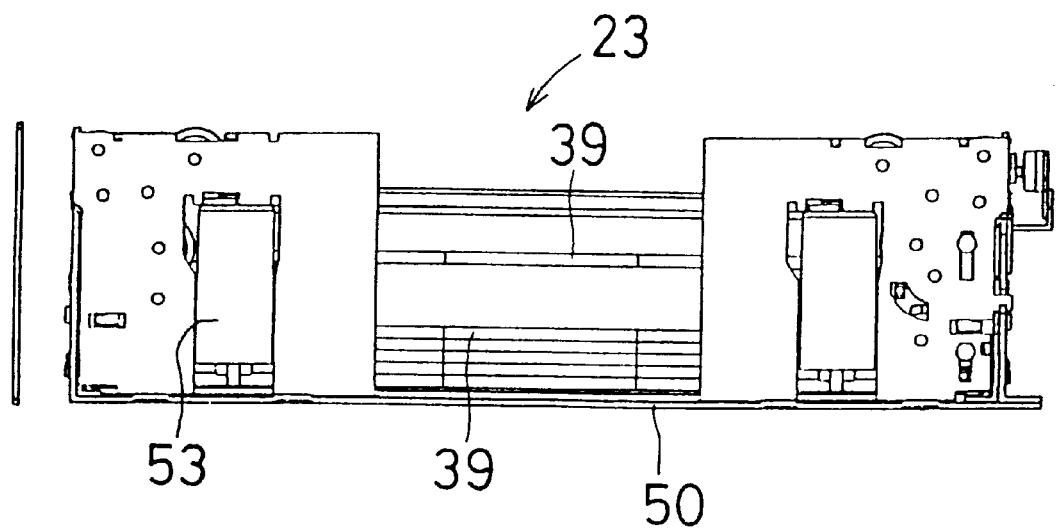

FIG. 16 is a rear view of the mechanism section of FIG. 11.

Figure 17:
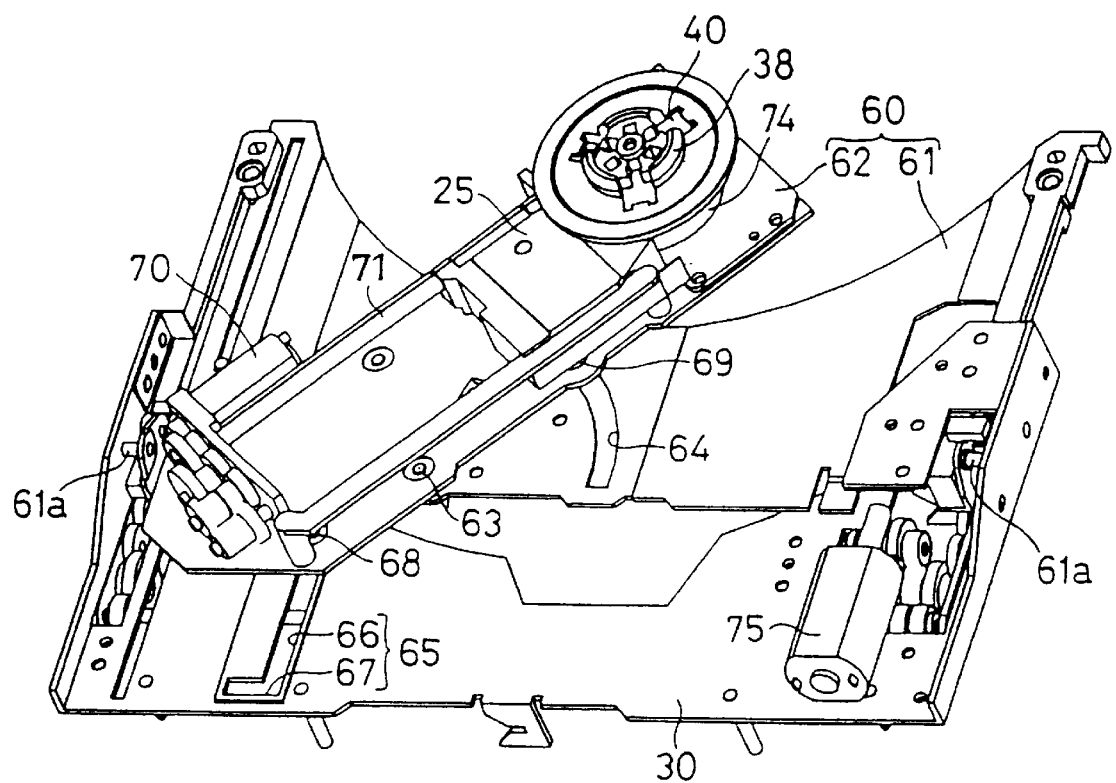

FIG. 17 is a perspective view of a slide unit 60.

Figure 18:
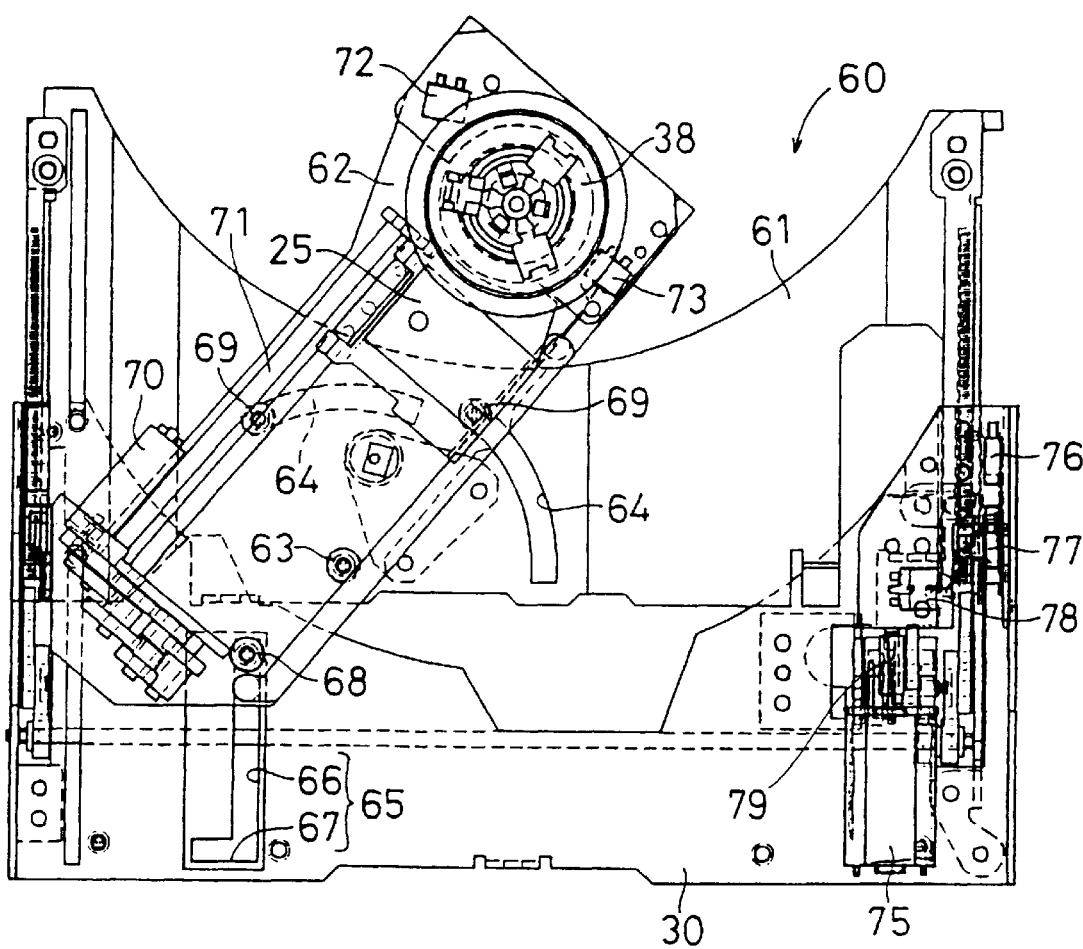

FIG. 18 is a plan view of the slide unit 60 of FIG. 17.

Figure 19:
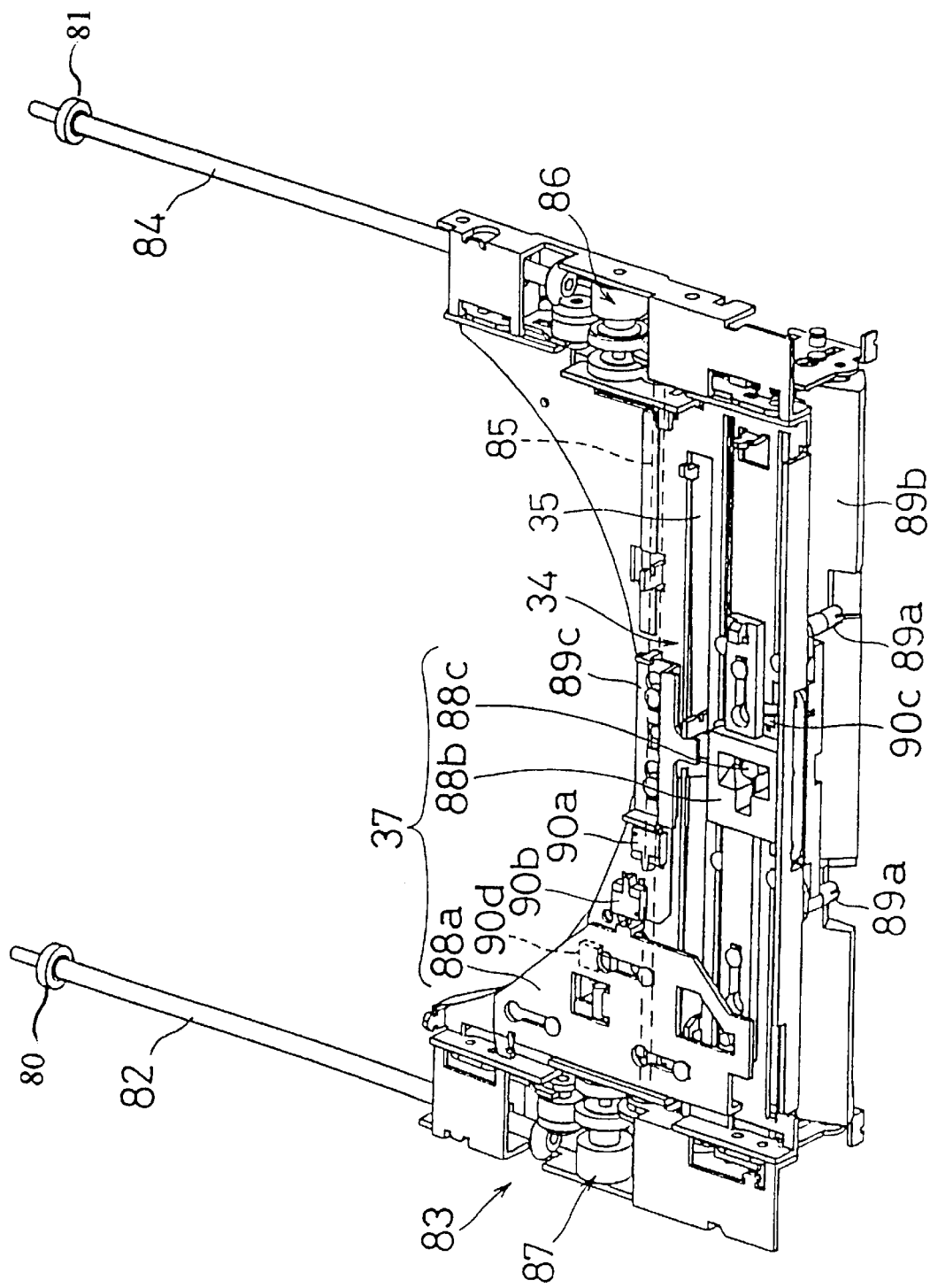

FIG. 19 is a perspective view of a transport mechanism 34 in FIG. 1.

Figure 20:
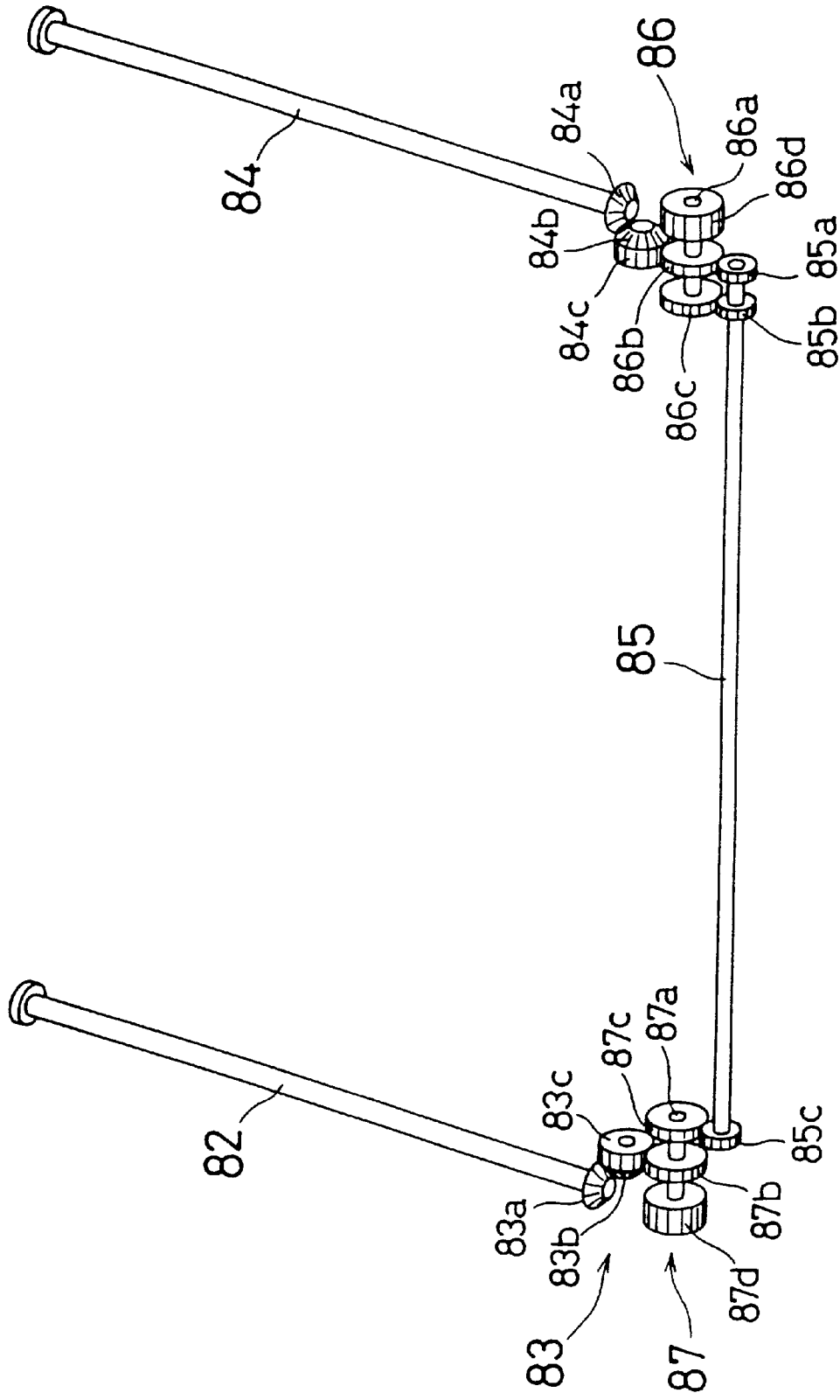

FIG. 20 is a simplified perspective view of gear mechanisms 83, 86, and 87 shown in FIG. 19.

Figure 21:
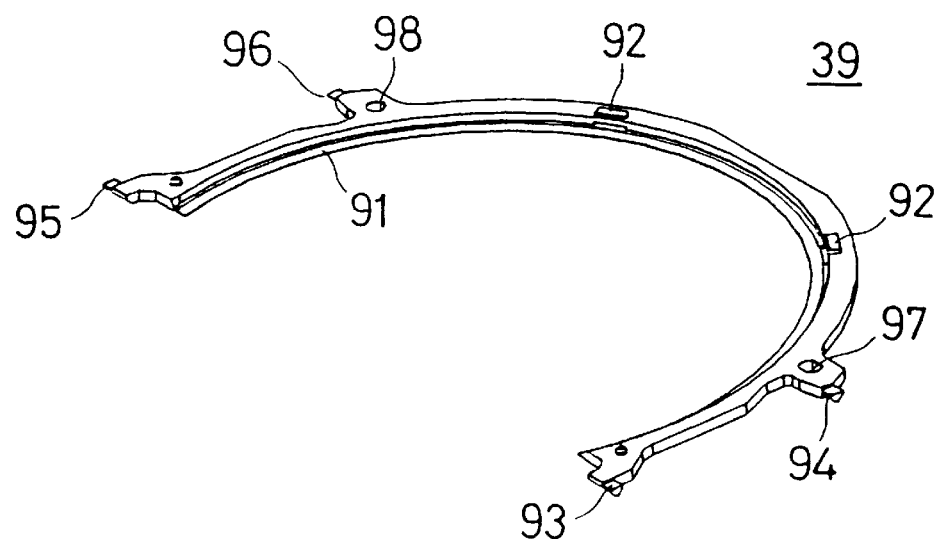

FIG. 21 is a perspective view of a holder 39 constituting part of the stocker 23 shown in Fig; 1.

Figure 22:
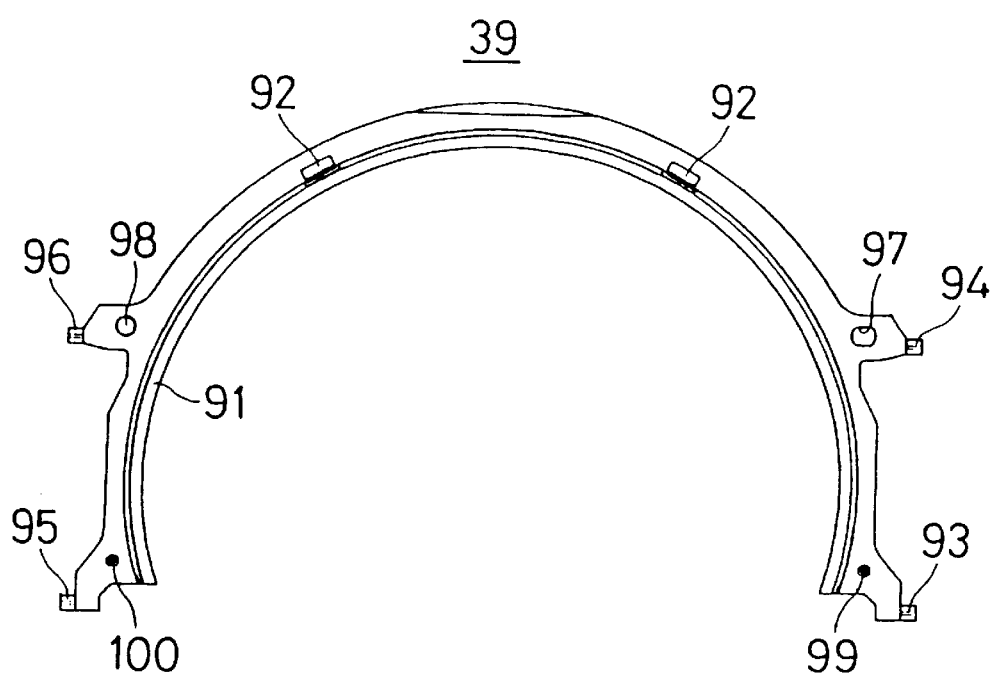

FIG. 22 is a plan view of the holder 39 of FIG. 21.

Figure 23:
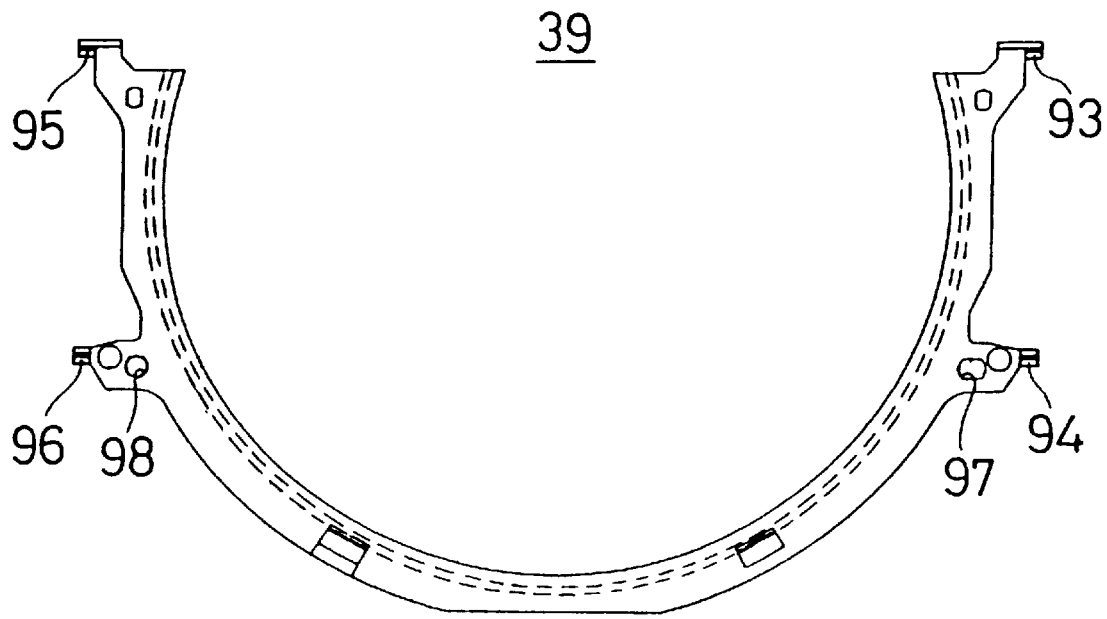

FIG. 23 is a bottom view of the holder 39 of FIG. 21.

Figure 24A:
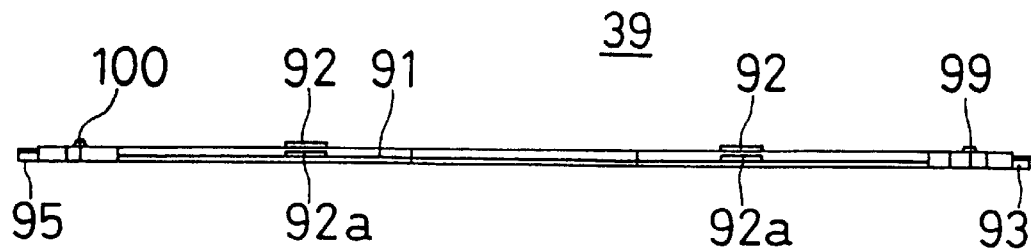
Figure 24B:
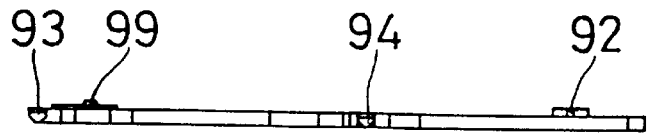

FIG. 24A is a diagram showing the holder 39 of FIG. 21 as viewed from the front, and FIG. 24B is a diagram showing the holder 39 of FIG. 21 as viewed from the right-hand side.

Figure 25A:
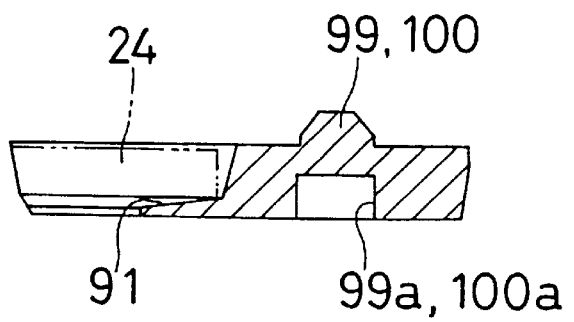
Figure 25B:
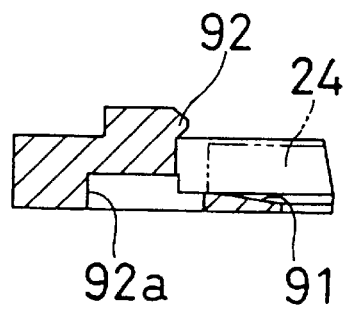
Figure 25C:
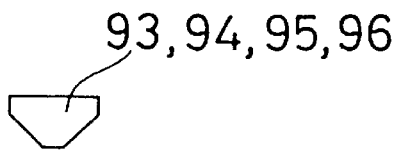

FIGS. 25A and 25B are diagrams showing, partly in cross section, the holder 39 of FIG. 21, and FIG. 25C is a diagram showing, partly in cross section, the holder 39 of FIG. 21.

Figure 26:
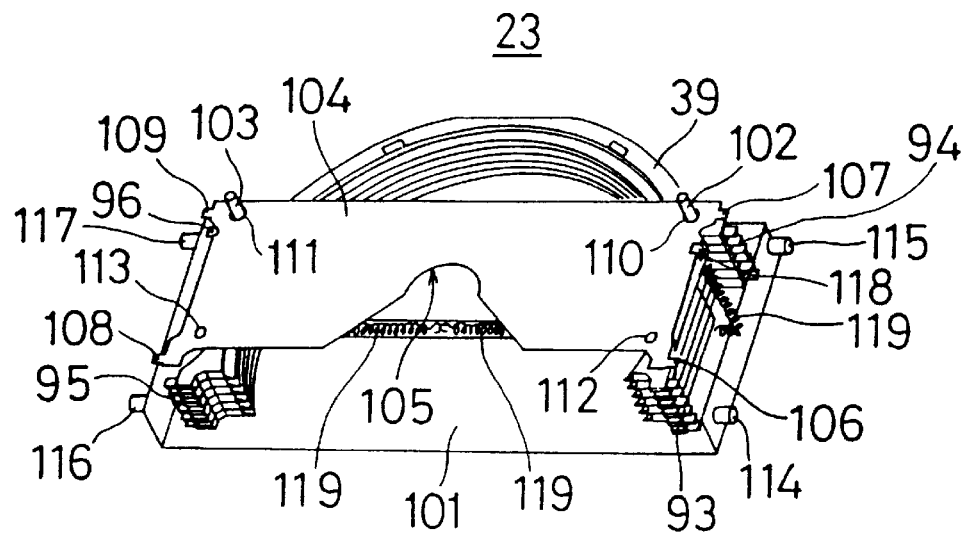

FIG. 26 is a perspective view of the stocker 23 constructed by stacking the holders 39 of FIG. 21.

Figure 27:
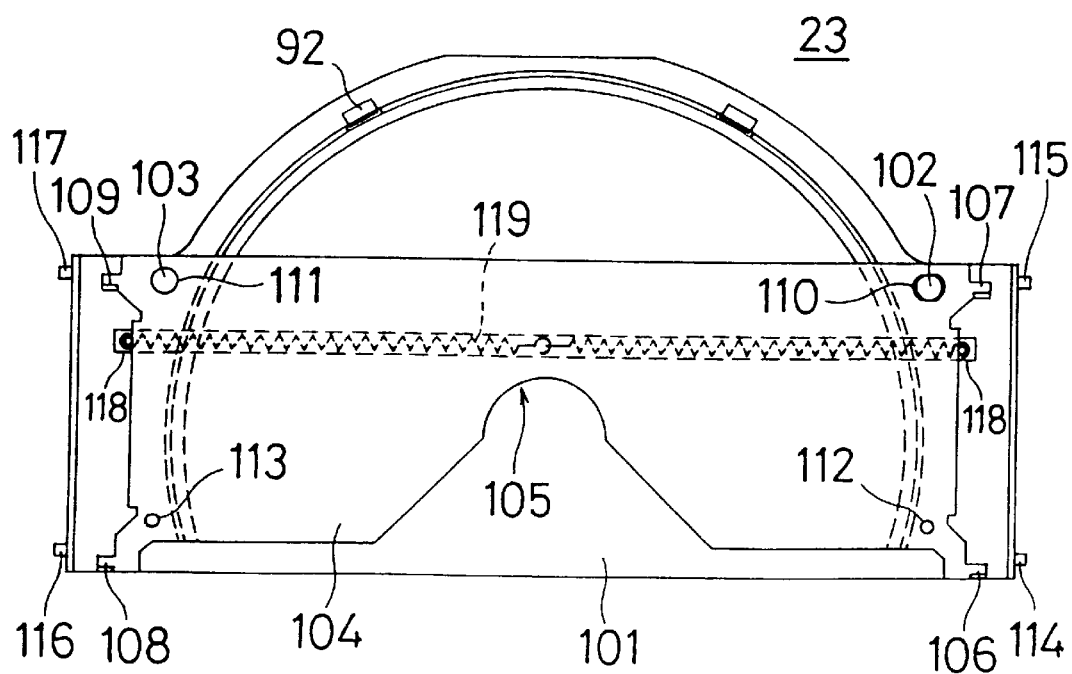

FIG. 27 is a plan view of the stocker 23 of FIG. 26.

Figure 28:
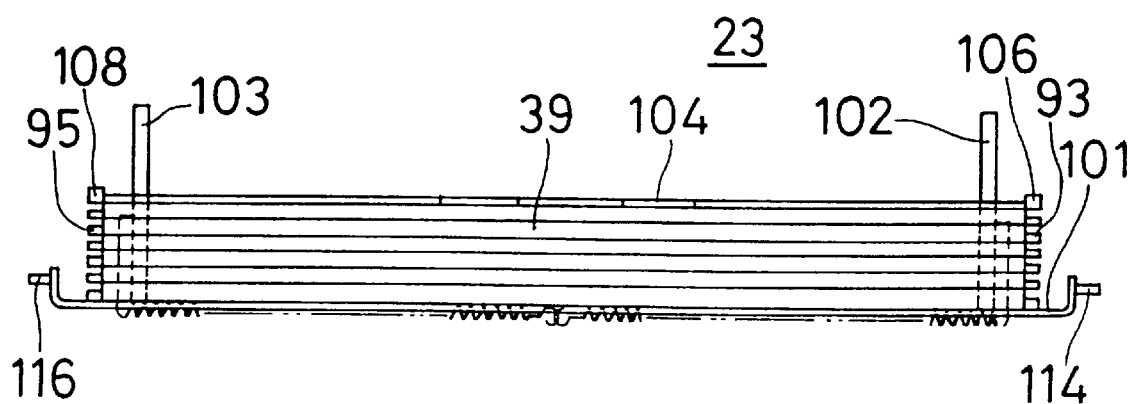

FIG. 28 is a front view of the stocker 23 of FIG. 26.

Figure 29:
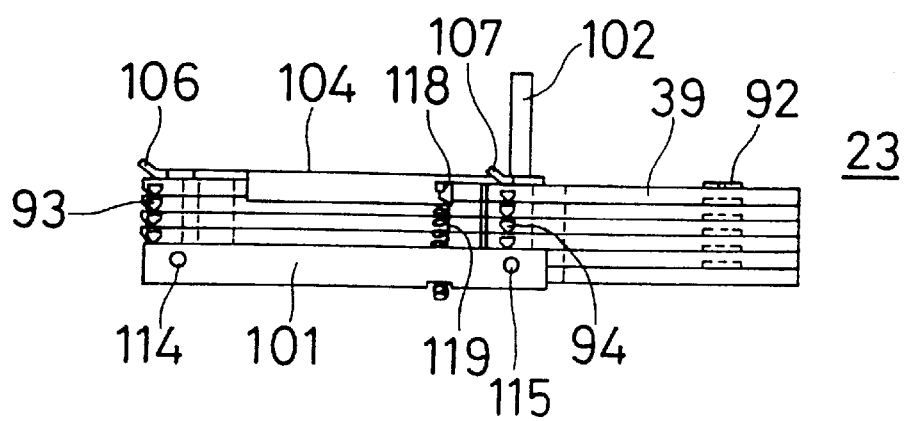

FIG. 29 is a right-side view of the stocker 23 of FIG. 26.

Figure 30A:
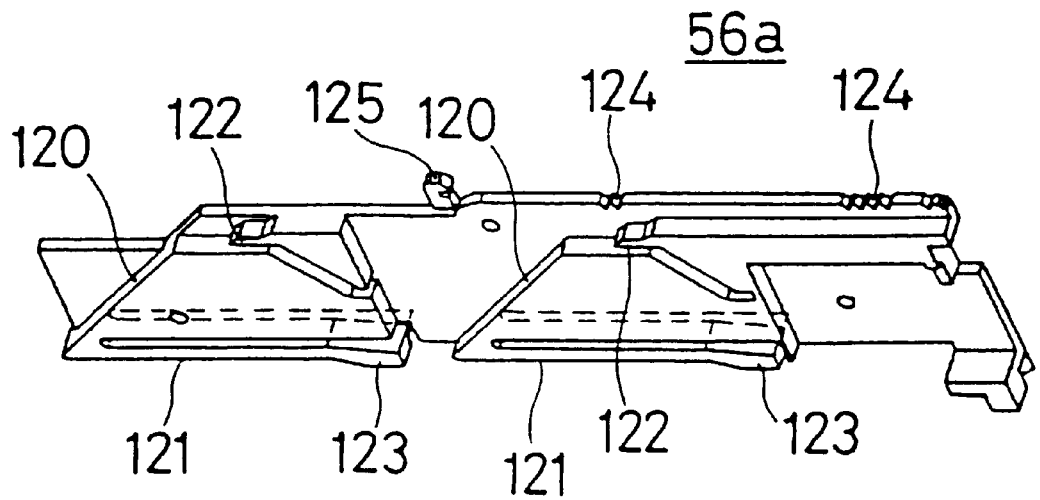
Figure 30B:
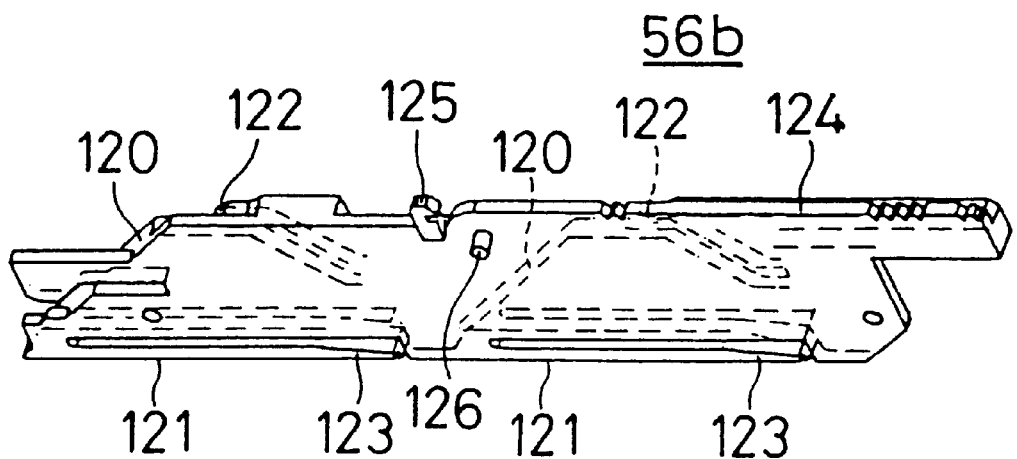

FIG. 30A is a perspective view of a separating slide plate 56 shown in FIG. 13, and FIG. 30B is a perspective view of a separating slide plate 56 shown in FIG. 13.

Figure 31:
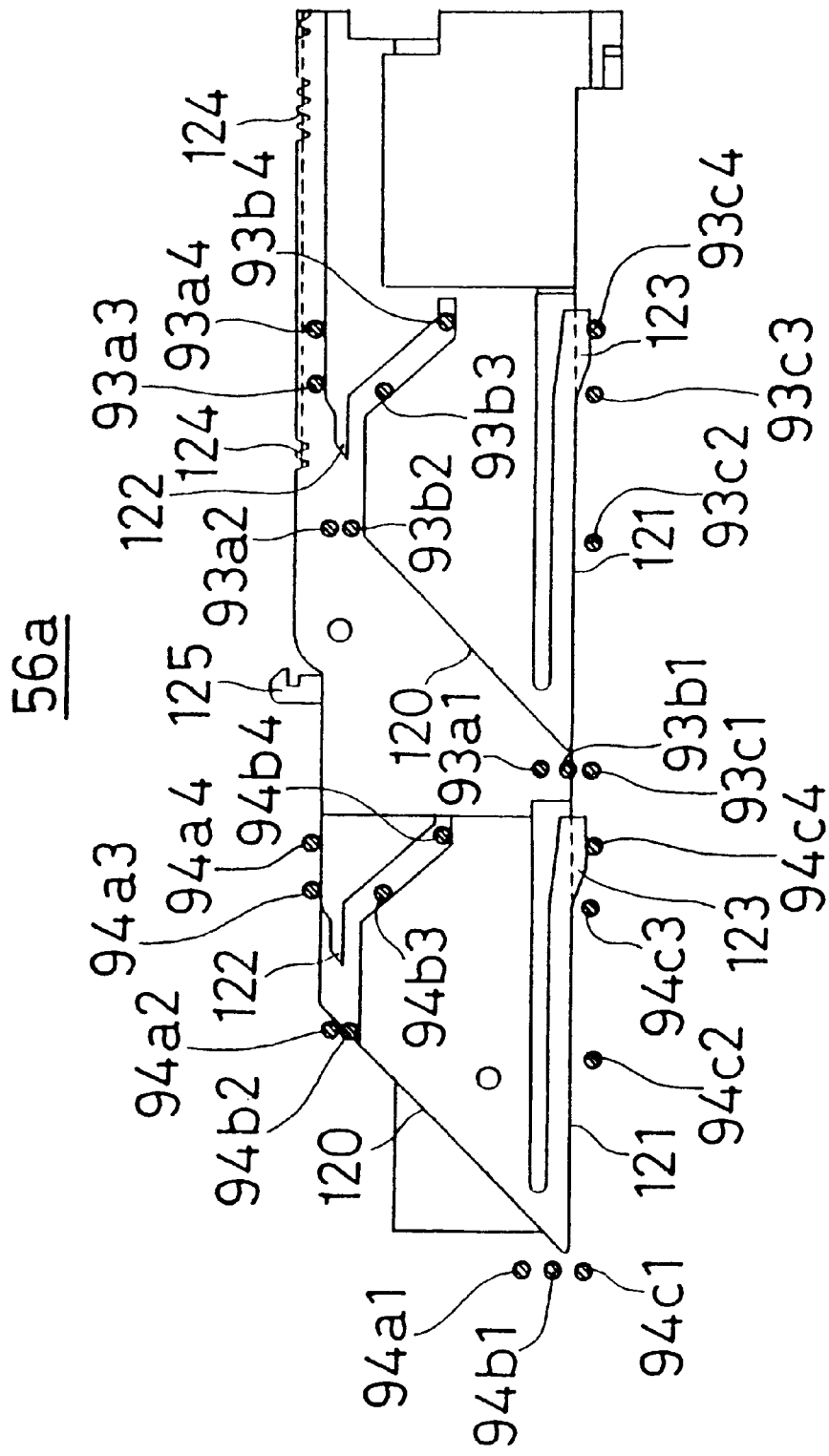

FIG. 31 is a side view of the separating slide plate 56a of FIG. 30A.

Figure 32:
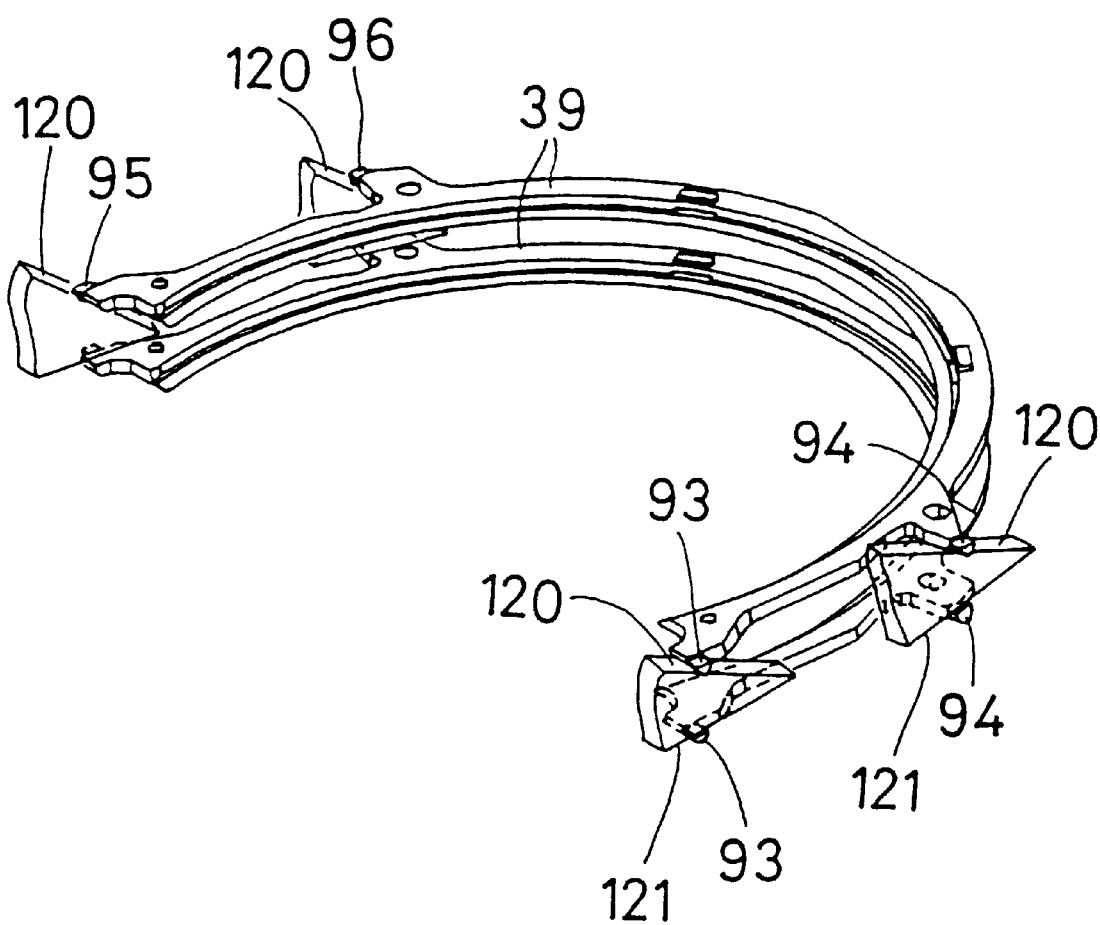

FIG. 32 is a simplified perspective view showing how the holders 39 are separated using the separating slide plates 56 of FIGS. 30A and 30B.

Figure 33:
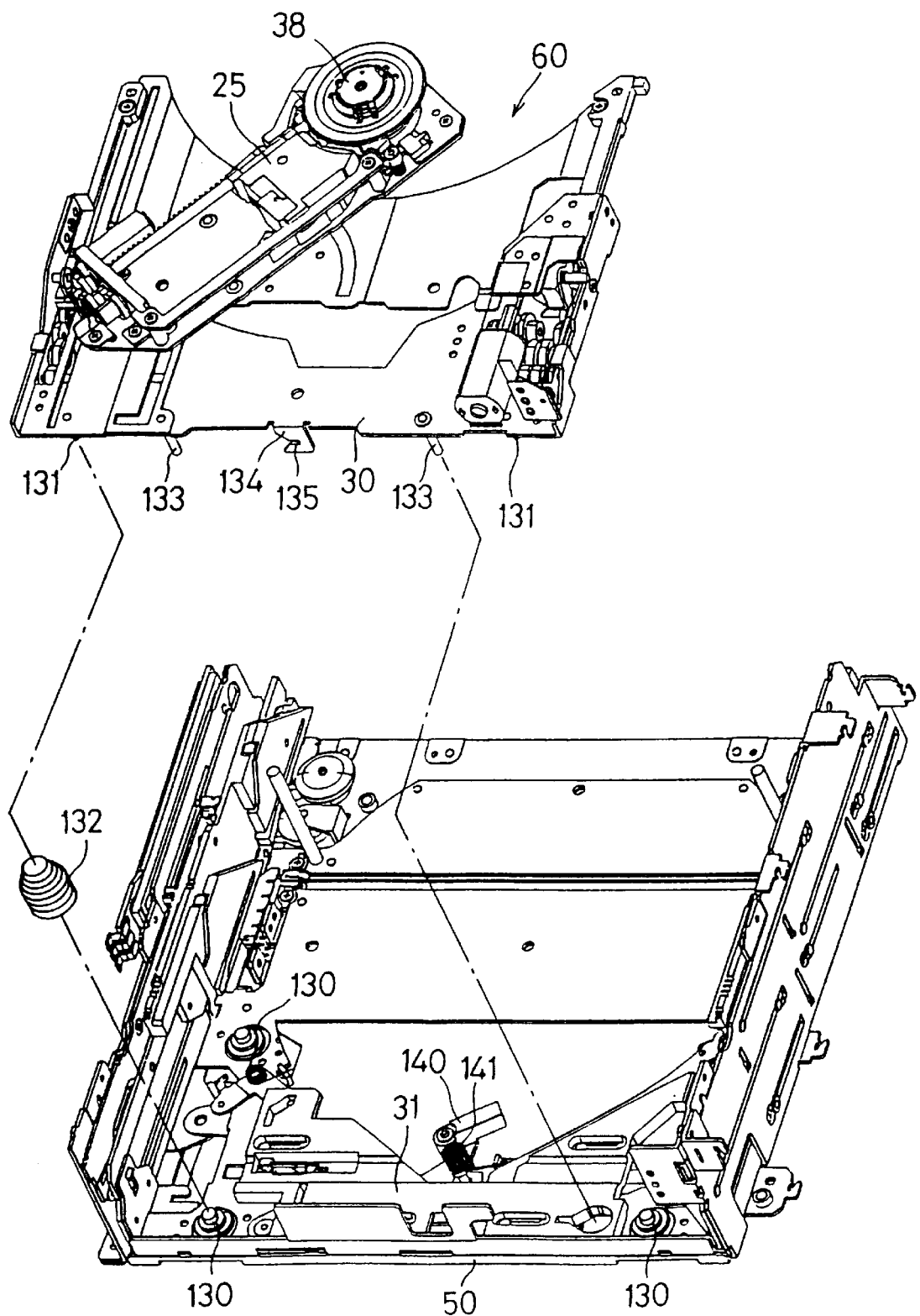

FIG. 33 is an exploded perspective view showing the construction relating to a floating mechanism 27 shown in FIG. 1.

Figure 34:
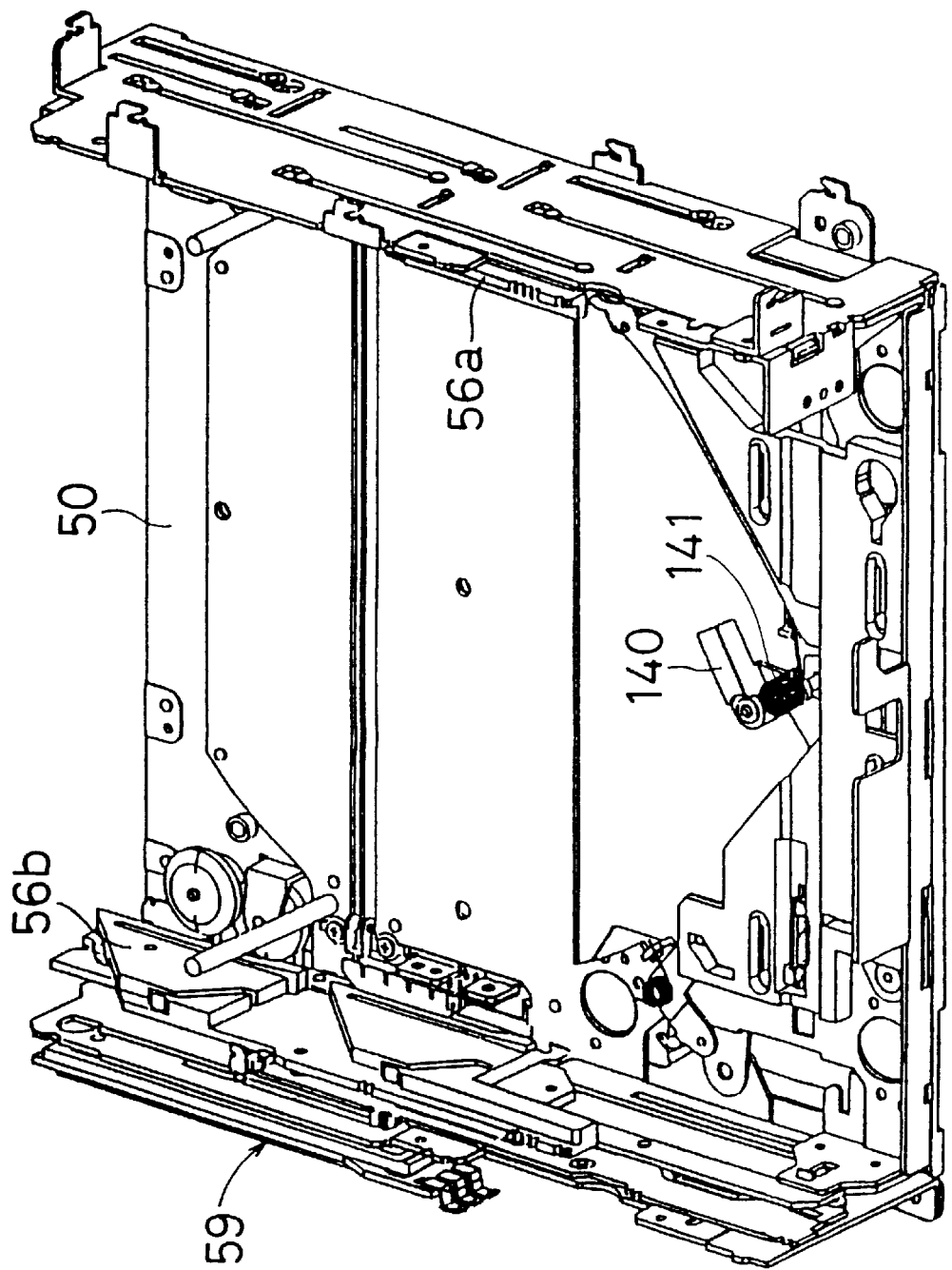

FIG. 34 is a perspective view showing the construction relating to a separating mechanism 28 shown in FIG. 1.

Figure 35A:
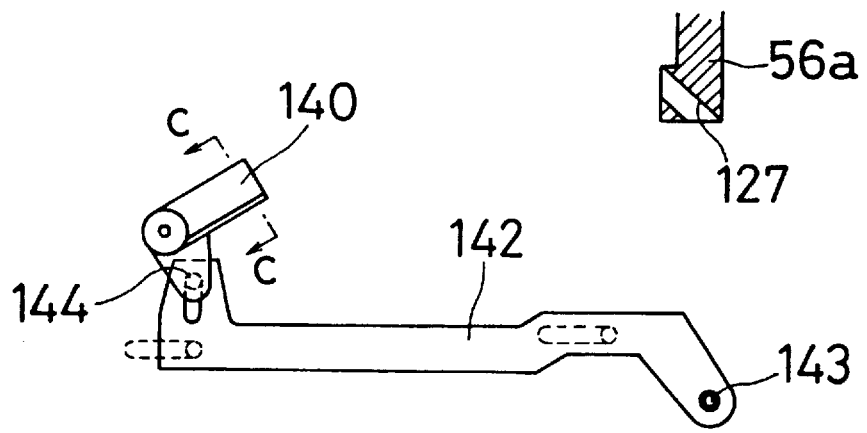
Figure 35B:
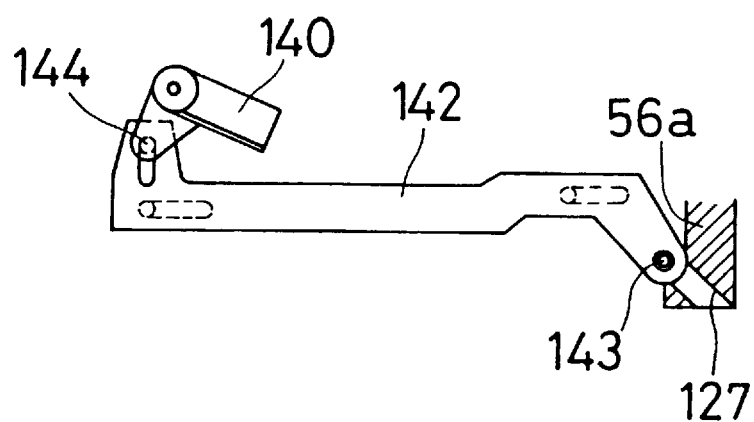
Figure 35C:
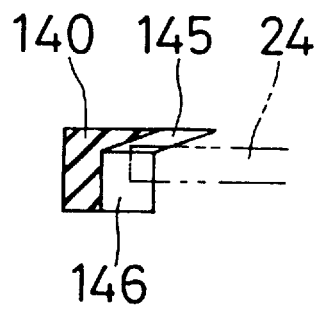

FIGS. 35A and 35B are simplified plan views showing the construction relating to a pressure lever 140 shown in FIG. 34, and FIG. 35C is a diagram showing, partly in cross section, the construction relating to the pressure lever 140 of FIG. 34.

FIG. 36A is a left-side view showing the construction of a PU lifting slide plate 150 for moving a PU unit 25 of FIG. 1 up and down.

FIG. 36B is a left-side view showing the construction of a side plate 160 of a chassis 50 shown in FIG. 11.

Figure 37:
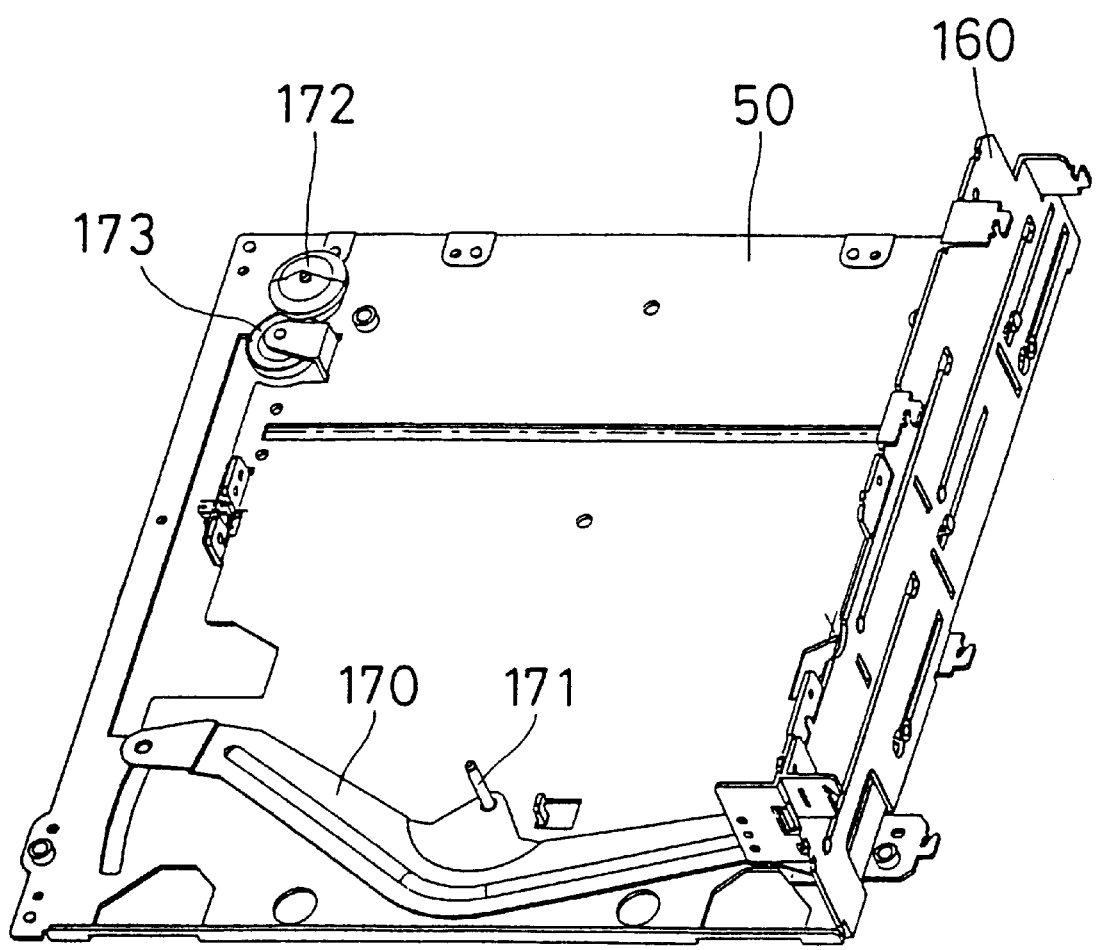

FIG. 37 is a perspective view of a basic mechanism section relating to the chassis 50 shown in FIG. 11.

Figure 38:
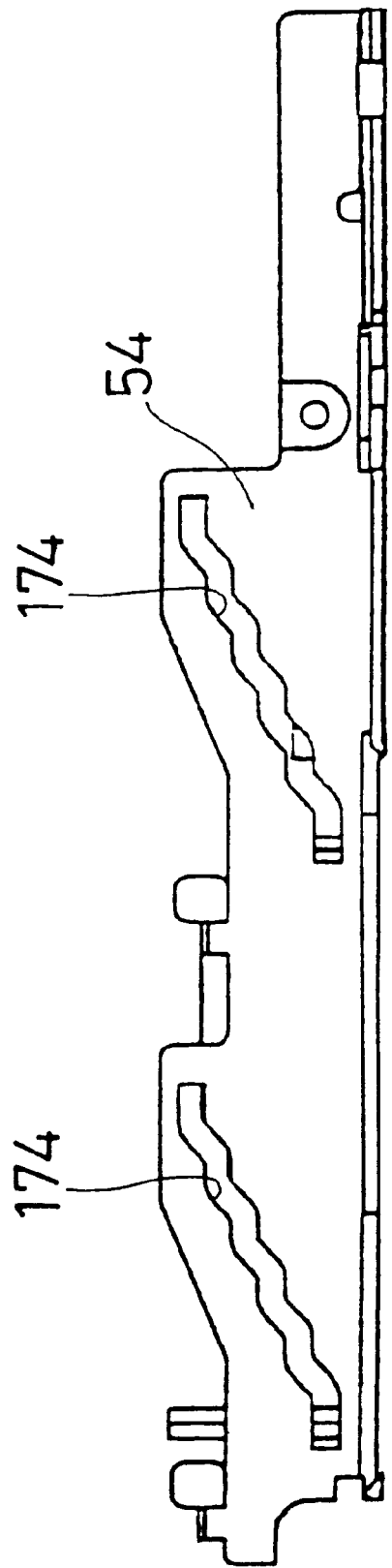

FIG. 38 is a left-side view showing the construction of a lifting slide plate 54 shown in FIG. 36B.

Figure 39A:
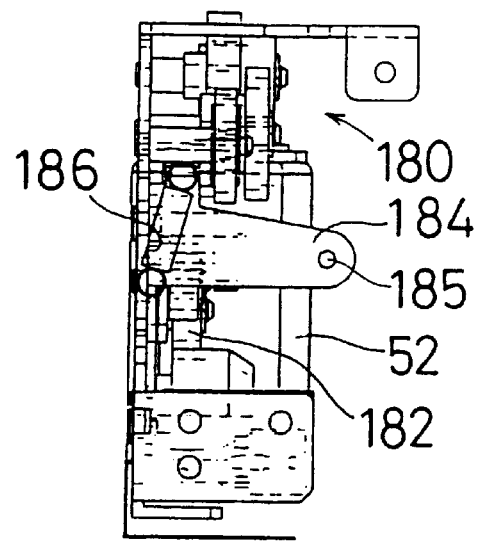
Figure 39B:
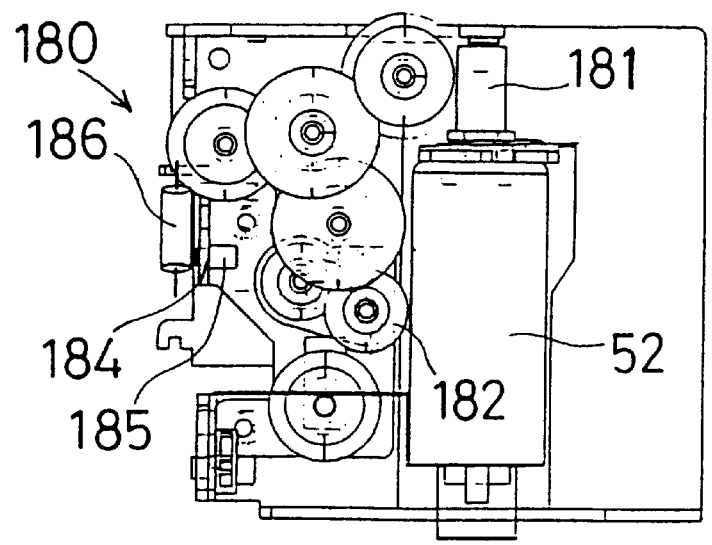

FIGS. 39A and 39B are a left-side view and a front view, respectively, of a gear mechanism 180 for transmitting driving force from a lifting motor 52 shown in FIG. 11.

Figure 40:
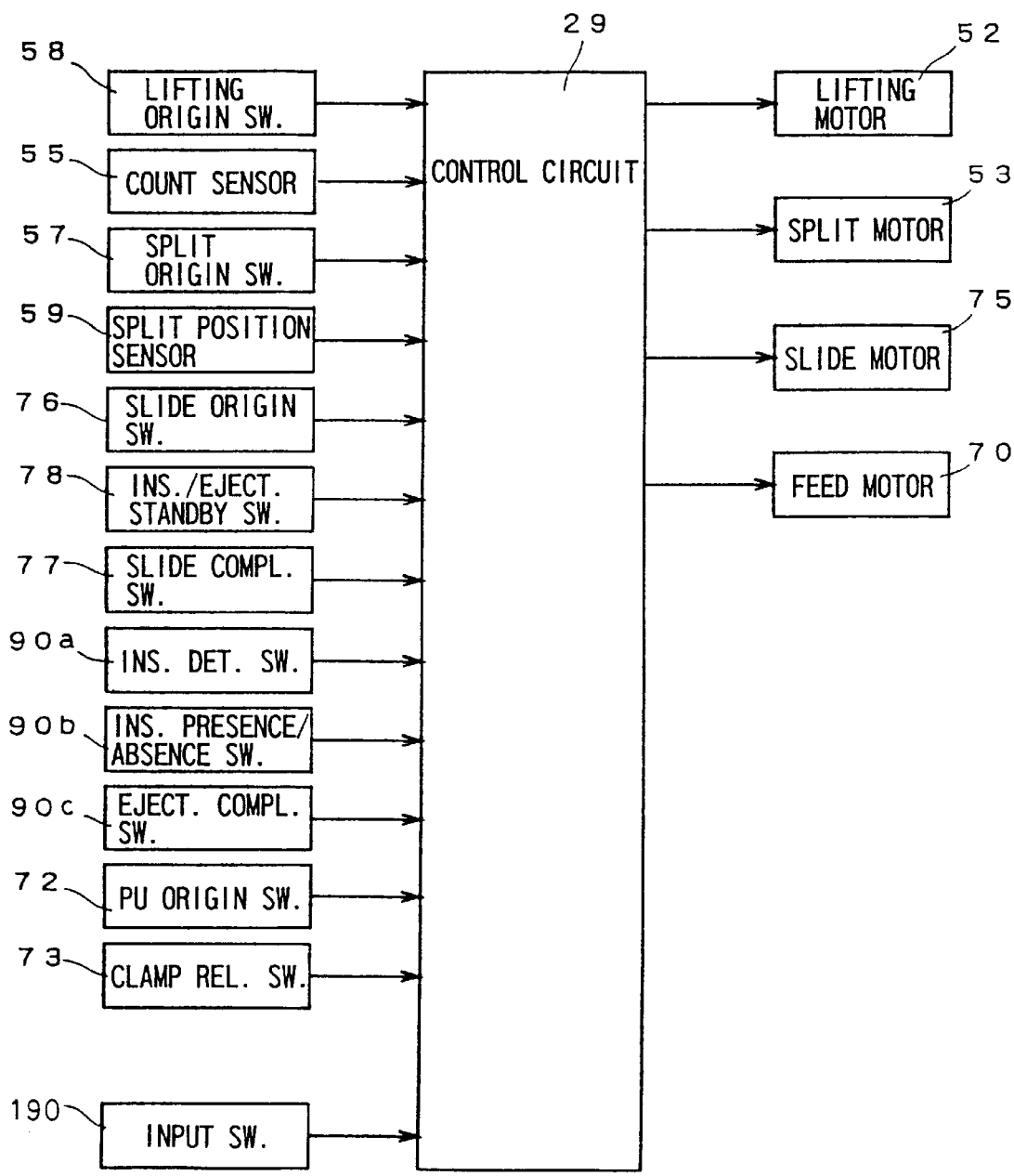

FIG. 40 is a block diagram showing an electrical configuration for overall control of the CD playback apparatus 21 of FIG. 1.

FIG. 41 is a timing chart illustrating the operation of a control circuit 29 of FIG. 40.

FIG. 42 is a timing chart illustrating the operation of the control circuit 29 of FIG. 40.

Figure 43:
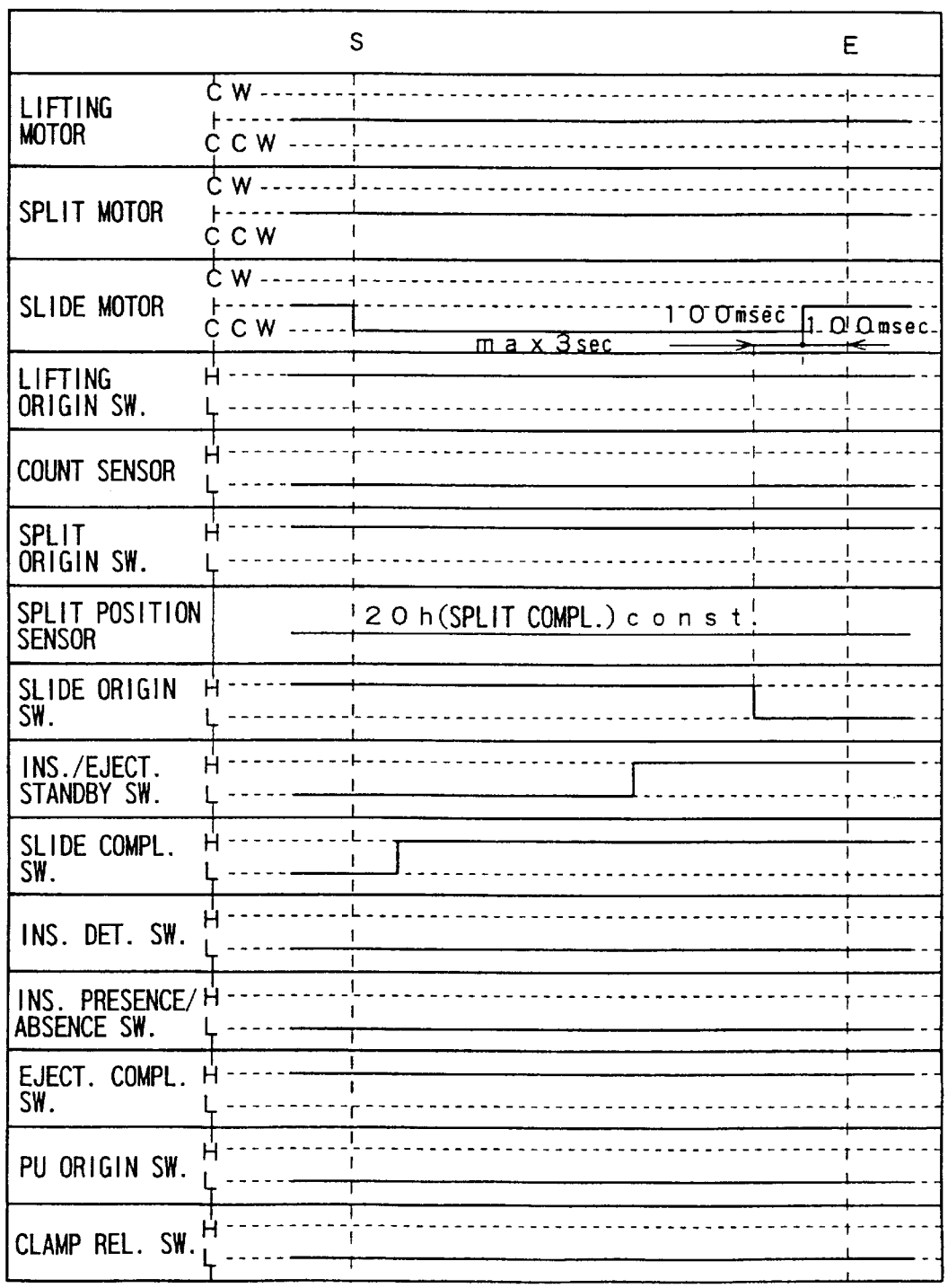

FIG. 43 is a timing chart illustrating the operation of the control circuit 29 of FIG. 40.

FIG. 44 is a timing chart illustrating the operation of the control circuit 29 of FIG. 40.

Figure 45:
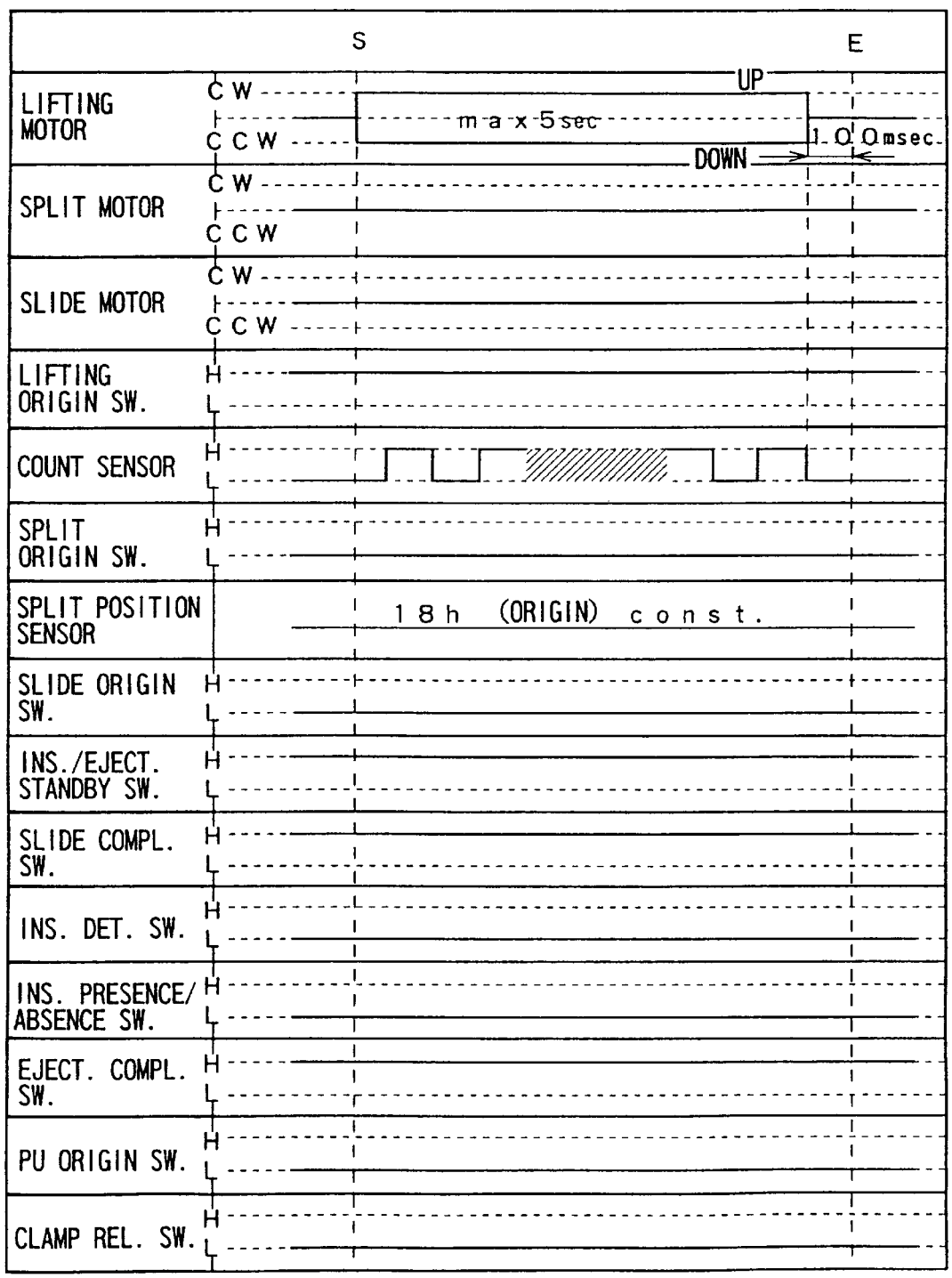

FIG. 45 is a timing chart illustrating the operation of the control circuit 29 of FIG. 40.

FIG. 46 is a timing chart illustrating the operation of the control circuit 29 of FIG. 40.

FIG. 47 is a timing chart illustrating the operation of the control circuit 29 of FIG. 40.

FIG. 48 is a timing chart illustrating the operation of the control circuit 29 of FIG. 40.

FIG. 49 is a timing chart illustrating the operation of the control circuit 29 of FIG. 40.

FIG. 50 is a timing chart illustrating the operation of the control circuit 29 of FIG. 40.

FIG. 51 is a timing chart illustrating the operation of the control circuit 29 of FIG. 40.

FIG. 52 is a timing chart illustrating the operation of the control circuit 29 of FIG. 40.

Figure 53:
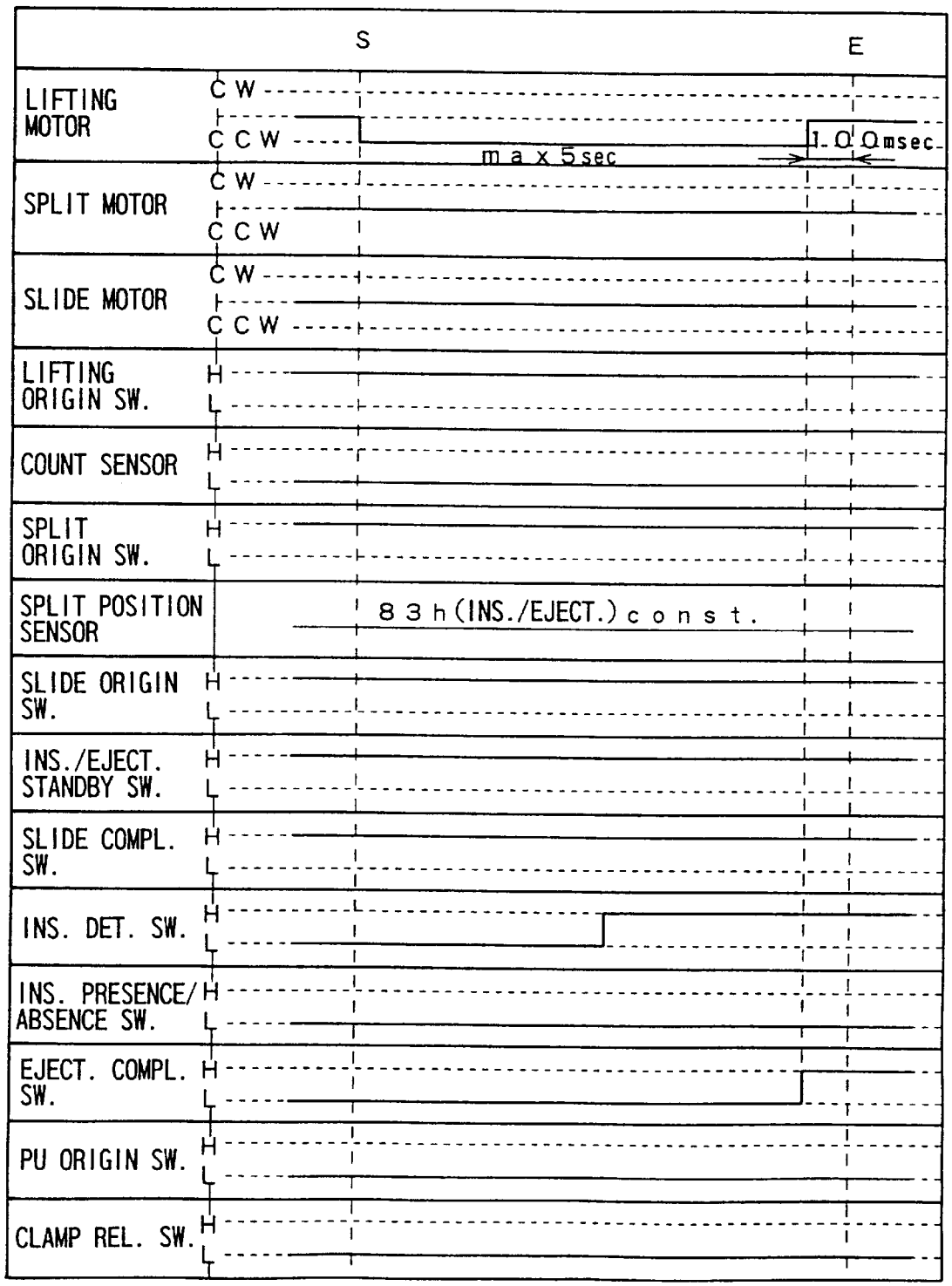

FIG. 53 is a timing chart illustrating the operation of the control circuit 29 of FIG. 40.

FIG. 54 is a timing chart illustrating the operation of the control circuit 29 of FIG. 40.

FIG. 55 is a timing chart illustrating the operation of the control circuit 29 of FIG. 40.

FIG. 56 is a timing chart illustrating the operation of the control circuit 29 of FIG. 40.

Figure 57:
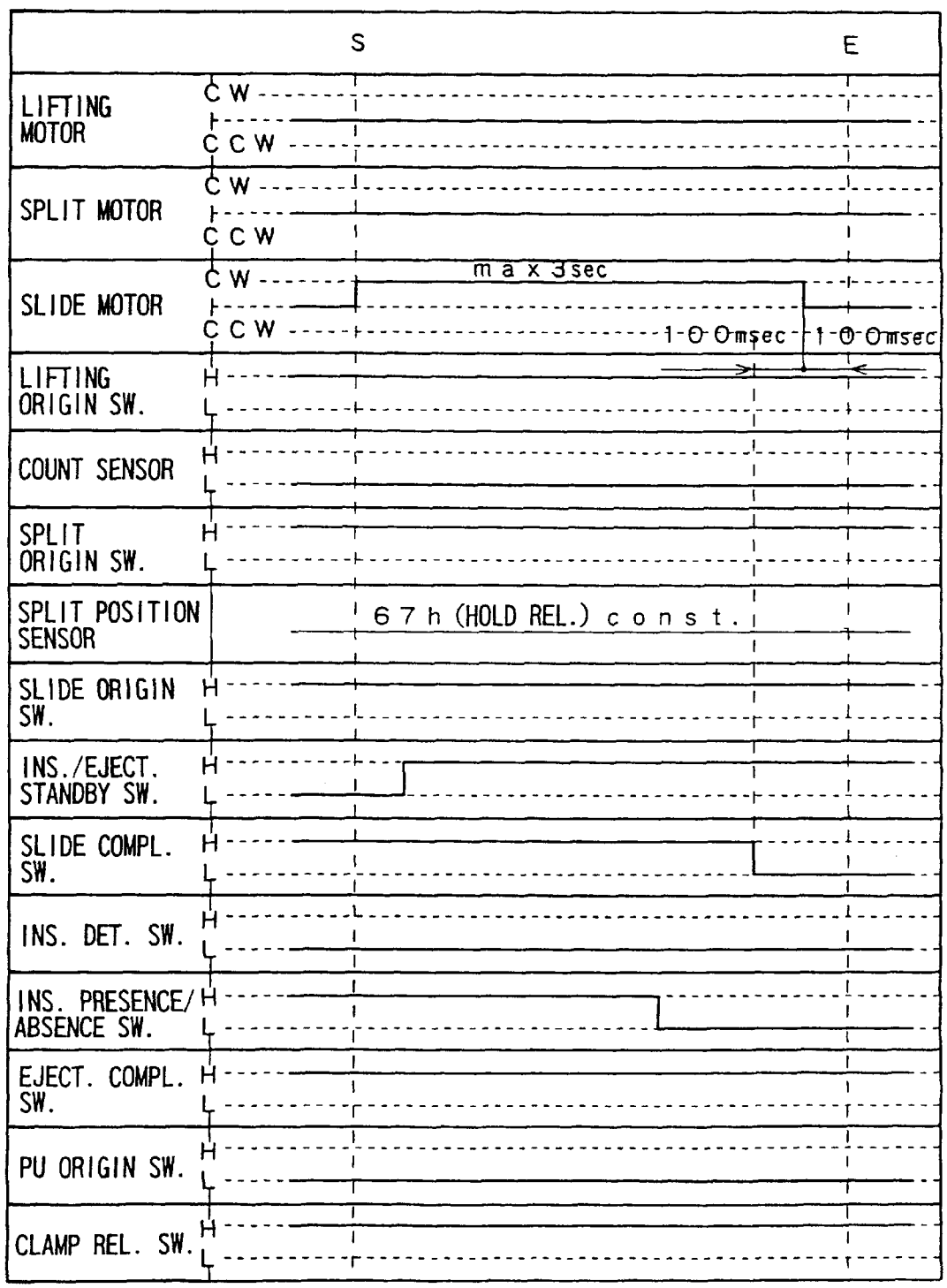

FIG. 57 is a timing chart illustrating the operation of the control circuit 29 of FIG. 40.

FIG. 58 is a timing chart illustrating the operation of the control circuit 29 of FIG. 40.

Figure 59:
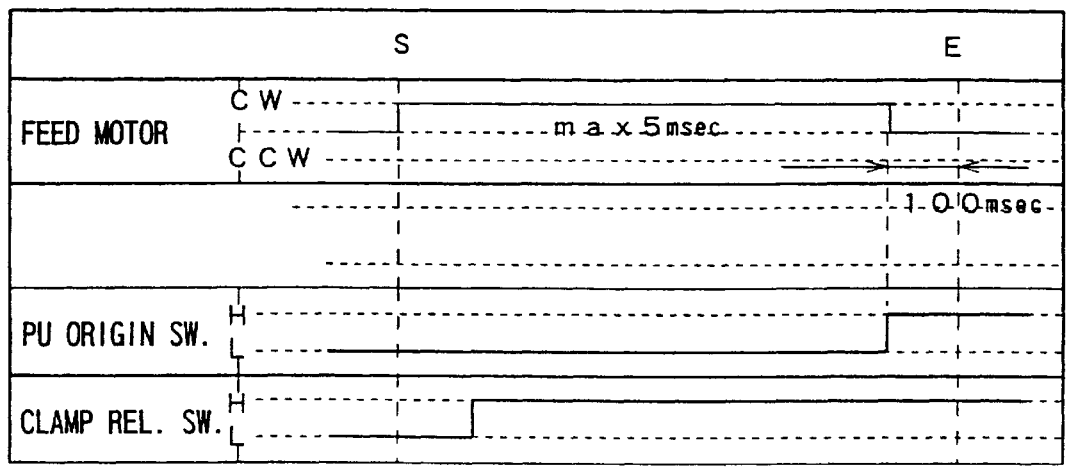

FIG. 59 is a timing chart illustrating the operation of the control circuit 29 of FIG. 40.

Figure 60:
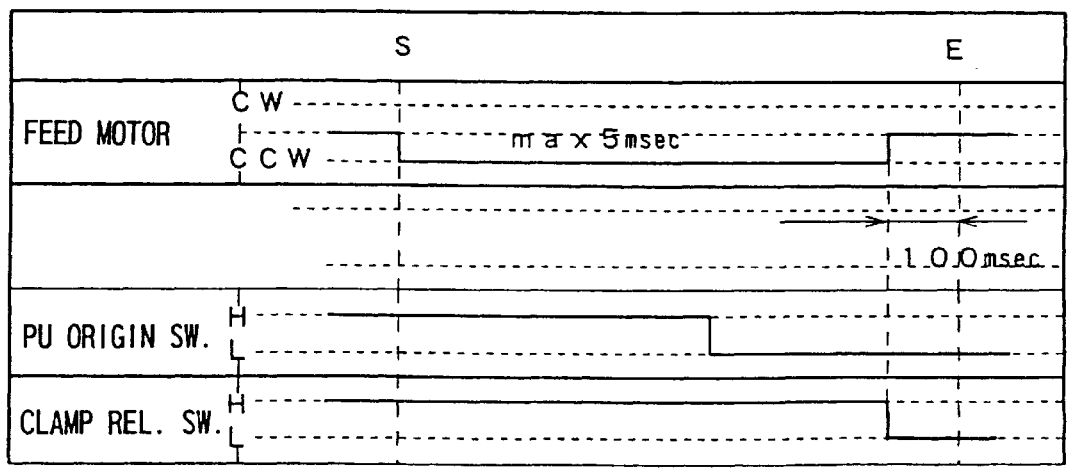

FIG. 60 is a timing chart illustrating the operation of the control circuit 29 of FIG. 40.

Figure 61:
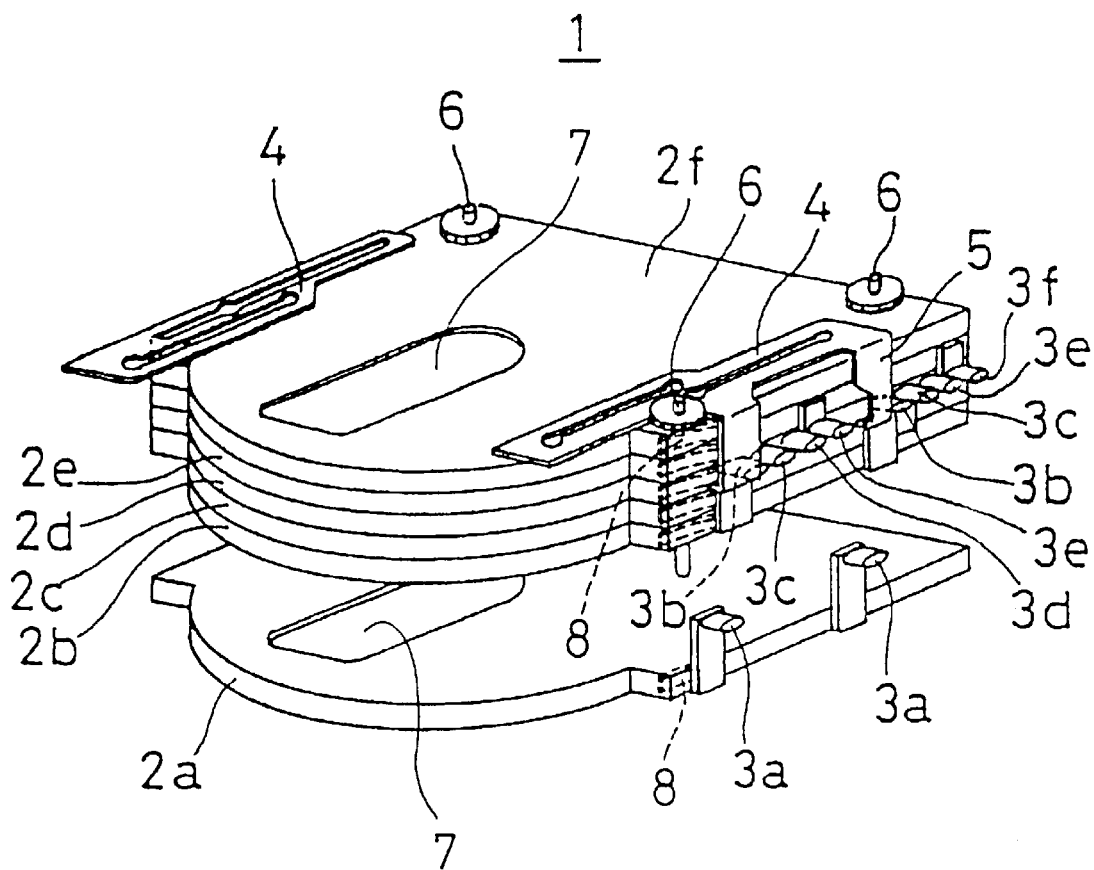

FIG. 61 is a perspective view showing the construction of a stocker according to the prior art.

DETAILED DESCRIPTION OF THE PREFERRED EMBODIMENTS

Now referring to the drawings, preferred embodiments of the invention are described below.

FIG. 1 is a diagram showing diagrammatically the overall construction of an automotive CD playback apparatus 21 according to one embodiment of the present invention. A housing 22 is constructed conforming to the standard size as vehicle-mounted equipment, known as 1DIN, that is, about 18 cm in width, about 5 cm in thickness, and about 17 cm in depth.

Inside the housing 22 is installed a stocker 23 as an accommodating apparatus which is capable of accommodating up to six disk-shaped recording media or CDs 24. Each CD 24 has a diameter of about 12 cm and a thickness of about 1.2 mm, and its recorded information can be played back by a PU unit 25.

The entire construction of the stocker 23 can be moved up and down by virtue of a moving mechanism 26 which serves as a selection mechanism. A floating mechanism 27 supports the PU unit 25 in a mechanically floating condition with respect to other parts so that the PU unit 25 can be substantially isolated from external vibrations when the CD 24 mounted thereon is being played back. When one accommodating position is selected by the moving mechanism 26, the stocker 23 is separated between top and bottom by a separating mechanism 28 to provide a space between the accommodating positions above and below the separating position. On one side of the housing 22 is disposed an electronic circuit board, etc. containing a control circuit 29 for controlling the movements of the various parts.

The PU unit 25 is mounted displaceably on a slide base 30 which is supported on the bottom of the housing 22. The slide base 30 can be held by the floating mechanism 27 in such a manner as to float mechanically from the bottom of the housing 22. The control circuit 29 performs control so that the floating by the floating mechanism 27 is restrained by a lock mechanism 31, except when playing back the CD 24, to prevent the PU unit 25 from swaying independently of other parts in the housing 22.

An insertion/ejection slot 33 is formed in a front panel 32 which serves a the operation panel of the housing 22, and within the housing 22, a transport mechanism 34 is provided adjacent to the insertion/ejection slot 33. The transport mechanism 34 includes a transport roller 35 and a supporting plate 36. The CD 24 inserted or ejected through the insertion/ejection slot 33 is mounted on the supporting plate 36 and transported by the rotation of the transport roller 35.

When the CD 24 is being transported or played back inside the housing 22, the insertion/ejection slot 33 is closed by a shutter mechanism 37 to prevent another CD 24 from being inserted accidentally. The PU unit 25 includes a turn table 38 for holding and rotating the CD 24.

The stocker 23, as will be described later, comprises holders 39 as stocker members of identical construction stacked one on top of another. The separating mechanism 28 enters between designated stocker members to widen the gap therebetween, thus creating a space for the PU unit 25 to enter.

The separating mechanism 28 works not only to separate the stocker 23 but also to displace the holder 39, the stocker members in the separated section of the stocker 23, further in the stacking direction, while also displacing the PU unit in the stacking direction. The turn table 38 is provided with a chucking mechanism 40 for holding the CD 24.

Figure 2:
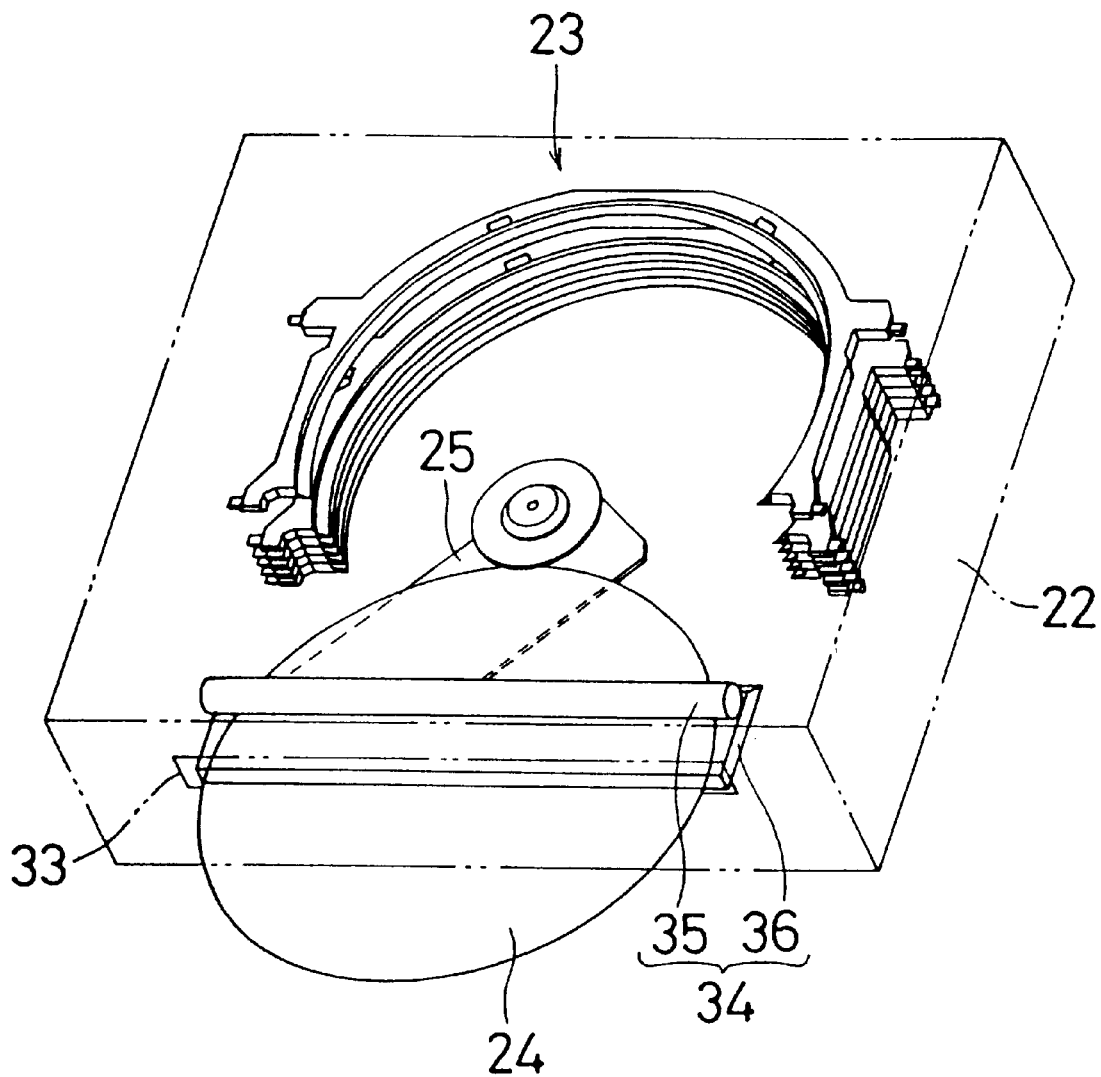
FIG. 2 is a diagrammatic perspective view showing a CD 24 being inserted in the CD playback apparatus 21 of FIG. 1.
Figure 3:
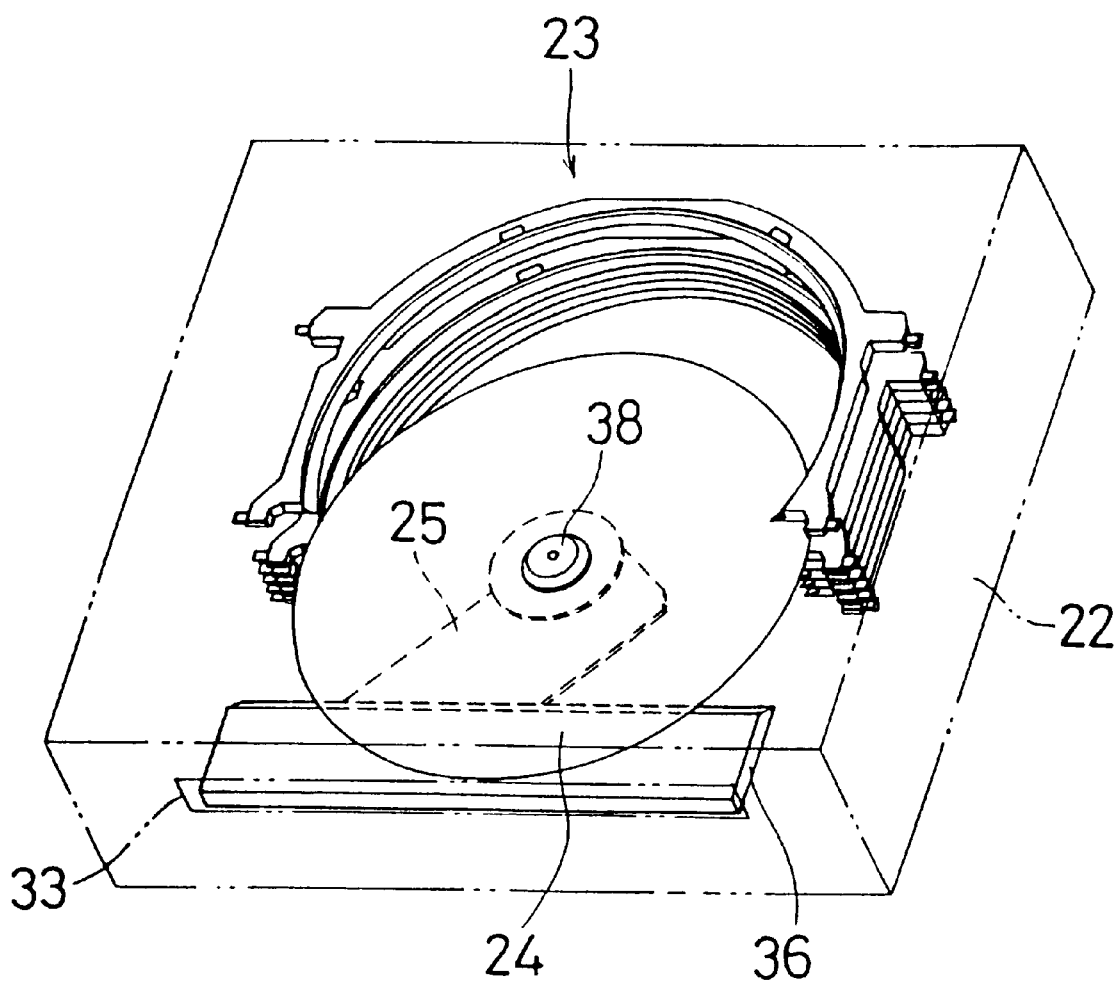
FIG. 3 is a simplified perspective view showing the CD 24 being played back in the CD playback apparatus 21 of FIG. 1.
Figure 4:
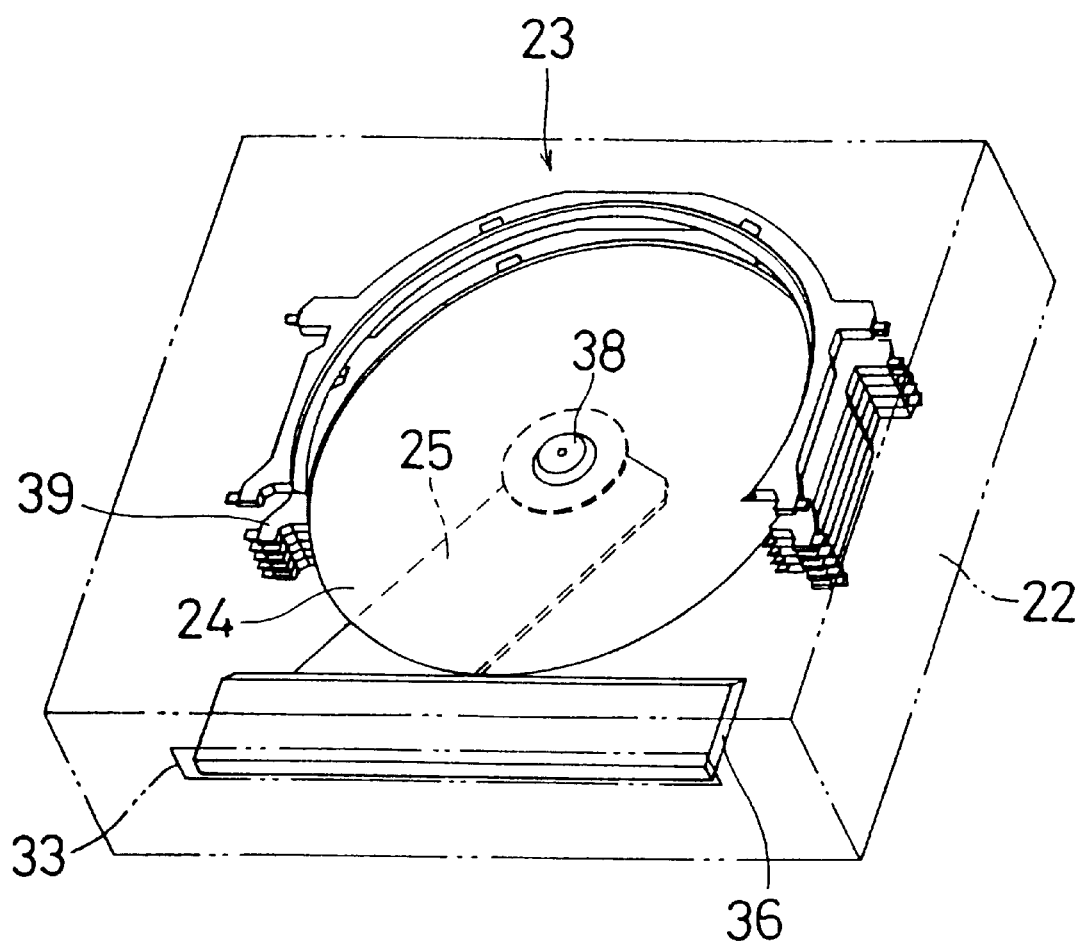
FIG. 4 is a simplified perspective view showing a plurality of CDs 24 being stored in the CD playback apparatus 21 of FIG. 1.

FIGS. 2, 3, and 4 are simplified schematic diagrams showing how the CD 24 is inserted and played back in the CD playback apparatus 21 shown in FIG. 1 and how it is stored in the stocker 23. FIG. 2 shows the CD 24 being inserted through the insertion/ejection slot 33 of the housing 22 and drawn into the housing 22 by being sandwiched between the transport roller 35 and supporting plate 36 of the transport mechanism 34. When the CD 24 has been drawn into the housing 22, the shutter mechanism 37 in FIG. 1 closes the insertion/ejection slot 33 to prevent a new CD 24 from being inserted. Once the CD 24 has been drawn into the housing 22, the transport roller 35 rotates in the reverse direction to push back the CD 24 until it is stopped by the shutter mechanism 37. This ensures correct positioning of the CD 24.

FIG. 3 shows the condition in which the PU unit 25 moves upward from its standby position, mounts the thus positioned CD 24 on the turn table 38 by chucking, and moves into the separated space within the stocker 23. It is also possible to play back the inserted CD 24 by the PU unit 25 in this condition.

FIG. 4 shows the condition in which the CD 24 mounted on the turn table 38 is being transferred from the PU unit 25, which has moved into the space within the stocker 23, to a holder 39 in the stocker 23. The holder 39 as a stocker member, which is placed in a standby position below the CD 24 mounted and transported on the turn table 38, moves upward and removes the CD 24 from the turn table 38 by lifting the circumferential edge of the CD 24. On the other hand, when a CD 24 accommodated in the stocker 23 is to be transferred onto the turn table 38 of the PU unit 25 for ejection, the holder 39 holding the CD 24 moves downward and transfers the CD 24 held thereon onto the turn table 38. When accommodating the CD 24 into the stocker 23, the PU unit 25 from which the CD 24 has been transferred onto the holder 39 is moved out of the space in the stocker 23.

When ejecting the CD 24, the PU unit 25 on which the CD 24 received from the holder 39 in the stocker 23 is mounted is withdrawn and the CD 24 is transferred onto the transport mechanism 24.

Figure 5A:
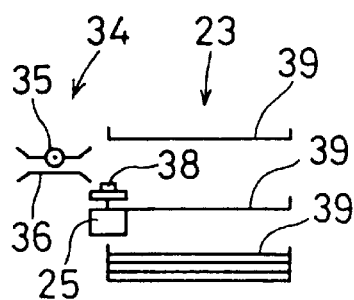
FIGS. 5A to 5H are simplified cross sectional side view showing a sequence of operations for inserting a CD 24 in the CD playback apparatus 21 of the embodiment of FIG. 1.

FIGS. 5A to 5H, FIGS. 6A to 6F, FIGS. 7A to 7F, FIGS. 8A to 8I, and FIGS. 9A to 9L are simplified schematic diagrams showing how the CD 24 is inserted, ejected, accommodated, played back, and changed in the CD playback apparatus 21 of the present embodiment. FIG. 5A shows an insertion standby condition. In the transport mechanism 34, the transport roller 35 is lowered, ready to draw in the CD 24 when inserted. In the stocker 23, all the holders located below the holder 39 corresponding to the selected accommodating position are moved down to create a space therebetween, while all the holders located above the selected holder 39 are moved up. The CD 24 will be moved into the space created between the selected holder 39 and the holders located above it. The PU unit 25 is on standby in the standby position near the exit of the transport mechanism 34.

Figure 5E:
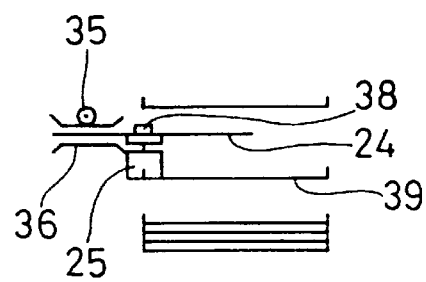
Figure 5B:
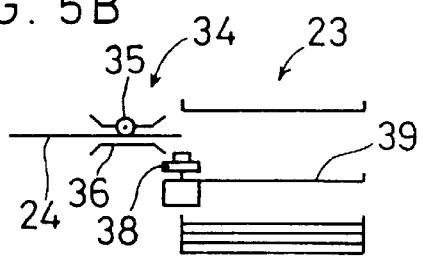
Figure 5F:
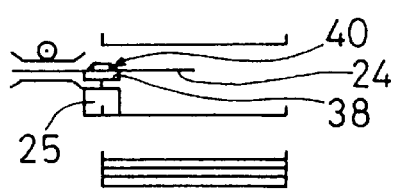
Figure 5C:
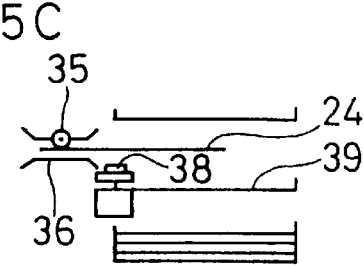
Figure 5G:
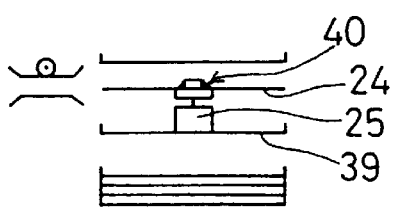
Figure 5D:
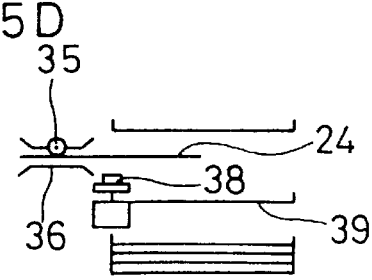

FIG. 5B shows the condition in which the user of the CD playback apparatus 21 has inserted one CD 24 in the insertion/ejection slot 33 in FIG. 1. The transport roller 35 of the transport mechanism 34 first draws the inserted CD 24 into the housing 22, as shown in FIG. 5C, and then rotates in the reverse direction to position the CD 24, as shown in FIG. 5D. After the CD 24 has been drawn, as shown in FIG. 5C, the shutter mechanism 37 in FIG. 1 is closed. When the CD 24 is moved in the reverse direction, as shown in FIG. 5D, the rear edge of the CD 24 hits the shutter mechanism 37 in FIG. 1, and the CD 24 is thus positioned in place.

When the CD 24 has been positioned as shown in FIG. 5(D), the PU unit 25 moves upward and receives the CD 24 by holding it on the turn table 38, as shown in FIG. 5E. The chucking mechanism 40 provided on the turn table 38 is activated to clamp the CD 24 onto the turn table 38, as shown in FIG. 5F. Next, the PU unit 25 is moved in the direction of insertion, drawing the CD 24 out of the transport mechanism 34 and transporting it into the stocker 23, as shown in FIG. 5G; then, in the PLAY condition as shown in FIG. 5H, the lock mechanism 31 in FIG. 1 is released, allowing the PU unit 25 to be supported on the floating mechanism 27 in a mechanically floating fashion, and in this condition, information is played back from the CD 24.

Figure 5H:
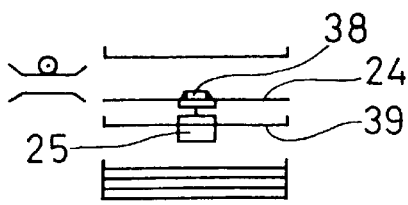
Figure 6A:
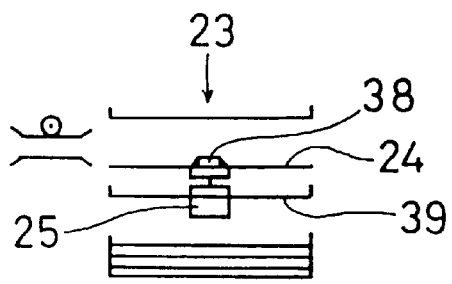
FIGS. 6A to 6F are simplified cross sectional side views showing a sequence of operations for ejecting a stored CD 24 from the CD playback apparatus 21 of FIG. 1.
Figure 6B:
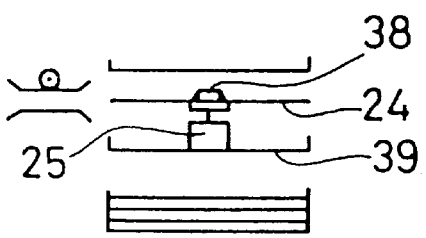
Figure 6C:
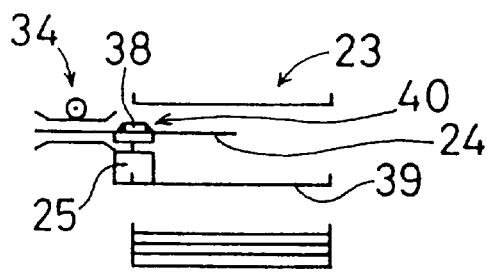
Figure 6D:
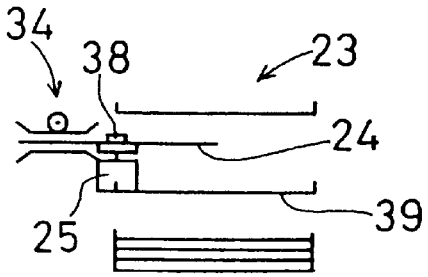
Figure 6E:
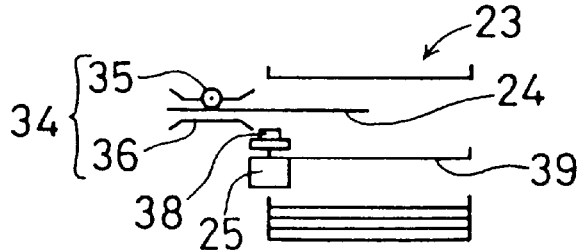

FIGS. 6A to 6F illustrate a sequence of operations for ejecting the CD 24 from the playback condition shown in FIG. 5H. In the playback condition in FIG. 6A, the lock mechanism 31 in FIG. 1 is in an unlocked condition, but in FIG. 6B, the lock mechanism 31 in FIG. 1 is activated to restrain the floating condition provided by the floating mechanism 27 in FIG. 1. In FIG. 6C, the PU unit 25 is moved away from the inside of the stocker 23 to the standby position near the exit of the transport mechanism 34. In FIG. 6D, the chucking mechanism 40 is activated to unclamp the CD 24 from the turn table 38. In FIG. 6E, the PU unit moves down into the standby position, while at the same time, the transport roller 35 of the transport mechanism 34 lowers, thus holding the CD 24 between the transport roller 35 and the supporting plate 36. In this way, the CD 24 is transferred from the PU unit 25 to the transport mechanism 34.

Figure 6F:
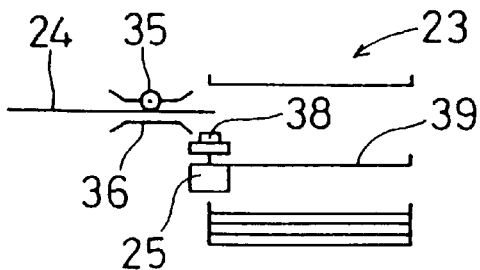

In FIG. 6F, the transport roller 35 rotates to eject the CD 24. The ejection operation is stopped when the CD 24 is ejected partway through the insertion/ejection slot 33 in FIG. 1, thus allowing the user of the CD playback apparatus 21 to draw out the CD 24.

Figure 7A:
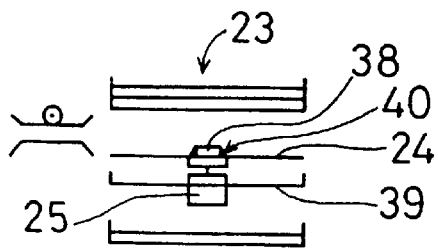
FIGS. 7A to 7F are simplified cross sectional side views showing a sequence of operations for transporting a CD 24 into an accommodating position after playback in the CD playback apparatus 21 of FIG. 1.
Figure 7B:
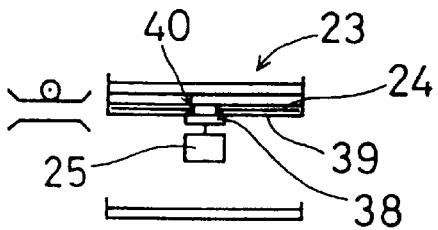
Figure 7C:
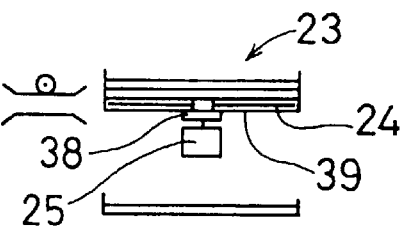
Figure 7D:
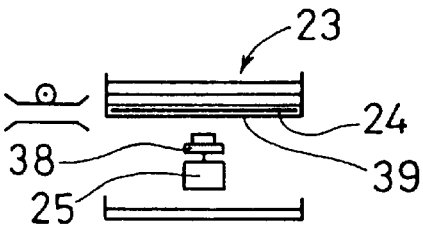
Figure 7E:
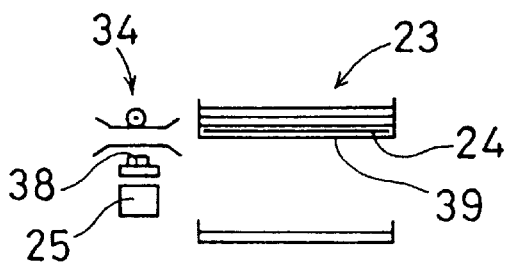
Figure 7F:
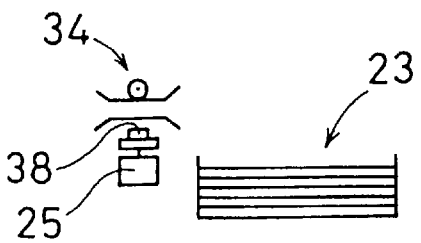

FIGS. 7A to 7F are simplified schematic diagrams illustrating how the CD 24 is stored in an accommodating position inside the stocker 23. The following explanation is given by assuming that the PLAY condition shown in FIG. 7A is the same as the PLAY condition shown in FIG. 5H. When the CD 24 inserted through the insertion/ejection slot 33 is to be stored in the stocker 23, the sequence of operations in FIGS. 5A to 5H is immediately followed by the sequence of operations for accommodating the CD 24 without playing back the CD 24. In FIG. 7B, after the lock mechanism 31 in FIG. 1 is activated to restrain the floating condition, the PU unit 25 and the holder 39 for holding the CD 24 are moved upward. In FIG. 7C, the CD 24 clamped on the turn table 38 by the chucking mechanism 40 of the PU unit 25 is unclamped, In FIG. 7D, the PU unit 25 moves downward, disengaging the CD 24 from the turn table 38 and allowing it to rest on the holder 39. In FIG. 7E, the PU unit 25 moves to a position below the transport mechanism 34, and in FIG. 7F, the separated section of the stocker 23 is moved down, the stocker 23 thus being reassembled into one unit.

FIGS. 8A to 8I illustrate a sequence of operations for ejecting any one of the CDs 24 accommodated in the stocker 23.

When the holder 39 holding the CD 24 to be ejected is selected in the condition shown in FIG. 8A where the PU unit 25 is positioned below the transport mechanism 34 and the entire stocker 23 is in the downward position, the stocker 23 is separated between the upper section, including the selected holder 39, and the lower section located below the selected holder 39, as shown in FIG. 8B. In FIG. 8C, the PU unit 25 moves into the thus created space in the stocker 23. In FIG. 8D, the PU unit 25 moves upward to hold on the turn table 38 the CD 24 to be ejected. In FIG. 8E, the chucking mechanism 40 is activated to clamp the CD 24 onto the turn table 38. In FIG. 8F, the holder 39 on which the CD 24 was held moves downward and the CD 24 is now mounted on the turn table 38. In FIG. 8G, the PU unit 25 including the turn table 38 with the CD 24 mounted thereon moves away from the space created in the stocker 23 to the standby position near the exit of the transport mechanism 34. The CD 24 is inserted in the space between the lifted transport roller 35 and the supporting plate 36. In FIG. 8H, the CD 24 clamped on the turn table 38 by the chucking mechanism 40 is unclamped, and in FIG. 8I, the PU unit 25 is moved downward and, at the same time, the transport roller 35 is lowered, thereby removing the CD 24 from the turn table 38 by holding the CD 24 between the transport roller 35 and the supporting plate 36; the transport roller 35 is then rotated to eject the CD 24. In FIG. 8I, when the CD 24 is removed from the insertion/ejection slot 33 by the user, the insertion standby condition is entered, allowing the insertion of a new CD 24.

Figure 9A:
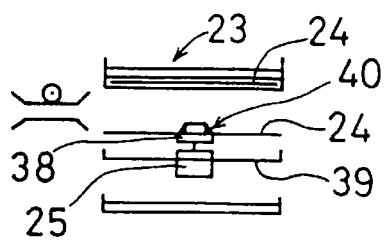
FIGS. 9A to 9L are simplified cross sectional side views showing a sequence of operations for changing CDs 24 stored in a stocker 23 for playback in the CD playback apparatus 21 of FIG. 1.
Figure 9G:
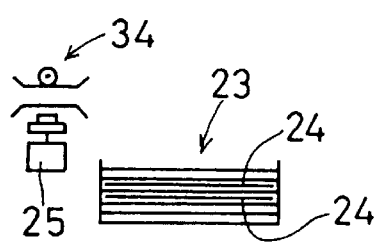
Figure 9B:
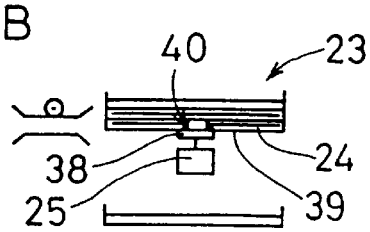
Figure 9H:
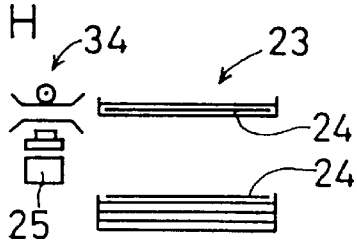
Figure 9C:
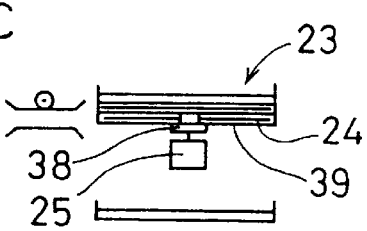
Figure 9I:
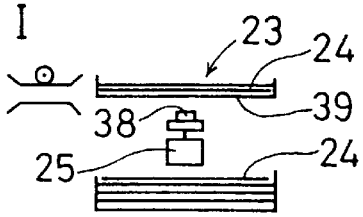
Figure 9D:
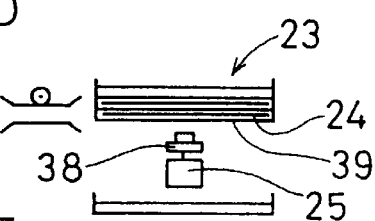
Figure 9J:
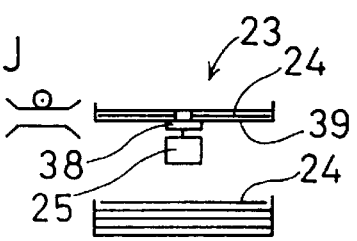
Figure 9E:
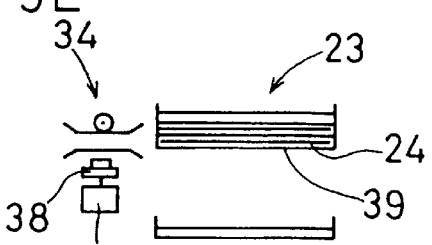
Figure 9K:
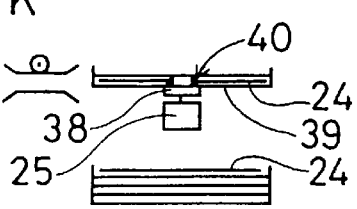
Figure 9F:
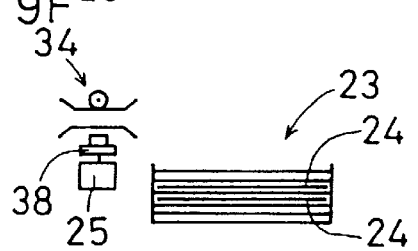
Figure 9L:
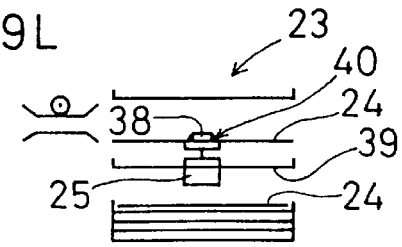

FIGS. 9A to 9L illustrate a sequence of disc change operations for changing one CD 24 in the PLAY condition for another CD 24 stored in the stocker 23. The sequence of operations from FIGS. 9A to 9F is the same as the sequence of operations shown in FIGS. 7A to 7F. The sequence of operations from FIGS. 9G to 9K is the same as the sequence of operations shown in FIGS. 8A to 8E. In FIG. 9L, after the lock mechanism 31 in FIG. 1 is released and the PU unit 25 is placed in a mechanically floating condition by the floating mechanism 27, the holder 39 holding the selected CD 24 is moved down so that the CD 24 can be played back. Since the locking by the locking mechanism 31 is released, the CD 24 can be played back with the floating mechanism 27 acting to substantially isolate the PU unit 25 from external vibrations. However, since there is a possibility that the PU unit 25 may be displaced relative to other parts because of absorption of vibrations, it is preferable that the PU unit 25 with the CD 24 mounted thereon be moved to a position where the CD 24 does not hit surrounding parts.

FIG. 10 shows an external view of the CD playback apparatus 21 of FIG. 1. In the vicinity of the insertion/ejection slot 33 of the front panel 32, there are provided selector buttons 41 to 46 so that the accommodating position of a CD 24 stored in the stocker 23 can be specified.

The accommodating positions are assigned numbers 1 to 6, for example, in sequence from bottom to top, and the corresponding number is specified using the appropriate one of the selector buttons 41 to 46.

FIG. 11 shows the construction of the internal mechanism of the CD playback apparatus 21 of FIG. 1 with the housing 22 removed. FIGS. 12, 13, 14, 15, and 16 show the internal mechanism of FIG. 11 as viewed from the front, the top, the right-hand side, the left-hand side, and the rear, respectively.

The entire construction of the internal mechanism is supported on a chassis 50, the front side being the side where the front panel 32 of the housing 22 is disposed and the rear side being the side opposite from the front panel 32. The shutter mechanism 37 and the transport mechanism 34 are arranged in the forward section of the chassis 50, while the stocker 23 is mounted in the rearward section. The PU unit 25 is mounted movably in the backward and forward directions between the standby position shown in FIG. 13 and the insertion position in the stocker 23, with the center position of the turn table 38 always lying on the center line 51 of the chassis 50. Further, the PU unit 25 can be moved in swinging fashion with the turn table 38 at the swinging end, to move the turn table 38 to a position below the transport mechanism 34.

Disposed at both widthwise ends of the chassis 50 are the moving mechanism 26 for moving the stocker 23 up and down, the separating mechanism 28 for separating the stocker 23, the mechanism for operating the PU unit 25 and the lock mechanism 31, and mechanisms comprising slide plates or the like movable back and forth in reciprocating fashion. A lifting motor 52 and a separation motor 53 for driving the slide plates are mounted in the rear corners of the chassis 50. The lifting motor 52 moves the lifting slide plates 54 back and forth along the chassis 50 and selects the accommodating position in the stocker 23 based on the number of stack levels counted by a count sensor 55. Based on the accommodating position selected by the lifting motor 52, the separation motor 53 drives the separating slide plates 56 to separate the stocker 23. A separating origin point switch 57 and a lifting origin point switch 58 for indicating the origin points of the separating slide plates 56 and the lifting slide plates 54, respectively, are mounted at the front and rear ends of the chassis 50. The position of the separating slide plates 56 is detected by a separating position sensor 59.

The separating position sensor 59 is a linearly variable resistor, and is used so as to indicate the position by an analog voltage. The sensor output is A/D converted and treated as a digital value.

In the present embodiment, the lifting motor 52 is also used to drive the transport roller 35. The transport roller 35 moves down to operate only when inserting or ejecting the CD 24, otherwise it is held in the lifted position; therefore, to simplify the mechanism, the transport roller 35 is driven by the lifting motor 52 at all times. When it becomes necessary to move the stocker 23 up or down, a clutch mechanism is operated to couple the driving force to the lifting slide plates 54. The clutch mechanism in the present embodiment allows the driving force of the lifting motor 52 to be coupled to the lifting slide plates 54 when the separating slide plates 56 are at their origin point. When the separating slide plates 56 have moved away from their origin point, the clutch mechanism described later disengages the driving force of the lifting motor 52 from the lifting slide plates 54.

FIG. 17 shows the construction of a slide unit 60, mounted on the slide base 30, for moving the PU unit 25. FIG. 18 is a perspective plan view showing the slide unit 60 moved rearward relative to the slide base 30. The slide unit 60 substantially comprises a slide plate 61 and a swivel plate 62. The slide plate 61 is movable backward and forward relative to the slide base 30. The swivel plate 62 can be swivelled about a swivel axis 63 provided at its base end in such a manner as to cause the PU unit 25 at the tip to describe an arc relative to the slide plate 61. An arc-shaped guide slot 64 for guiding the swivelling motion of the swivel plate 62 is formed in the slide plate 61. An L-shaped guide slot 65 consisting of a longitudinal slot 66 and a lateral slot 67 is formed in the slide base 30. The swivel axis 63 has a protrusion 68 which engages in the L-shaped guide slot 65 of the slide base 30; when the protrusion 68 is engaged in the lateral slot 67 of the L-shaped guide slot 65, a protrusion 69 provided on the swivel plate 62 engages in the arc-shaped guide slot 64 of the slide plate 61, allowing the swivel plate 62 to swivel. When the protrusion 68 on the swivel plate 62 becomes engaged in the longitudinal slot 66 of the L-shaped guide slot 65, further swivelling motion of the swivel plate 62 is prevented, allowing only forward and backward movements with the protrusion 68 engaged in the longitudinal slot 66.

The PU unit 25 is moved on the swivel plate 62 by virtue of a feed screw shaft 71 which is driven for rotation by a feed motor 70. The positioning of the PU unit 25 at the origin point on the turn table 38 is detected by a PU original point switch 72. In the case of a conventional PU unit, when the PU unit has reached the origin point, no further driving by the feed motor 70 is performed. In the present embodiment, on the other hand, the PU unit 25 is not stopped mechanically at the origin point, but the feed motor 70 is further driven, thereby enabling the clamping by the chucking mechanism 40 to be released.

The clamp released condition is detected by a clamp release switch 73. The turn table 38 is directly driven for rotation by a spindle motor 74.

The slide unit 60 is moved relative to the slide base 30 by means of a slide motor 75. The slide motor 75 is mounted on the slide base 30, and the moving position of the slide plate 61 is detected by a slide origin point switch 76, a slide completion switch 77, and an insertion/ejection standby switch 78. In the slide unit 60, a gear mechanism for transmitting the driving force of the slide motor 75 to the slide plate 61 includes a slip mechanism 79 for preventing the transmission of excessive driving force. The forward movement of the slide plate 61 is limited by pins 61a striking against prescribed portions of the transport mechanism 34.

FIG. 19 shows the construction of the transport mechanism 34 and an open/close mechanism including the shutter mechanism 37. The driving forces of the lifting motor 52 and splitting motor 53 mounted in the rearward section are transmitted to spur gears 80 and 81, respectively. Since the transport roller 35 in the transport mechanism 34 is driven by the lifting motor 52 mounted in the rearward section, as previously described, a drive shaft 82 with the spur gear 80 clamped to its base end is provided in extending fashion and coupled at its other end to a gear mechanism 83. Likewise, the driving force of the splitting motor 53 mounted in the rearward section is transmitted via a drive shaft 84 with the spur gear 81 clamped to its base end, to rotate a link shaft 85 linking between both sides and thus drive both separating slide plates 56 equally in the forward and backward directions via gear mechanisms 86 and 87 provided at both ends of the link shaft 85.

The shutter mechanism 37 in the open/close mechanism includes an open/close slide plate 88a, a shutter sliding member 88b, and a shutter member 88c. The open/close mechanism itself further includes open/close pins 89a in conjunction with which an open/close stopper 89b and a pin sliding plate 89c are provided. The open/close pins 89a as a pair are arranged at both widthwise ends, spaced apart by a distance smaller than the diameter of the CD 24 to prevent another CD 24 from being inserted. When inserting the first CD 24, or when ejecting a CD 24, the open/close pins 89a are retracted out of the moving range of the CD 24 by the insertion or ejecting force of the CD 24 to allow the insertion and ejection of the CD 24. When preventing double insertion, the open/close pins 89a are restrained by the open/close stopper 89b and do not retract when being hit by a CD 24, thus preventing the insertion of the CD 24. The shutter member 88c, as earlier described, is used when positioning the inserted CD 24 in place by rotating the transport roller 35 in the reverse direction.

Further, an insertion detection switch 90a, an insertion presence/absence switch 90b, an insertion completion switch 90c, and an ejection completion switch 90d are also provided in connection with the insertion and ejection of the CD 24.

The linear movement of the slide unit 60 is performed via the gear mechanisms 86 and 87 of identical construction by transmitting the driving force, conveyed via the slip mechanism 79, to both sides of the slide base 30 by the link shaft 85. Since both sides are driven simultaneously and equally, a smooth movement can be accomplished.

FIG. 20 shows a simplified schematic of the gear mechanisms 83, 86, and 87 shown in FIG. 19. A bevel gear 83a forming a part of the gear mechanism 83 for driving the transport roller 35 is provided at the end of the drive shaft 82, and transmits the driving force from the lifting motor 52 to a bevel gear 83b and a spur gear 83c. A bevel gear 84a is provided at the end of the drive shaft 84, and transmits the driving force from the splitting motor 53 to a bevel gear 84b and a spur gear 84c. The link shaft 85 is provided with spur gears 85a and 85b at its right end and a spur gear 85c at its left end. The driving force from the splitting motor 53 is transmitted from the spur gear 84c to the spur gear 85a via a spur gear 86b mounted on a shaft 86a of the gear mechanism 86.

The spur gear 86b is not fixed to the shaft 86a, but is rotatable freely around the shaft 86a. A spur gear 86c and a pinion gear 86d are mounted at both ends of the shaft 86a of the gear mechanism 86. The gear mechanism 87 at the left side comprises a spur gear 87b rotatable freely around a shaft 87a and a spur gear 87c and pinion gear 87d mounted at both ends of the shaft 87a, and has the same construction as the gear mechanism 86 at the right side.

When the driving force is transmitted to the spur gear 85a, the link shaft 85 rotates and the driving force is transmitted to the spur gears 86c and 87c via the spur gears 85b and 85c, respectively. This driving force causes the pinion gears 86d and 87d to rotate, thus driving the racks of the separating slide plates 56b and 56a back and forth. In the gear mechanism 87 at the left side, the driving force transmitted from the lifting motor 52 via the drive shaft 82 is transmitted via the spur gear 87b to the drive mechanism for the transport roller 35.

FIGS. 21, 22,23, 24A, and 24B show the shape of the holder 39. FIG. 21 is a perspective view, FIG. 22 is a plan view, FIG. 23 is a bottom view, FIG. 24A is a front view, and FIG. 24B is a right-side view. The holder 39 is substantially semicircular in shape. A CD mounting portion 91 for mounting a CD 24 is formed along the inner circumference of the holder 39. The holder 39 is designed so as to hold the circumference of the CD 24 along a length greater than the semicircular length so that the CD 24 can be held by just placing the CD 24 in a horizontal position onto the CD mounting portion 91. A retention projection 92 for holding the CD 24 mounted on the CD mounting portion 91 in place is formed at the rear end of the holder 39. Splitting projections 93, 94, 95, and 96, used when separating the holder 39 by the splitting slide plates 56, as will be described later, are formed on both sides of the holder 39. Further, a pair of insertion holes 97 and 98 are formed at both widthwise sides of the holder 39. Positional displacement prevention projections 99 and 100 are formed in the forward section of the surface of the holder 39.

FIG. 25A shows the cross sectional structure including the positional displacement prevention projections 99 and 100, FIG. 25B shows the cross sectional structure including the retention pawl 92, and FIG. 25c shows the end face shape of the splitting projections 93, 94, 95, and 96. As shown in FIG. 25A, the positional displacement prevention projection 99 is protruding from the surface of the holder 39. The depth of the CD mounting portion 91, measured relative to the surface of the holder 39, is made larger than the thickness of the CD 24 so that the surface of the CD 24, when mounted on the CD mounting portion 91, does not protrude above the CD mounting portion 91.

Recessed portions 99a and 100a are formed in the back surfaces of the positional displacement prevention projections 99 and 100 so that, when holders 39 are stacked one on top of the other, the recessed portions 99a and 100a of the upper holder 39 engage onto the positional displacement prevention projections 99 and 100 of the lower holder 39, preventing positional displacement while, at the same time, making it possible to stack the holders close together without leaving gaps between them.

As shown in FIG. 25B, the retention pawl 92 is formed at a position slightly spaced away from the CD 24 mounted on the CD mounting portion 91. When the CD 24 is pushed in the direction of insertion, the surface of the CD 24 touches the retention pawl 92 by which the CD 24 is held in place so as not to come off the CD mounting portion 91. More specifically, the retention pawl 92 has such a shape that covers a portion of the surface of the CD 24 only when the outer edge of the CD 24 is pressed against the holder wall surface.

As shown in FIG. 25C, the end face shape of the splitting projections 93, 94, 95, and 96 is a triangle with its base facing up. This allows the tip of the splitting slide plate 56 to easily enter the space below and above the splitting projections 93, 94, 95, and 96 of the stacked holders 39 and widen the gap between them.

FIGS. 26, 27, 28, and 29 show the stocker 23 constructed with the holders 39 stacked one on top of another. FIG. 26 is a perspective view, FIG. 27 is a plan view, FIG. 28 is a front view, and FIG. 29 is a right-side view.

The stocker 23 includes a bottom plate 101 which is lifted up and down by the lifting slide plates 54, a pair of lift guides 102 and 103 formed protruding upward from the base plate 101, the six holders 39 through the insertion holes 97 and 98 of which are inserted the lift guides 102 and 103, and a top plate 104.

The top plate 104, except for the center cut-out 105 thereof, is formed in a substantially rectangular shape so that it can hold down the upper surface of the CD 24 mounted on the uppermost holder 39. Splitting projections 106 to 109 corresponding to the separating projections 93 to 96 of the holders 39 are formed at the four corners of the rectangle.

The top plate 104 is also provided with insertion holes 110 and 111 through which the lift guides 102 and 103 are inserted, and positional displacement prevention holes 112 and 113 which engage on the positional displacement prevention projections 99 of the uppermost holder 39. In the present embodiment, the holders 39 of identical construction can be used for accommodating a plurality of CDs 24. Pins 114, 115, 116, and 117 which engage in the step-like slots formed in the lifting slide plates 54 for lifting operation are formed on both sides of the bottom plate 101.

Spring retainers 118 are provided on both sides of the top plate 104. A thin, long coil spring 119 is connected to each spring retainer 118, and the end of each coil spring 119 is hooked onto the end of the other coil spring 119 for connection at the center of the bottom plate 101. Since the coil springs 119 are long, the spring force urging the stocker 23 in the closing direction can be made substantially the same when the overall length of the springs is expanded by separating the stocker 23 as when the overall length is contracted by closing the stocker 23. Pulleys are provided where the coil springs 119 bend to ensure smooth changes in direction.

FIGS. 30A, 30B, and 31 show the shape of the separating slide plates 56 that can separate the stocker 23 at an arbitrary position. FIGS. 30A and 30B show perspective views, and FIG. 31 shows a side view. FIG. 30A shows the right-side separating slide plate 56a, and FIG. 30B shows the left-side separating slide plate 56b. Two pairs of upper and lower cams 120 and 121 are formed on each separating slide plate 56, one upper/lower cam pair in the forward section and the other pair in the rearward section of the plate. The separating projections 93 to 96 on the holder 39 at the accommodating position at which the stocker 23 is separated move upward along the slopes of the upper cams 120. The holder underneath the holder 39 at which the stocker 23 is separated is prevented by the lower cams 121 from moving upward. The separating projections 93 to 96 moving upward along the slopes of the upper cams 120 are separated by separators 122 between the holder 39 at the accommodating position and the holder 39 above it. When the uppermost holder 39 is selected, the separating projections 106 to 109 on the top plate 104 are separated by the separators 122. The lower holder 39 is further pressed downward by the spring force of pressing portions 123.

The forward and backward movements of the separating slide plates 56 are accomplished by driving the racks 124, each provided in the forward upper section of each separating slide plate 56, by virtue of the pinion gears 86d and 87d in the gear mechanisms 86 and 87 shown in FIG. 20.

A spring retainer 125 for interlocking with the lifting mechanism of the slide unit 60 shown in FIG. 17 is provided on the upper side of each separating slide plate 56, and a pin 126 is provided in protruding fashion on one side of the plate.

Further, as will be described later in connection with FIGS. 35A and 35B, a pressure release cam 127 is provided at the front end of the separating side plate 56a in connection with the mechanism for pressing the CD 24 in the lower separated section of the stocker 23 to prevent it from coming off.

In FIG. 31, the relationships between the separating projections 93 and 94 and the moving position of the separating slide plate 96a are indicated by reference characters 93a1, 93a2, . . . , 94c, etc. Characters "a", "b", and "c" following the numbers "93" and "94" designating the separating projections correspond to the holder 39 located above the selected holder 39, the selected holder 39, and the holder 39 located below the selected holder 39, respectively. When the selected holder 39 is the uppermost holder 39, the member located above it is the top plate 104. When the selected holder 39 is the lowermost holder 39, the member located below it is the bottom plate 101. The last numbers "1", "2", "3", and "4" correspond to the separated conditions of the stocker 23.

Referring to FIGS. 5 to 9, "1" indicates the stocker 23 in the closed condition corresponding to FIGS. 7F, 8A, 9F, and 9G. The number "2" indicates the separated condition corresponding to FIGS. 7B to 7E, 8B to 8E, 9B to 9E, and 9H to 9K. The number "3" indicates the condition corresponding to FIGS. 5H, 6A, 7A, 9A, and 9L. The number "4" indicates the condition corresponding to FIGS. 5A to 5G, 6B to 6F, and 8F to 8I.

FIG. 32 shows the upper cams 120 and lower cams 121 displacing the separating projections 93 to 96 to separate the holders 39. Using the separating slide plates 56 shown here, the separated conditions shown in FIGS. 5 to 9 can be accomplished.

FIG. 33 shows a simplified schematic of the floating mechanism 27 for the slide base 30. The floating mechanism 27 includes dampers 130 mounted on the chassis 50, pins 131 inserted in the dampers 130 from the slide base 30 side, and springs 132 disposed outwardly of the dampers 130 and pins 131. Lock shafts 133 and a lock piece 134 are also provided on the slide base 30 in such a manner as to protrude toward the chassis 50. A locking notch 135 is formed in the lock piece 134. The lock mechanism 31 mounted on the chassis 50 restrains the lock shafts 133 to prevent relative motion in a plane perpendicular to the thickness, i.e., in the horizontal plane, and restrains the vertical motion of the PU unit 25 by using the locking notch 135 of the lock piece 134.

A pressure lever 140, which is provided adjacent to the lock mechanism 31, is used to press the CD 24 in the lower separated section of the stocker 23. The pressure lever 140 is urged by a spring 141 and presses the upper surface and edge face of the CD 24. When the stocker 23 is not separated, the pressing force is released. The height at which to separate the stocker 23 is fixed, and the position of the holder 39 at which to separate the stocker 23 is determined by the upward/downward movement of the entire construction of the stocker 23. Accordingly, the pressure lever 140 can always press the uppermost CD 24 in the lower separated section of the stocker 23.

FIG. 34 shows the arrangement of the essential parts constituting the separating mechanism 28 shown in FIG. 1. On both sides of the chassis 50 are arranged the separating slide plates 56 which move back and forth in interlocking fashion.

The right-side separating slide plate is designated by 56a and the left-side plate by 56b, and they are collectively designated by reference numeral 56. In connection with the separating slide plates 56, the pressure lever 140 is disposed in the forward section of the chassis 50. The pressure lever 140 is urged by the spring 141 in such a manner as to press the lower separated section of the stocker 23 from the front side to prevent the CDs 24 accommodated therein from coming off the holders. When the separating slide plates 56 are moved to the forward end position and the stocker 23 is restored to the unsplit condition, the pressing force being applied on the stocker 23 by the pressure lever 140 is released.

FIGS. 35A, 35B, and 35C show the construction relating to the action of the pressure lever 140. When the separating slide plate 56a is moved rearward and the pressure release cam 127 is not in contact, as shown in FIG. 35A, the pressure lever 140 is in the pressing condition. When the separating slide plate 56a is moved back to its origin point, as shown in FIG. 35B, the pressure release cam 127 comes into action, and the pressure lever 140 is released. The action to release the pressure lever 140 is performed via a release lever 142. When a pin 143 at one end of the release lever 142 is driven so as to move the release lever 142 to the left by being guided by the pressure release cam 127, a pin 144 at the other end applies such an angular displacement to the pressure lever 140 as to release the pressing force.

FIG. 35C shows the cross sectional shape of the pressure lever 140 taken along cutting line C—C in FIG. 35A. An upper surface pressing portion 145 and an edge face pressing portion 146 are formed on the portions of the pressure lever 140 that contact the circumference of the CD 24.

FIGS. 36A and 36B show the construction relating to a PU lifting slide plate 150 for moving the slide base 30 up and down in interlocking fashion with the separating slide plate 56. FIG. 36A shows the PU lifting slide plate 150 itself, and FIG. 36B shows the lifting slide plate 150 mounted on the chassis 50 as viewed from the left side thereof.

As shown in FIG. 36A, PU lifting slots 151 for moving the slide base 30 up and down are formed in the PU lifting slide plate 150. The PU lifting slide plate 150 moves backward and forward by being guided by pins 152. An interlocking slot 153 engages on the pin 126 of the separating slide plate 56 and, when the separating slide plate 56 moves backward more than a certain distance, causes the PU lifting slide plate 150 to move backward in interlocking fashion, causing the rack 154 formed on the upper side to engage with the pinion gear 86d, 87d and thereby enabling the PU lifting slide plate 150 to move further backward. The PU lifting slide plate 150 is also provided with a spring retainer 155 on which one end of a coil spring, whose other end is supported on the spring retainer 125 of the separating slide plate 56, is hooked.

As shown in FIG. 36B, the PU lifting slide plate 150 is mounted on a side plate 160 of the chassis 50. Slide slots 161 serving as cams are formed in the side plate 160, and the pins 152 of the PU lifting slide plate 150 engage in the slots which thus guide the backward/forward movement of the PU lifting slide plate 150. Mounted below the PU lifting slide plate 150 is the lifting slide plate 54.

The PU lifting slide plate 150 can be made integral with the separating slide plate 56. In that case, the PU lifting slots 151 are formed in the separating slide plate 56. By providing these slide plates separately as in the present embodiment, the length necessary in the longitudinal direction can be reduced.

FIG. 37 shows the basic drive mechanism for the lifting slide plates 54, mounted on the chassis 50, and FIG. 38 shows the construction of the lifting slide plate 54 itself. The lifting slide plates 54 on both sides are mechanically linked together by an interlinking lever 170 located in the forward section of the chassis 50, and move in opposite directions to each other in such a manner that when one moves in the forward direction, the other moves in the backward direction. The interlinking lever 170 is mounted swingably about a support shaft 171 at the center. The left-side lifting slide plate 54 is moved backward and forward by the driving force transmitted from the lifting motor 52 to a pinion gear 173 via a bevel gear 172.

As shown in FIG. 38, step-like slots 174 are formed in each lifting slide plate 54, and are engaged with the pins 114, 115, 116, and 117 formed on the bottom plate 101 of the stocker 23. The step-like slots 174 work as cams and move the entire construction of the stocker 23 up and down. When selecting a particular holder 39, the stocker 23 is moved up or down so that the position between the holders 39 at which the stocker 23 is to be separated is brought to the same height as the height of the tip of the separating slide plate 56. In the present embodiment, the holder 39 located above the separating position is selected, but it is equally possible to make the construction so that the holder 39 below the separating position is selected.

FIGS. 39A and 39B show the construction of a gear mechanism 180 interposed between the bevel gear 172 shown in FIG. 37 and the lifting motor 52. FIG. 39A is a left-side view, and FIG. 39B is a front view. The driving force is transmitted to the gear mechanism 180 via a worm gear 181 mounted to the output shaft of the lifting motor 52. Inside the gear mechanism 180 is provided a planetary gear 182 which engages or disengages the driving force transmission to a bevel gear 183. When a pin 185 at the end of a clutch lever 184 is pressed by the tip of the separating slide plate 56b, the planetary gear 182 is so displaced as to be disengaged from the bevel gear 183. As long as the pin 185 is not pressed by the tip of the separating slide plate 56b, a spring 186 keeps the planetary gear 182 in engagement with the bevel gear 183 so that the driving force is transmitted via the bevel gear 183 to the bevel gear 172 to drive the lifting slide plate 54.

The movement of the separating slide plate 56b that stops the driving of the lifting slide plate 54 corresponds to the condition indicated by the reference characters 93a4, 93b4, 93c4, 94a4, 94b4, and 94c4 in FIG. 31, in which condition the stocker 23 is separated and the selected holder 39 is positioned downward of the turn table 38. In this condition, only the PU lifting slide plate 150 is driven by the driving force of the splitting motor 54 to move the PU unit 25 up and down.

FIG. 40 shows an electrical configuration for controlling the various parts of the CD playback apparatus 21 by the control circuit 29 in FIG. 1. The control circuit 29 includes a microcomputer or the like which performs various operations in accordance with a preset program. The kind of operation to be performed is specified in accordance with an instruction from an input switch 190 which includes the selector buttons 41 to 46 provided on the front panel 32.

FIGS. 41 to 60 show the control operations performed by the control circuit 29 of FIG. 40. Each motor can switch the direction of its rotation between clockwise direction (CW) and counterclockwise direction (CCW). The output value of the separating position sensor 59 is an analog-to-digital converted value and expressed as a hexadecimal number with a suffix "h".

Further, "const.", "inc.", and "dec." indicate that the value is constant, increases, or decreases, respectively.

FIG. 41 shows the control timing for the operation performed from the time that the slide base 30, including the PU unit 25, is floated from the chassis 50 by the floating mechanism 27, until the time that the CD 24 is returned to the holder 39 in the stocker 23. At operation start point S, the holder 39 temporarily moved downward, as shown in FIG. 9A, is moved upward by driving the separating slide plates 56 by rotating the splitting motor 53 in the counterclockwise direction (CCW); the holder 39 pressed downward by the separators 122 is now moved upward and the floating condition is restored by releasing the lock applied by the lock mechanism 31. FIG. 42 shows a sequence of operations by which the CD 24 clamped by the chucking mechanism 40 is unclamped and the slide unit 60 is moved downward to disengage the CD 24 from the turn table 38. FIG. 43 shows a control sequence for the operation performed to withdraw the slide unit 60 from the inside of the stocker 23 and retract it into the standby position. FIG. 44 shows a sequence of operations by which the PU unit 25 is retracted outside the stocker 23 and the space created by separating the stocker 23 is closed by the movement of the separating slide plates 56, thus putting the stocker 23 in the unsplit condition to end the separated condition. FIG. 45 shows a sequence of operations by which the entire construction of the stocker 23 is moved up and down by the lifting slide plates 54. The lifting slide plates 54 are moved to select one of the accommodating positions in the stocker 23. When the selected accommodating position is detected using the output of the counter sensor 55, the lifting motor 52 is stopped. With the control sequence illustrated in FIGS. 41 to 45 above, the sequence of operations from FIGS. 7A to 7F or FIGS. 9A to 9F can be performed.

FIG. 46 shows the control operations when separating the stocker 23 by the separating slide plates 56. FIG. 47 shows the operation for inserting the PU unit 25 in the space created by separating the stocker 23. FIG. 48 shows the operation for moving upward the turn table 38 of the PU unit 25 inserted in the stocker 23 and for mounting the CD 24 on the turn table 38.

FIG. 49 shows the control of operations by which the CD 24 is clamped onto the turn table 38 by activating the chucking mechanism 40 and the locking by the lock mechanism 31 is released to allow the PU unit 25, etc. on the slide base 30 to be floated by the floating mechanism 27. With the control sequence illustrated in FIGS. 46 to 49, the sequence of operations from FIGS. 9G to 9L can be performed.

FIG. 50 shows the control of operations by which, with the CD 24 clamped on the turn table 38 in the stocker 23, the holder 39 on which the CD 24 was accommodated is moved downward.

FIG. 51 shows the operation for transporting the CD clamped on the turn table 38 to the standby position by using the PU unit 25. FIG. 52 shows the control of operations by which, with the PU unit 25 positioned in the standby position, the CD 24 clamped on the turn table 38 by the chucking mechanism 40 is unclamped, and the slide unit 60 is moved down while, at the same time, the transport roller 35 is lowered to hold the CD 24 in the transport mechanism 34 and the turn table 38 is retracted below the transport path of the CD 24. FIG. 53 shows the control of operations for ejecting the CD 24 by driving the transport roller 35. The control sequence illustrated in FIGS. 50 to 53 corresponds to the sequence of operations shown in FIGS. 6A to 6F.

FIG. 56 shows the control of operations by which the PU unit 25 is moved upward to mount the thus positioned CD 24 onto the turn table 38. FIG. 57 shows the control of operations by which the CD 24 clamped on the turn table 38 by the chucking mechanism 40 is transported into the space in the stocker 23 by moving the PU unit 25. With the control sequence illustrated in FIGS. 54 to 57 above, the sequence of operations in FIGS. 5A to 5G can be performed.

FIG. 58 shows the control of operations by which the slide base 30 is locked by the lock mechanism 31 and the turn table 38 of the PU unit 25 is moved upward. FIGS. 59 and 60 show the operations for clamping the CD 24 onto the turn table 38 and for unclamping the CD 24, respectively. As previously described, the clamping of the CD 24 by the clamp mechanism 40 is performed using the feed motor 70 which moves the PU unit 25 into the chucking position. To achieve this, the PU origin point switch 72 and the clamp release switch 73 are used as inputs in the control of the chucking mechanism 40.

While the above embodiment has been described dealing with the CD 24 which is a disk-shaped recording medium, the present invention is equally applicable to other disk-shaped recording media such as DVDs. The invention can also be applied to MDs and like recording media housed in cassettes or cartridges.

Further, since the CD 24 is handled in a substantially horizontal position, the accommodating and transport mechanisms can be simplified, but the mechanisms can be adapted to handle the CD 24 in other positions.

As the recording media, not only the playback-only CD 24 but information recordable media such as CD-R or CD-RW can also be used. Such writable recording media can be used as information recording media, for example, for personal computers. By applying the present invention, a playback apparatus or a playback/recording apparatus capable of accommodating many recording media, whether it is internal or external to a personal computer or the like, can be made compact in construction, and yet the recording media can be inserted or ejected one at a time.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A recording media accommodating apparatus having a plurality of accommodating positions arranged along a recording media thickness direction for individually accommodating recording media, the apparatus comprising:
    a housing having an insertion/ejection slot through which recording media are to be inserted or ejected one at a time,
    holders in said housing disposed at the accommodating positions, respectively, and being separable in the thickness direction at an arbitrary one of the accommodating positions, with each of said holders being capable of holding one recording medium; and
    a playback mechanism for playing back information recorded on the recording media, wherein said playback mechanism is capable of moving into a space between said holders and transferring the recording media to and from said holders, and is also capable of moving to a position near said insertion/ejection slot and transferring the recording media to and from said insertion/ejection slot.

2. The recording media accommodating apparatus according to claim 1, further comprising:
    a separating device to enter between said holders in the same direction that said playback mechanism is to move into the space between said holders, and thereby widen a gap between said holders and create the space between said holders;
    a selection mechanism for moving said holders in their entirety along the thickness direction, and for selecting a position at which said separating device is to enter between said holders; and
    a separating mechanism to cause said separating device to enter between said holders.

3. The recording media accommodating apparatus according to claim 2, further comprising a spring to urge said holders in the recording media thickness direction.

4. The recording media accommodating apparatus according to claim 2, wherein said separating device includes two separating members, with said two separating members being provided on sides of said holders, respectively, and wherein said two separating members are to enter between said holders in the same direction that said playback mechanism is to move into the space between said holders, and thereby widen the gap between said holders and create the space between said holders.

5. The recording media accommodating apparatus according to claim 4, wherein the recording media are disk-shaped and said holders are substantially semicircular in shape, wherein each of said holders is constructed to accommodate a recording medium in a substantially horizontal position and has an opening facing towards said insertion/ejection slot, and also has separating guide portions with which said two separating members engage, respectively, when said two separating members are entering between said holders to widen the gap between said holders and create the space between said holders.

6. The recording media accommodating apparatus according to claim 4, wherein said separating mechanism includes a driving source to drive said two separating members such that said two separating members simultaneously enter between said holders to widen the gap between said holders and create the space between said holders.

7. The recording media accommodating apparatus according to claim 6, wherein said separating mechanism further includes transmission mechanisms of identical construction to transmit a driving force from said driving source to said two separating members.

8. The recording media accommodating apparatus according to claim 4, wherein said two separating members are each provided with a pressing portion to resiliently press a portion of one of said holders defining the space when said two separating members have entered the gap.

9. The recording media accommodating apparatus according to claim 4, wherein said separating mechanism is to move said two separating members such that one of said holders defining the space is displaced in the recording media thickness direction after said playback mechanism has entered the space.

10. The recording media accommodating apparatus according to claim 4, wherein each of said two separating members includes a cam face to displace one of said holders, defining the space, in the recording media thickness direction as said two separating members are moved in the direction to enter between said holders.

11. The recording media accommodating apparatus according to claim 4, wherein each of said two separating members has a cam to displace said playback mechanism in the recording media thickness direction.

12. The recording media accommodating apparatus according to claim 4, wherein said separating mechanism includes a cam member to displace said playback mechanism in the recording media thickness direction interlockingly with said two separating members as said two separating members are creating the space.

13. The recording media accommodating apparatus according to claim 1, further comprising a top plate that is to cover an uppermost one of said holders, wherein said top plate includes a notch opening in the direction of ejection of the recording media through said insertion/ejection slot.

14. The recording media accommodating apparatus according to claim 13, wherein each of said holders includes a pawl at least on a portion of a wall surface thereof that is to hold a recording medium, and wherein said pawl is to retain the recording medium in place by covering a portion of a surface of the recording medium only when an edge face of the recording medium is pressed against a respective one of said holders.

15. The recording media accommodating apparatus according to claim 13, further comprising a spring to urge said top plate and said holders in the recording media thickness direction toward a bottom of said housing.

16. The recording media accommodating apparatus according to claim 15, wherein said spring is a long, thin coil spring having ends attached to said top plate and having other portions extending over outside edges of said holders and a bottom of said housing.

17. The recording media accommodating apparatus according to claim 13, further comprising a pressing member to press a recording medium to a lower one of two holders defining the space.

18. The recording media accommodating apparatus according to claim 17, further comprising a separating device to separate said holders interlockingly with said pressing member while said pressing member presses the recording medium.

19. The recording media accommodating apparatus according to claim 18, wherein said separating device includes a separating member to enter between holders and thereby widen a gap therebetween.

20. The recording media accommodating apparatus according to claim 17, wherein said pressing member is disposed in such a manner as to press the recording medium at a predetermined position within said housing, and said holders and said top plate are movable along the recording media thickness direction such that the accommodating position of the recording medium to be pressed by said pressing member can be selected.

21. The recording media accommodating apparatus according to claim 17, wherein said pressing member has a shape such that said pressing member is capable of pressing an edge face of the recording medium while covering at least a portion of an upper face of the recording medium.

22. The recording media accommodating apparatus according to claim 13, wherein each of said holders includes a wall, opening in one direction, to circumferentially hold a recording medium.

23. The recording media accommodating apparatus according to claim 22, wherein each of said holders includes a projection along an outer circumference thereof to hold a recording medium located on a respective said holder.

24. The recording media accommodating apparatus according to claim 13, wherein each of said holders includes a projection formed on one surface thereof and extending in the recording media thickness direction, with said projection being located outside of a mounting area corresponding to the recording medium, and wherein each of said holders also includes a recess formed in an outer surface thereof to engage with a respective said projection of an adjacent said holder when said holders are not separated, and wherein said top plate has a recess or a projection to engage with said recess or said projection on an uppermost one of said holders when said holders are not separated.

25. The recording media accommodating apparatus according to claim 1, wherein said playback mechanism is capable of moving into the space between said holders and transferring the recording media to and from said holders, and is also capable of moving to a position near said insertion/ejection slot and transferring the recording media to and from said insertion/ejection slot by being slidable between said insertion/ejection slot and said holders.

* * * * *